United States Patent
Oltmans et al.

(10) Patent No.: US 10,294,889 B2
(45) Date of Patent: May 21, 2019

(54) ENGINE

(75) Inventors: Bret Allen Oltmans, Stacy, MN (US);
Brian J. Hitt, Forest Lake, MN (US);
David Andrew Galsworthy, Wyoming, MN (US); Chad Michael Slater, Osceola, WI (US); Daniel Joseph Nugteren, Stacy, MN (US); George Jay McKoskey, Forest Lake, MN (US); Gordon Raymond Nelson, Cambridge, MN (US)

(73) Assignee: Polaris Industries Inc., Medina, MN (US)

( * ) Notice: Subject to any disclaimer, the term of this patent is extended or adjusted under 35 U.S.C. 154(b) by 294 days.

(21) Appl. No.: 13/242,229

(22) Filed: Sep. 23, 2011

(65) Prior Publication Data

US 2012/0073537 A1    Mar. 29, 2012

Related U.S. Application Data

(60) Provisional application No. 61/385,802, filed on Sep. 23, 2010.

(51) Int. Cl.
*F02F 7/00* (2006.01)
*F01L 1/02* (2006.01)
(Continued)

(52) U.S. Cl.
CPC .............. *F02F 7/0058* (2013.01); *F01L 1/02* (2013.01); *F01L 1/022* (2013.01); *F01M 1/02* (2013.01); *F01M 1/06* (2013.01); *F01M 9/102* (2013.01); *F01M 13/04* (2013.01); *F01P 5/12* (2013.01); *F02B 67/04* (2013.01); *F02B 67/06* (2013.01); *F02F 1/38* (2013.01); *F02F 1/40* (2013.01); *F02F 7/0004* (2013.01); *F16C 3/14* (2013.01); *F16F 15/26* (2013.01);
(Continued)

(58) Field of Classification Search
CPC .......... F02F 7/0051; F02F 7/00; F02F 7/0058; F02F 7/0004; F02F 7/0021; F02F 7/0031; F02F 7/0039; F02F 7/0082
USPC ..... 123/195 R, 41.08, 90.31, 73 AF, 73 DA, 123/73 PP, 74 D
See application file for complete search history.

(56) References Cited

U.S. PATENT DOCUMENTS 2,111,828 A   3/1938  Weaver et al.
2,983,335 A   5/1961  Etchells et al.
(Continued)

FOREIGN PATENT DOCUMENTS

DE   661157    6/1938
GB   2173547   10/1986

OTHER PUBLICATIONS

European Patent Office, Communication Pursuant to Article 94(3), dated Nov. 14, 2014, 3 pages.
(Continued)

*Primary Examiner* — Lindsay Low
*Assistant Examiner* — Omar Morales
(74) *Attorney, Agent, or Firm* — Faegre Baker Daniels LLP

(57) ABSTRACT

An engine is described having a crankcase, a liner and a head assembly. The crankcase is split along a plane defining a two part crankcase, where fluid passages are passing through only one of the crankcase portions, so as to not require crossing the split line. A connecting rod also includes a tapered end, and the piston has a complementary carrier receiving the connecting rod.

27 Claims, 52 Drawing Sheets

(51) Int. Cl.
*F01M 1/02* (2006.01)
*F01M 1/06* (2006.01)
*F01M 9/10* (2006.01)
*F01M 13/04* (2006.01)
*F01P 5/12* (2006.01)
*F02B 67/04* (2006.01)
*F02B 67/06* (2006.01)
*F02F 1/38* (2006.01)
*F02F 1/40* (2006.01)
*F16C 3/14* (2006.01)
*F16F 15/26* (2006.01)
*F01L 1/053* (2006.01)
*F01M 11/00* (2006.01)
*F01M 11/02* (2006.01)
*F01M 11/03* (2006.01)
*F02N 11/00* (2006.01)
*F02N 15/00* (2006.01)
*F16N 7/34* (2006.01)

(52) U.S. Cl.
CPC ...... *F01L 2001/0537* (2013.01); *F01M 2001/062* (2013.01); *F01M 2011/007* (2013.01); *F01M 2011/026* (2013.01); *F01M 2011/031* (2013.01); *F01M 2013/0461* (2013.01); *F02N 11/00* (2013.01); *F02N 15/006* (2013.01); *F16N 7/34* (2013.01); *F16N 2210/33* (2013.01)

(56) References Cited

U.S. PATENT DOCUMENTS

| | | | |
|---|---|---|---|
| 3,145,695 A | 8/1964 | Conover et al. | |
| 4,380,216 A | 4/1983 | Kandler | |
| 4,928,651 A | 5/1990 | Kronich | |
| 4,964,378 A | 10/1990 | Tamba | |
| 5,159,901 A | 11/1992 | Chonan | |
| 5,588,405 A | 12/1996 | Sawa | |
| 6,257,192 B1 | 7/2001 | Yamaura et al. | |
| 7,137,376 B2 | 11/2006 | Ito | |
| 7,400,053 B2* | 7/2008 | Wilson | F02N 11/04 290/31 |
| 2003/0098203 A1 | 5/2003 | Kunimitsu et al. | |
| 2005/0005893 A1 | 1/2005 | Ito | |
| 2005/0229893 A1 | 10/2005 | Miyake et al. | |
| 2006/0042585 A1* | 3/2006 | Sanada | F16F 15/26 123/195 H |
| 2007/0101952 A1 | 5/2007 | Fujimoto | |
| 2008/0210193 A1 | 9/2008 | Neu et al. | |
| 2009/0095269 A1* | 4/2009 | Zama | F02B 25/22 123/73 A |
| 2009/0163094 A1 | 6/2009 | Fukuoka | |
| 2010/0012075 A1* | 1/2010 | Bluhm | 123/196 R |
| 2010/0050976 A1* | 3/2010 | Taki | F02F 7/0058 123/195 C |

OTHER PUBLICATIONS

International Search Report and Written Opinion issued by the International Searching Authority for International Patent App. No. PCT/US2011/052914, dated Mar. 21, 2012.

Hodgson, Sep. 20, 2010, Ageless Engine, http://web.archive.org/web/20100920051059/http://agelessengines.com/Oil.htm.

Communicated Pursuant to Article 94(3) EPC, issued by the European Patent Office, dated Sep. 25, 2018; for European Patent Application No. 11764445.0; 4 pages.

Examination Report issued by the Intellectual Property India, dated Jan. 17, 2019, for Indian Patent Application No. 3427/DELNP/2013; 7 pages.

* cited by examiner

ENGINE

This application claims priority to provisional application Ser. No. 61/385,802 filed Sep. 23, 2010 the subject matter of which is incorporated herein by reference.

FIELD OF THE DISCLOSURE

The subject disclosure relates to engines, in particular to engines for use in powersports equipment.

Multiple different engine types are known, for example, multiple fuel types are available, and multiple different sized engines are available, together with different numbers of cylinders. Engines may also be 2 or 4 stroke, and be positioned at multiple different orientations, for example the piston(s) may be oriented vertically, horizontally, or at any other possible orientation. The subject disclosure is applicable to all types of such engines.

SUMMARY

In a first embodiment, an engine comprises a crankcase, a crankshaft journalled in the crankcase, a piston coupled to the crankshaft, a cylinder in which the piston reciprocates, and a head positioned over the piston and cylinder. The crankcase is split along a plane forming first and second crankcase portions, with fluid passages being in only the first crankcase portion, the fluid passages communicating with the head to deliver fluid to the head.

The above mentioned and other features of this invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 5:
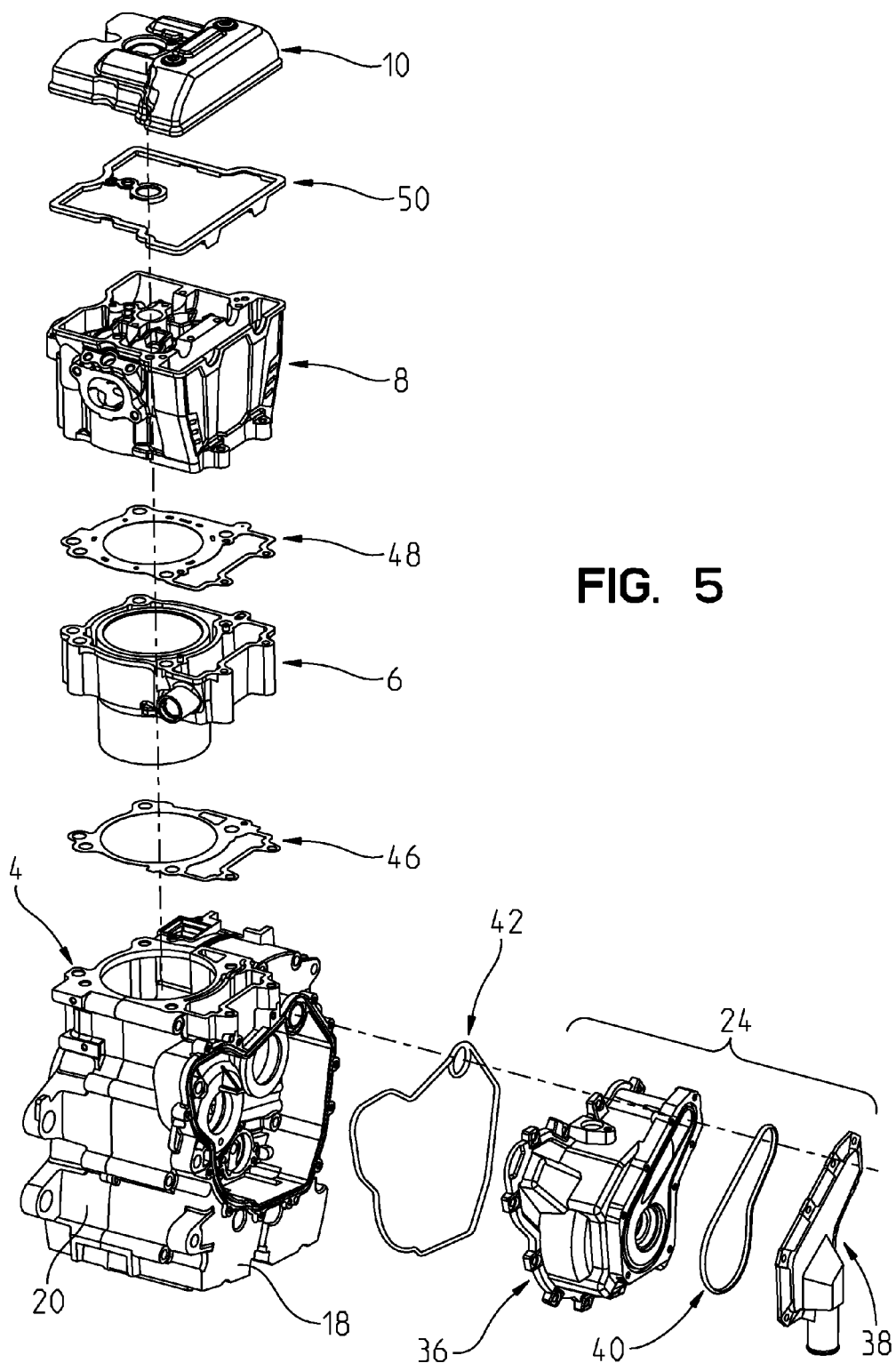
FIG. 5 shows an exploded view of multiple components of the engine taken from the perspective shown in FIG. 2.

As best shown in FIGS. 1-4, the engine of the subject disclosure is shown generally at 2, and generally comprises the components of a crankcase 4, a cylinder liner 6, a head assembly 8, a valve cover 10, and a crankshaft assembly 12. As shown, crankcase 4 is comprised of first and second portions 18, 20, a water pump assembly 24, an oil filter 26 and a starter motor 30. As shown in FIG. 5, water pump assembly 24 includes a water pump housing 36 and a water pump cover 38, together with gaskets 40 and 42 as described herein. As also shown in FIG. 5 engine 2 further comprises, a liner gasket 46, a head gasket 48, and a valve cover gasket 50. With reference now to FIGS. 6-12, the crankcase 4 will be described in greater detail.

Figure 6:
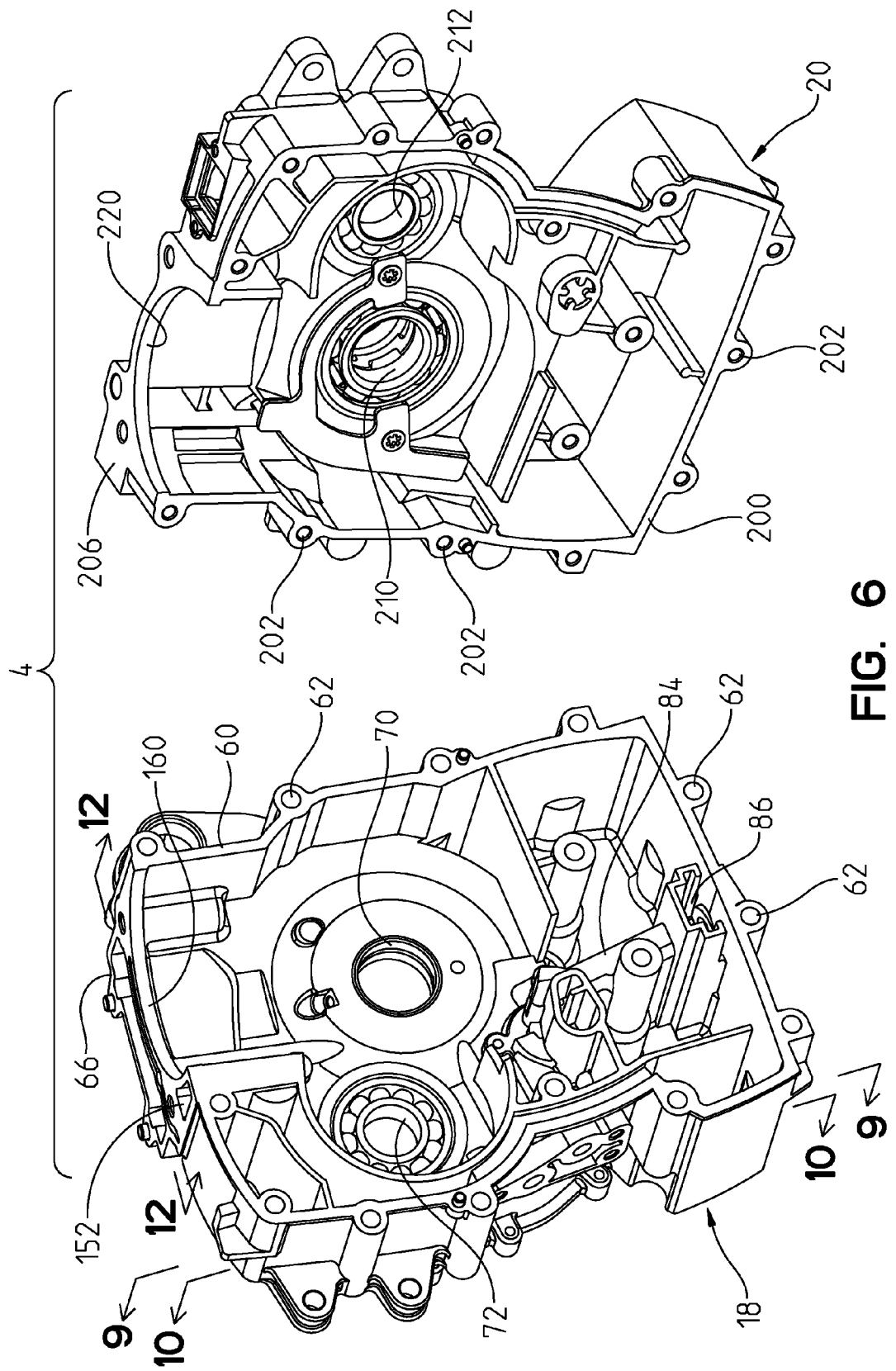
FIG. 6 shows the split housing portions of the crankcase.
Figure 8:
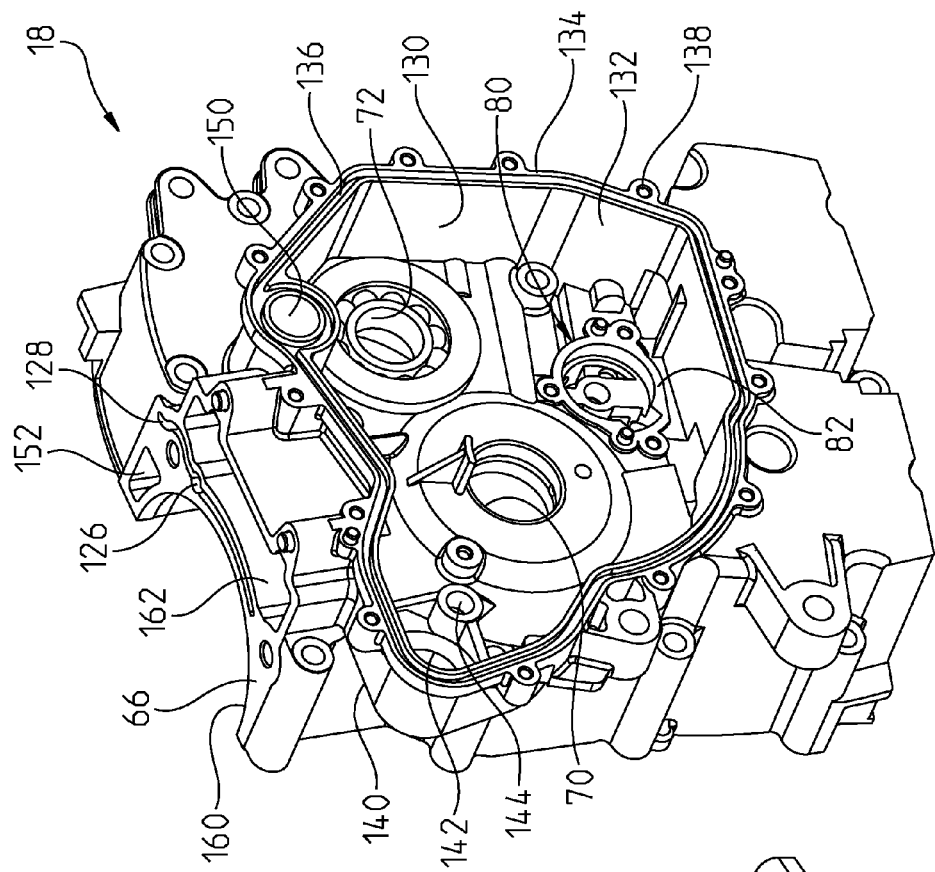
FIGS. 7 and 8 are the opposite sides of the crankcase portions as shown in FIG. 6.

With respect first to FIGS. 6 and 8, first crankcase portion 18 is comprised of a planar surface 60 which defines a split line of the crankcase assembly along a vertical plane. As should be appreciated, surface 60 defines a flange face having a plurality of bosses having through holes at 62 as described herein. First crankcase portion 18 also includes a top face 66 which produces a planar surface for receiving cylinder liner 6 as described herein. Crankcase portion 18 further includes a main bearing 70 and a roller bearing 72 (for a counterbalance shaft) as described herein.

It should also be understood from the specification that such orientational descriptions, such as the term "vertical", is for reference only as viewed in the disclosed embodiment, and that the engine split line may actually be horizontal, or at some other angle.

Figure 9:
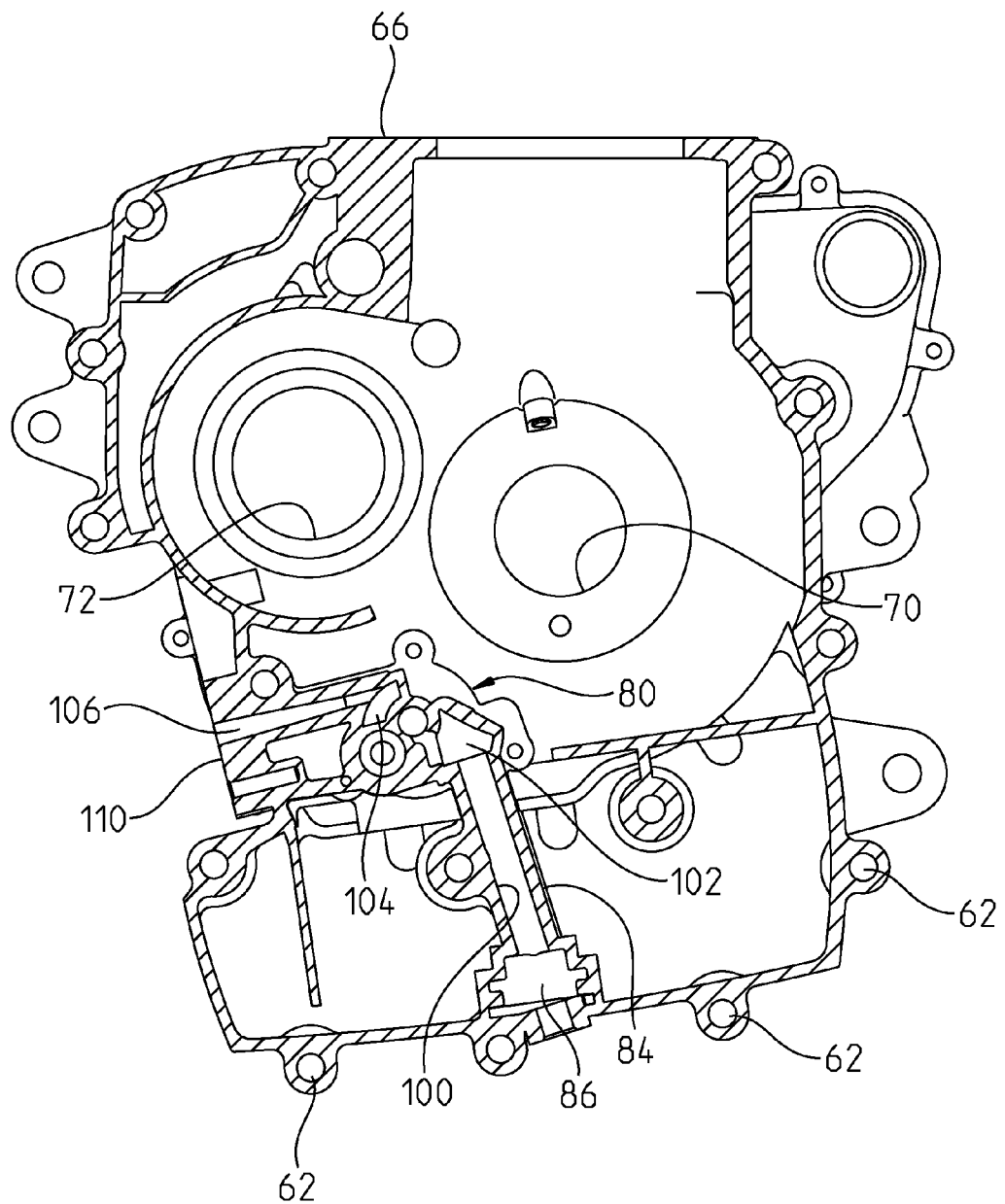
FIG. 9 is a cross-sectional view taken through lines 9-9 of FIG. 6.
Figure 11:
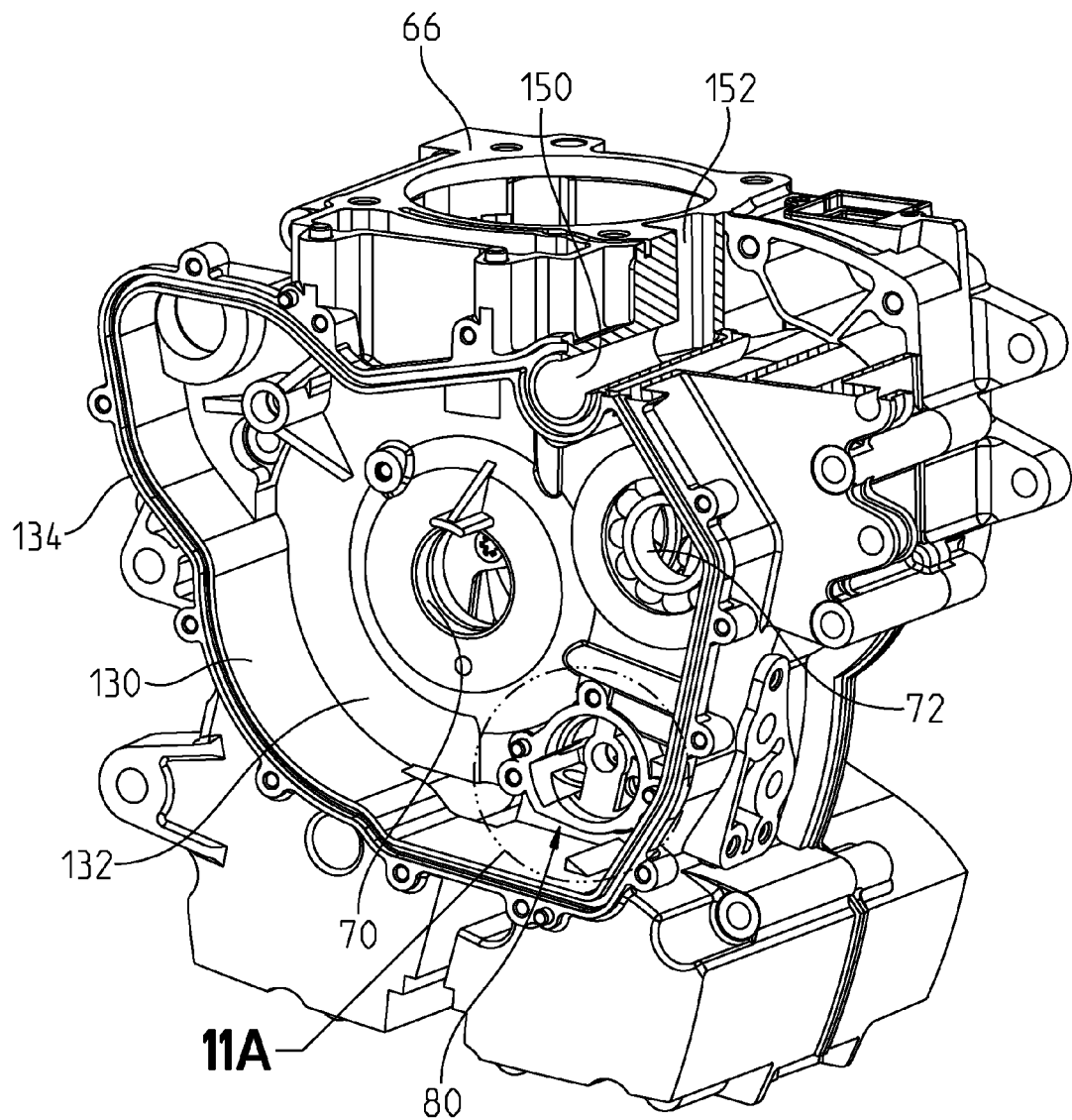
FIG. 11 is a perspective view of the crankcase partially broken away to show a cooling water passage.
Figure 11A:
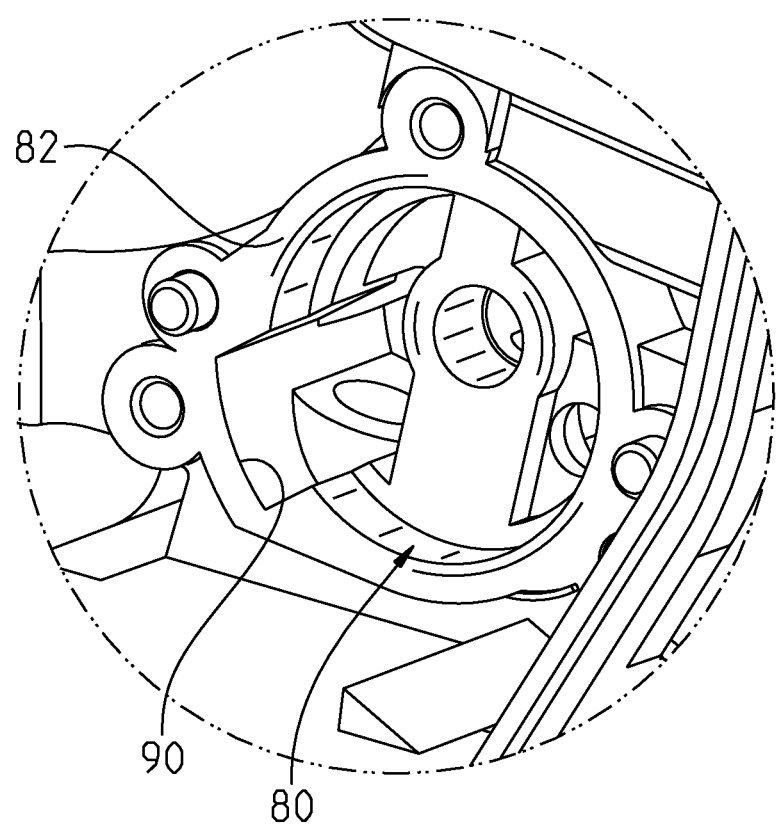
FIG. 11A is an enlarged view of the portion denoted in FIG. 11.

As shown best in FIGS. 8 and 11A, crankcase portion 18 also includes an oil pump mounting portion 80 defining a mounting face at 82, and which is in communication with an oil duct 84 (FIG. 9). Oil duct 84 is further in communication with an inlet or snorkel at 86. As shown herein, it should be appreciated that duct 84 and inlet 86 are integrally cast with the remainder of the crankcase portion, although it should be understood that other components could be provided such as tubes or other such assemblies. As best shown in FIG. 11A, an oil trough is formed to catch a pool of oil to assist in priming the pump.

Figure 10:
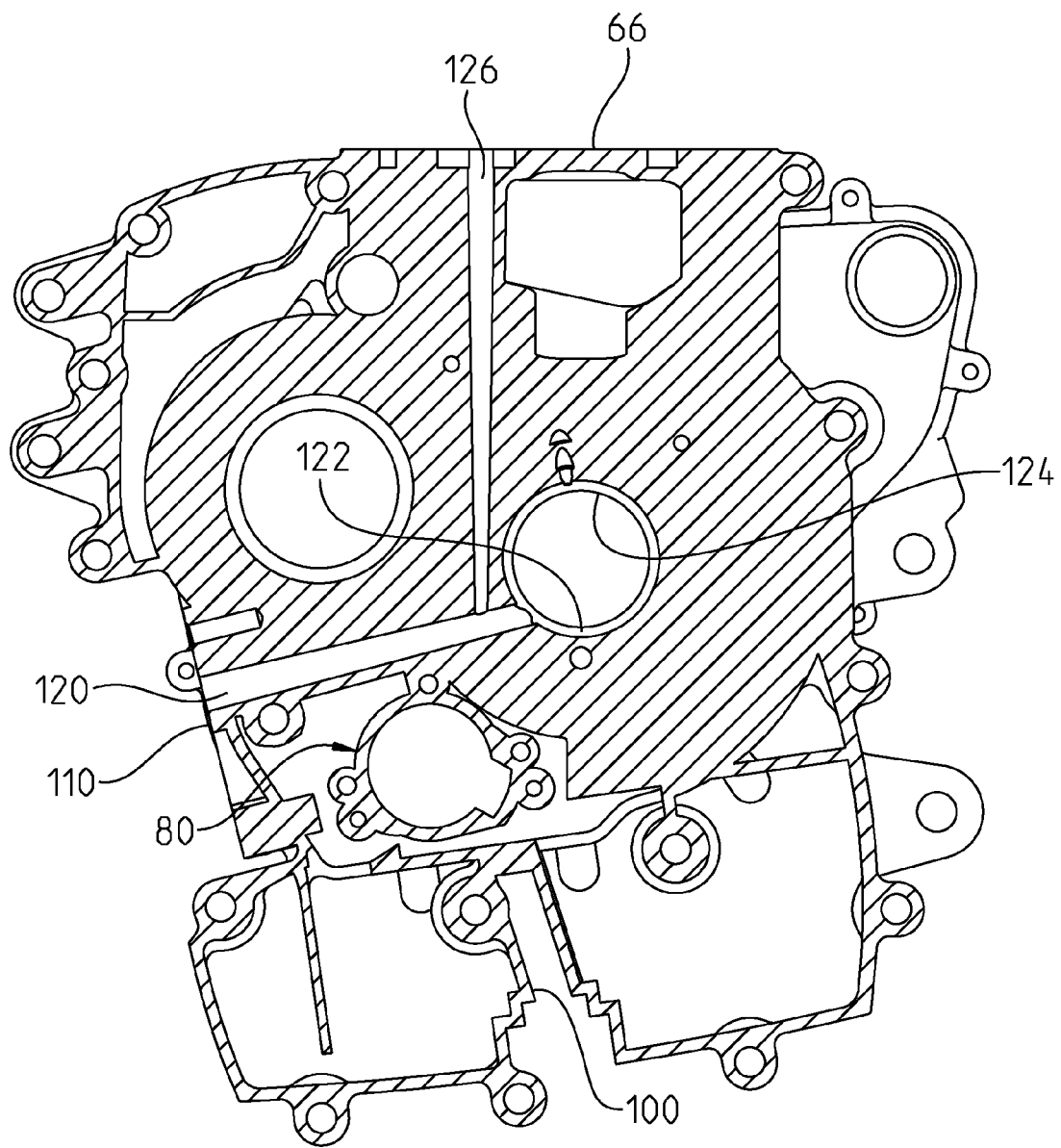
FIG. 10 is a cross-sectional view taken through lines 10-10 of FIG. 6.

With reference now to FIGS. 9 and 10, the integration of the oil pump into crankcase portion 18 will be described. As shown in FIG. 9, duct 84 and inlet 86 are shown in cross-section which shows the definition of an oil passage way 100 leading into a pump inlet chamber 102. A pump outlet chamber 104 discharges into passageway 106 through face 110. As shown in FIG. 10, a further passageway 120 extends from face 110 to a groove 122 about an aperture 124. Note that bearing 70 (FIG. 8) is profiled to be positioned in aperture 124. A final passageway 126 extends from passageway 120 to top surface 66, which is in communication with a serpentine slot 128 (see FIG. 8).

With reference again to FIG. 8, the exterior of crankcase portion 18 is provided with a wall 130 which circumscribes bearings 70, 72 and oil pump mount 80. Wall 130 defines a cavity 132 having a front face at 134 having a groove 136 and a plurality of bosses having threaded apertures 138. It should be appreciated that face 134 defines a mounting face for water pump assembly 24 as further described herein. Crankcase portion 18 further includes a mounting wall 140 for starter motor 30, as described herein, and an access opening 142, and mounting aperture 144.

Figure 12:
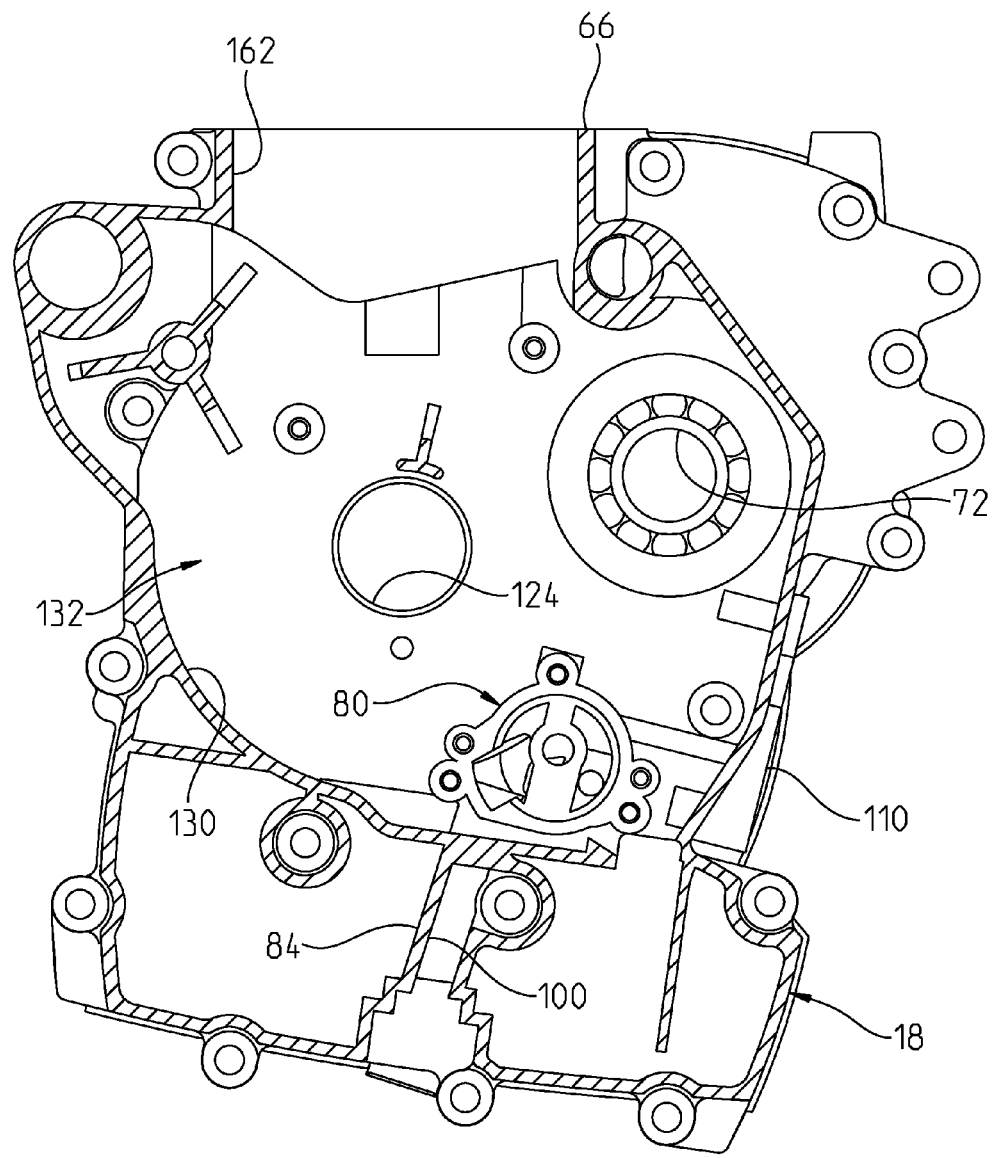
FIG. 12 is a cross-sectional view taken through lines 12-12 of FIG. 6.

With reference to FIGS. 8 and 11, a water input passageway is provided at 150 which extends from mounting face 134 and communicates with channel 152 which opens onto top face 66. With reference to FIGS. 8 and 12, crankcase portion 18 includes a semi-cylindrical opening at 160 (FIG. 8) and a channel at 162. As shown best in FIG. 12, channel 162 opens into cavity 132 and is aligned with aperture 124 as described herein.

Figure 7:
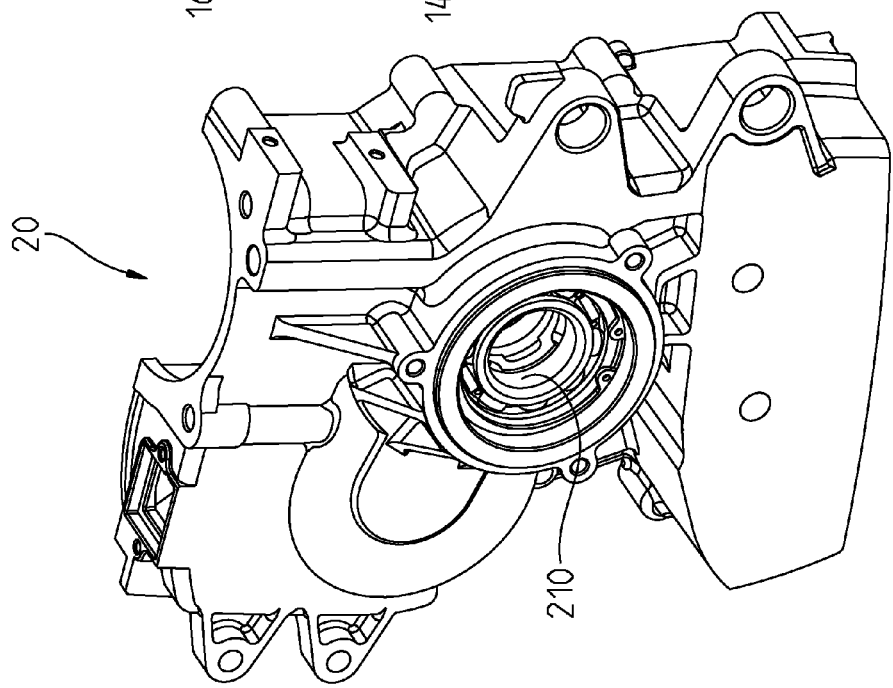

With reference now to FIGS. 6 and 7, crankcase housing portion 20 generally includes a mounting face at 200 having bosses with threaded openings at 202. It should be appreciated that each of the threaded openings 202 is aligned with the openings 62 and that mating face 200 is a mirror image of mating face 60 of crankcase portion 18. Crankcase portion 20 also includes an upper face 206 which is planar with upper face 66 of crankcase portion 18. Crankcase portion 20 includes a roller bearing 210 longitudinally aligned and opposite bearing 70, and a roller bearing 212 longitudinally aligned and opposite roller bearing 72. Finally, crankcase portion 20 includes a semi-cylindrical opening 220 which together with semi-cylindrical opening 160 defines a cylindrical opening for cylinder liner 6 as described herein. It should be appreciated from the above description that all of the crankcase oil and water passages are provided in crankcase portion 18, and that none of the passages are provided in crankcase portion 20.

Figure 13:
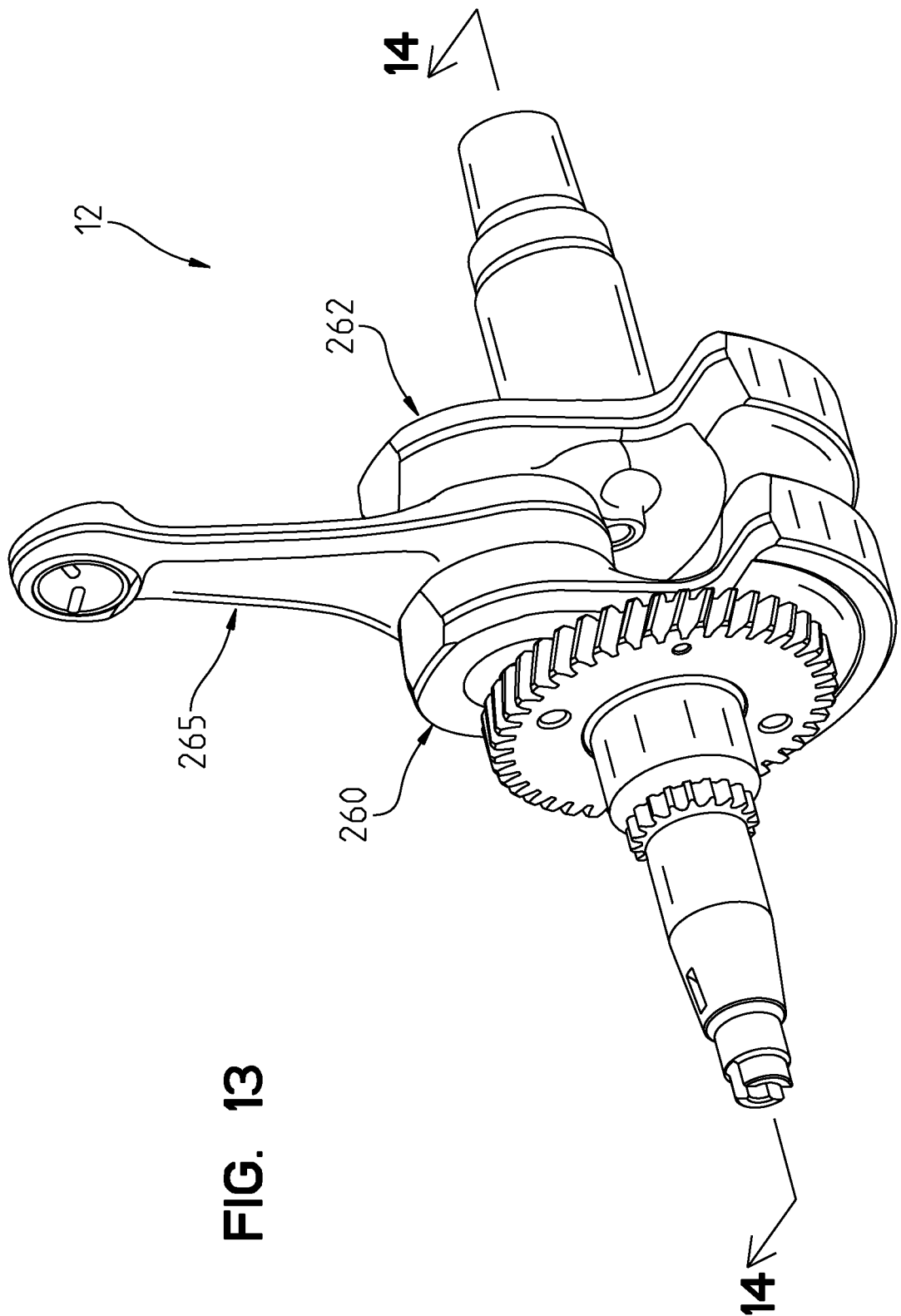
FIG. 13 is a perspective view of the crankshaft and connecting rod assembly.
Figure 14:
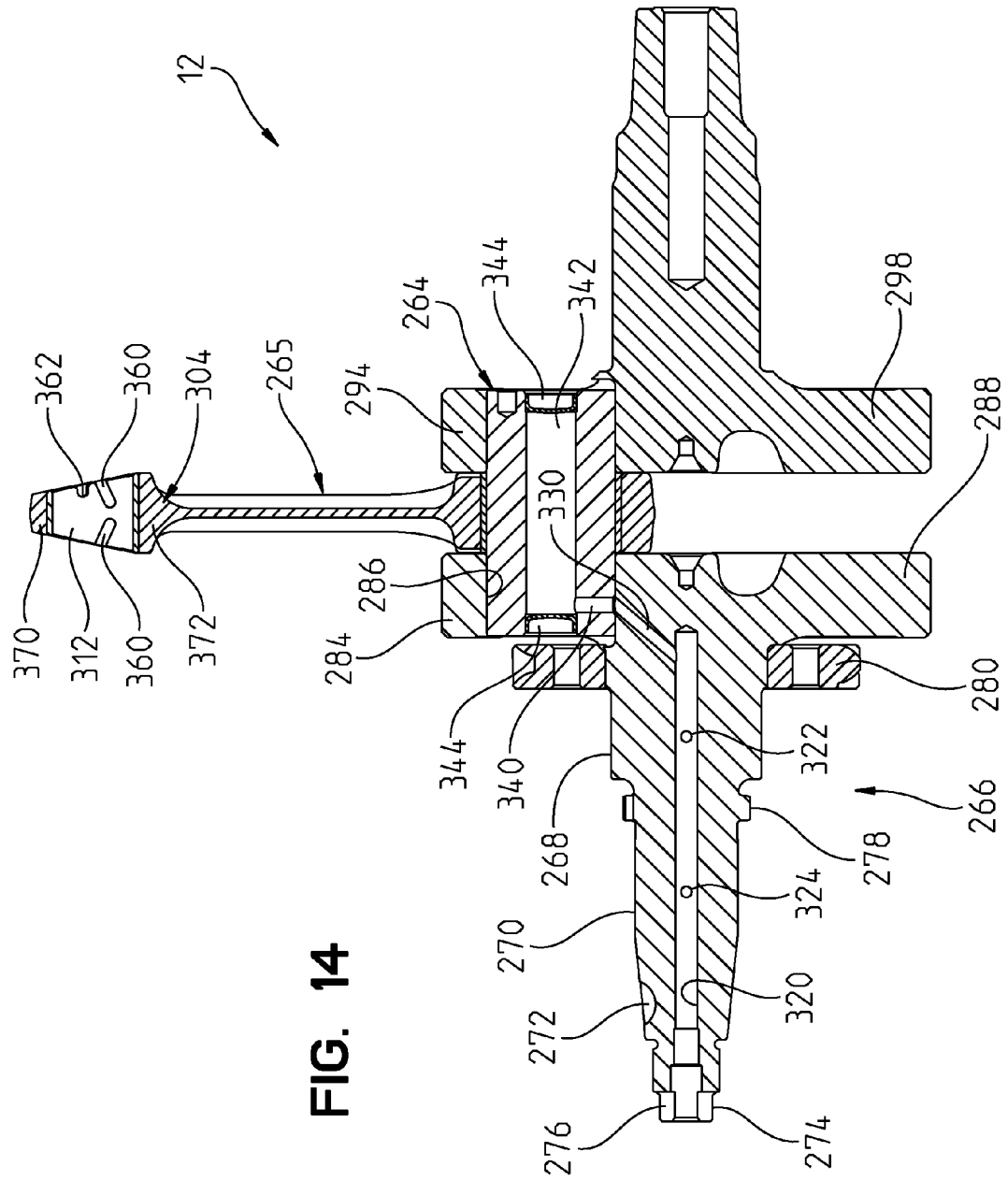
FIG. 14 is a cross-sectional view through lines 14-14 of FIG. 13.
Figure 15:
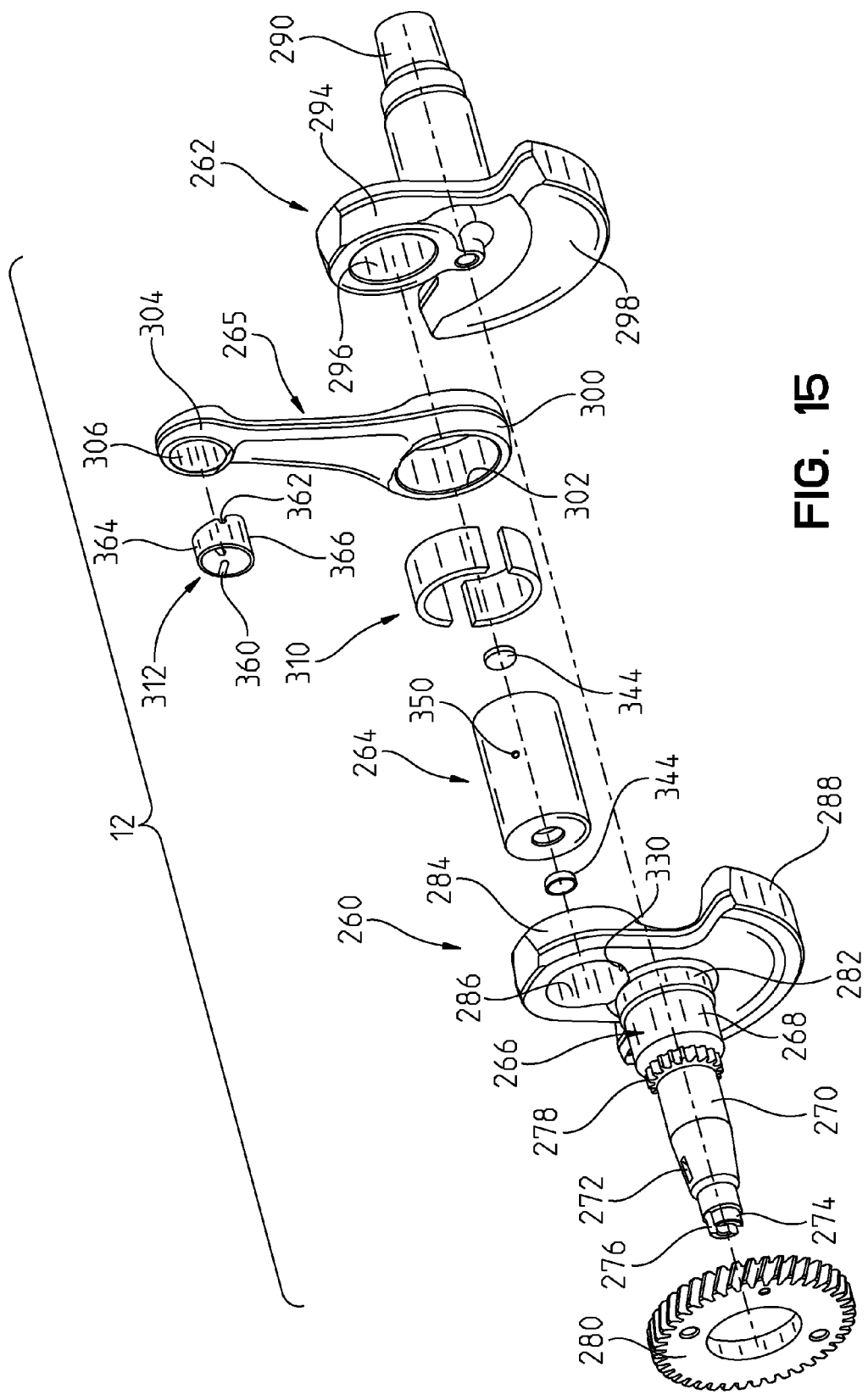
FIG. 15 is an exploded view of the assembly shown in FIG. 13.

With reference now to FIGS. 13-15, crankshaft assembly 12 will be described in greater detail. As shown in FIGS. 13 and 15, crankshaft subassembly is comprised of a first crank portion 260, second crank portion 262, where the two crank portions are coupled together by way of an intermediate press-fit pin 264 (FIGS. 14 and 15). As shown in FIG. 14, crank portion 260 includes a shaft first end 266 having a diameter portion 268, diameter 270, keyway 272, and water pump drive 274 profiled with a groove 276. A cam chain gear 278 is integrally provided between diameters 268, 270, and a drive gear 280 is provided on shaft diameter 282 (FIG. 15). First crank portion 260 is further provided by first offset portion 284 having aperture 286, and counterweight portion 288. In a similar manner, crank portion 262 is provided with a shaft second end 290 having a second offset portion 294 having aperture 296 and counterweight 298.

As shown in FIG. 15, connecting rod 265 includes a first end 300 having aperture 302, and second end 304 having aperture 306. It should be appreciated that split bearing 310 is received in aperture 302 and over pin 264. As shown in FIG. 15, a sleeve bushing 312 is provided, which is positioned in aperture 306 as described herein.

As shown best in FIG. 14, first end 266 includes a longitudinally extending oil passageway 320 having a passageway 322 communicating with surface 268, passageway 324 communicating with surface 270 and passageway 330 which communicates with aperture 286. Pin 264 includes passageway 340 which aligns with passageway 330 and opens into internal volume 342 of pin 264. Pin 264 includes end caps 344 to close the internal volume 342. Pin 264 further includes passageway 350 (see FIG. 15) which is positioned between the offset portions 284, 294 of crank portions 260, 262, which as should be appreciated, is aligned with split bearing 310.

With reference again to FIGS. 14 and 15, sleeve bearing 312 is comprised of grooves 360 and markings in the form of notches 362. As best shown in FIG. 14, both sleeve 312 and connecting rod second end 304 are tapered such that the sleeve has a narrow top portion 364 (FIG. 15) and a widened lower portion 366. In a similar manner, connecting rod second end 304 has a narrow top portion 370 and a widened lower portion 372 (FIG. 14). Markings allow one to see the alignment of the sleeve bearing relative to the connecting rod during assembly, and as the markings are slots, allows the facilitation of the rotational positioning of the bushing. That is a tool can grip the notches 362 and assure that the sleeve bearing is inserted in its proper rotational orientation.

Figure 16:
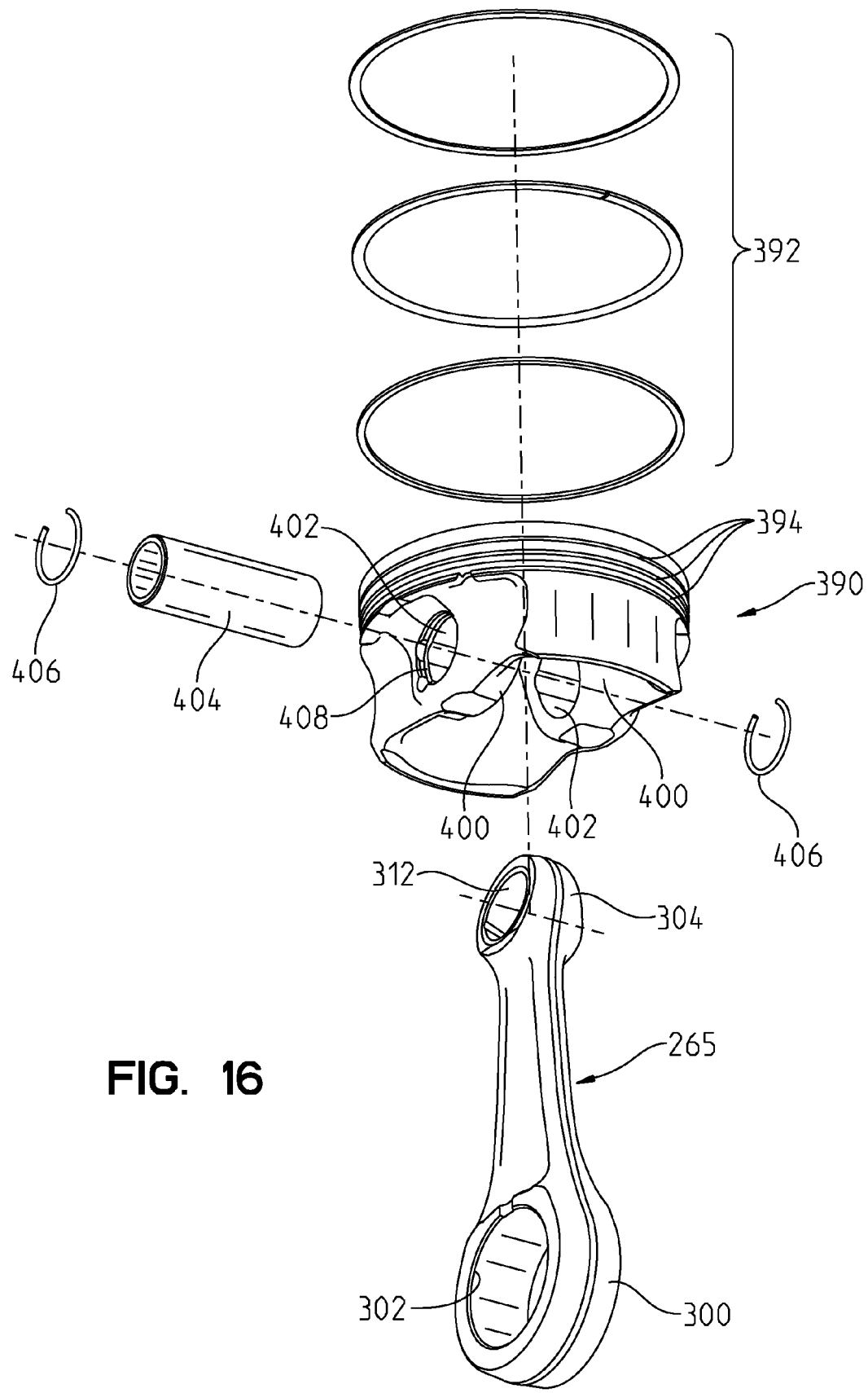
FIG. 16 is an exploded view of the connecting rod and piston assembly.
Figure 17:
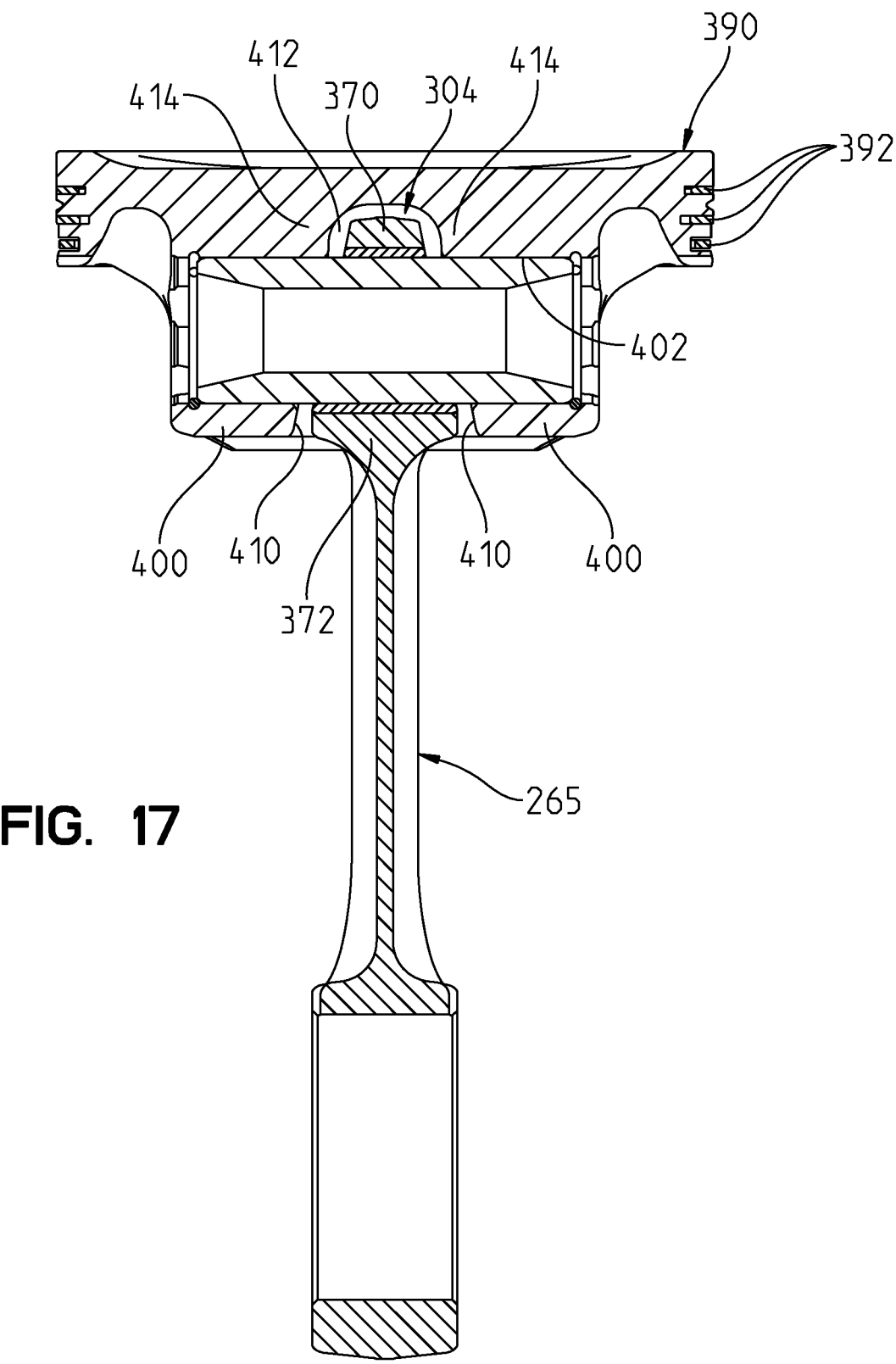
FIG. 17 is a cross-sectional view of the piston and connecting rod of FIG. 16 in an assembled configuration.

With reference now to FIGS. 16 and 17, piston 390 is shown having a plurality of piston rings 392 provided in complementary grooves 394 as is known by those skilled in the art. Piston 390 further includes integral support areas 400 providing apertures 402 for receiving pin 404. As is also known in the art, snap rings 406 are provided which are received in complementary grooves 408 for retaining the pin 404 in position. As best shown in FIG. 17, support portions 400 define tapered surfaces 410, tapering inwardly and upwardly in order to provide a complementary receiving opening 412 to receive second end 304 of connecting rod 265. The reduced mass of the connecting rod 265 (by way of the tapered end 304) allows extra mass to be added to the piston to structurally rigidify the piston upper end, for example, at the upper end at the positions shown at 414.

Figure 18A:
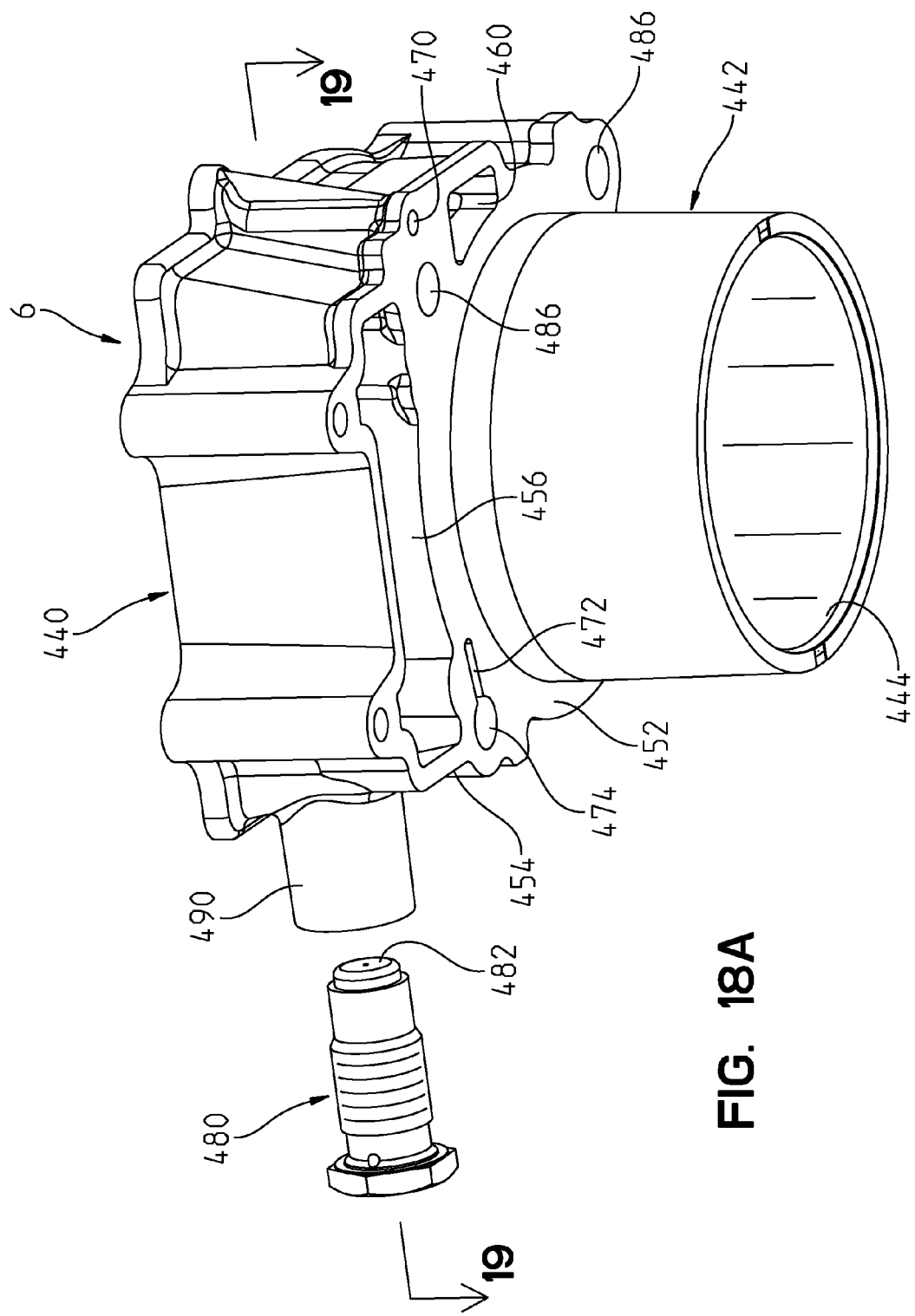
FIG. 18A is an underside perspective view of the cylinder liner.
Figure 18B:
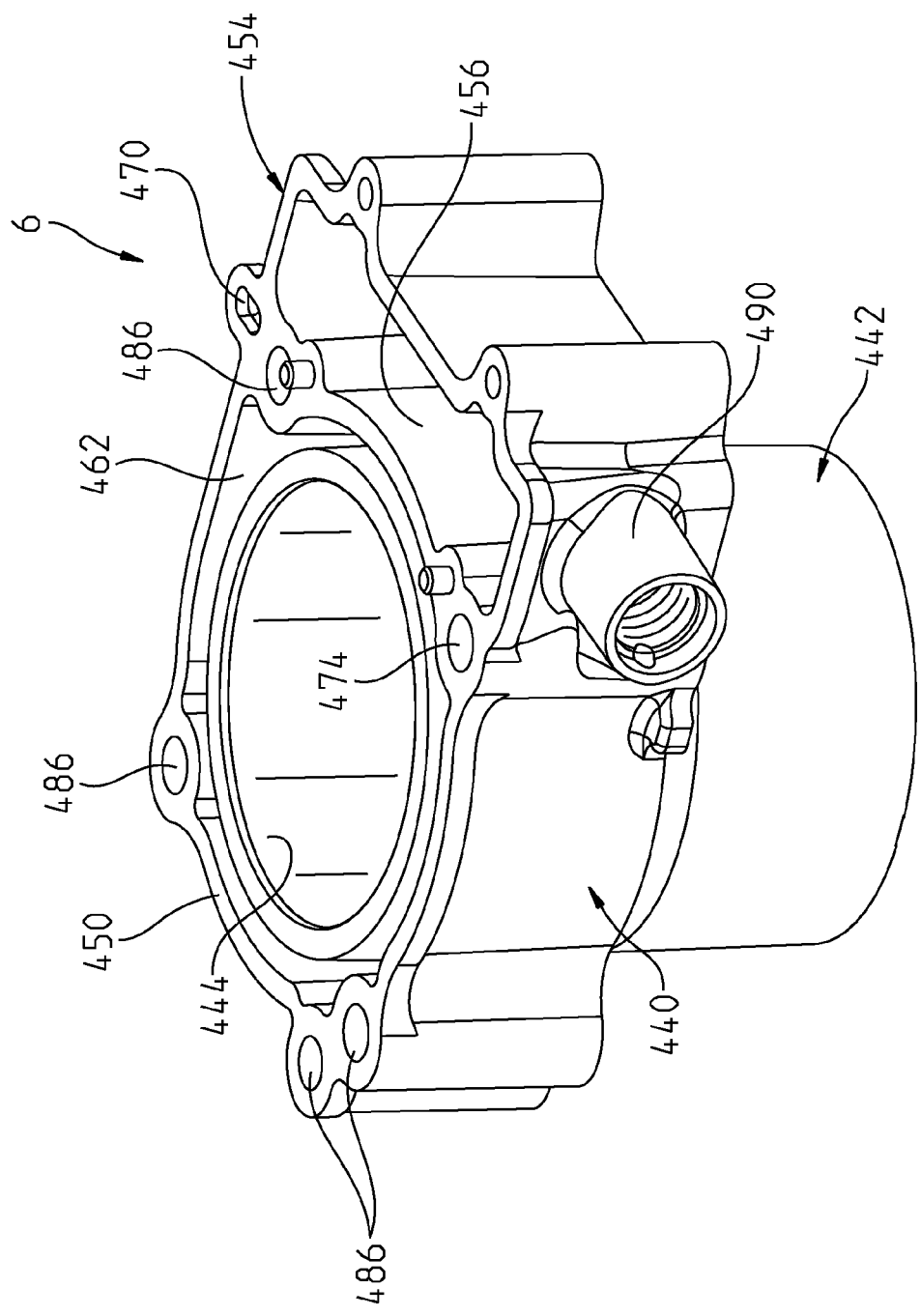
FIG. 18B is an top perspective view of the cylinder liner.
Figure 19:
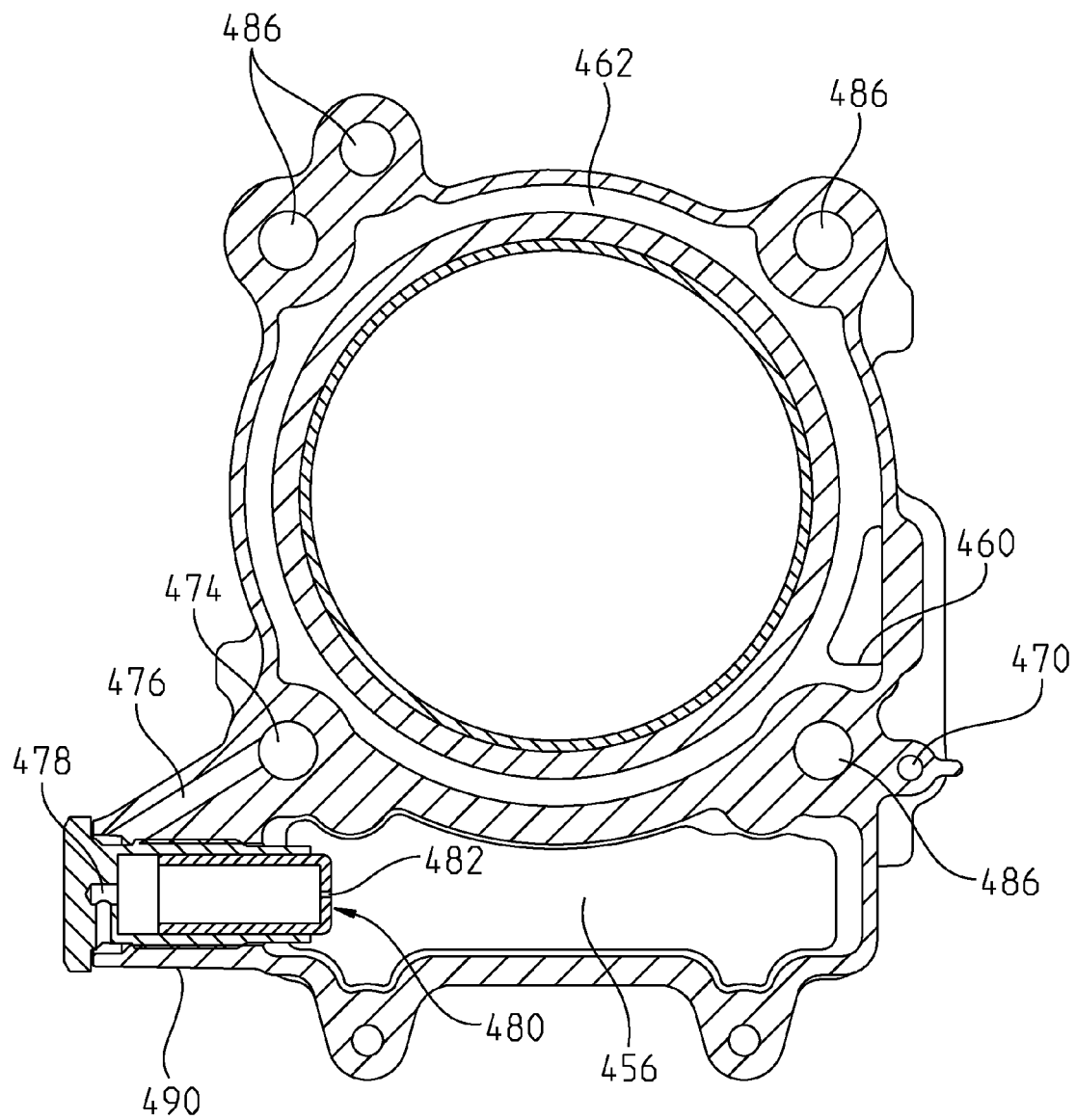
FIG. 19 is a cross-sectional view through lines 19-19 of FIG. 18A.

With reference now to FIGS. 18A and 18B, cylinder liner 6 will be described in greater detail. As shown, cylinder liner 6 includes an upper portion 440 and an extension portion 442 which define a cylinder wall 444 as described herein. Upper portion 440 includes an upper surface 450 (FIG. 18B) and a lower surface 452 (FIG. 18A). An extension 454 is provided defining a chain receiving channel 456 therein. As shown in FIG. 18A, lower surface 452 has a water inlet opening at 460 which opens into channel 462 (FIG. 18B) which encircles cylinder wall 444. An oil passageway 470 also extends between lower surface 452 (FIG. 18A) to upper surface 450 (FIG. 18B). Groove 472 (FIG. 18A) is also provided which communicates with opening 474. As shown best in FIG. 19, aperture 474 communicates with passageway 476 which in turn communicates with passageway 478 of injector 480. Injector 480 includes an injector nozzle 482 as described herein. Apertures 486, in addition to aperture 474, are used to interconnect cylinder liner 6 with crankcase 4 as further described herein. Liner 6 also includes coupling 490 which communicates with channel 456 and receives injector 480 as best shown in FIG. 19.

Figure 20A:
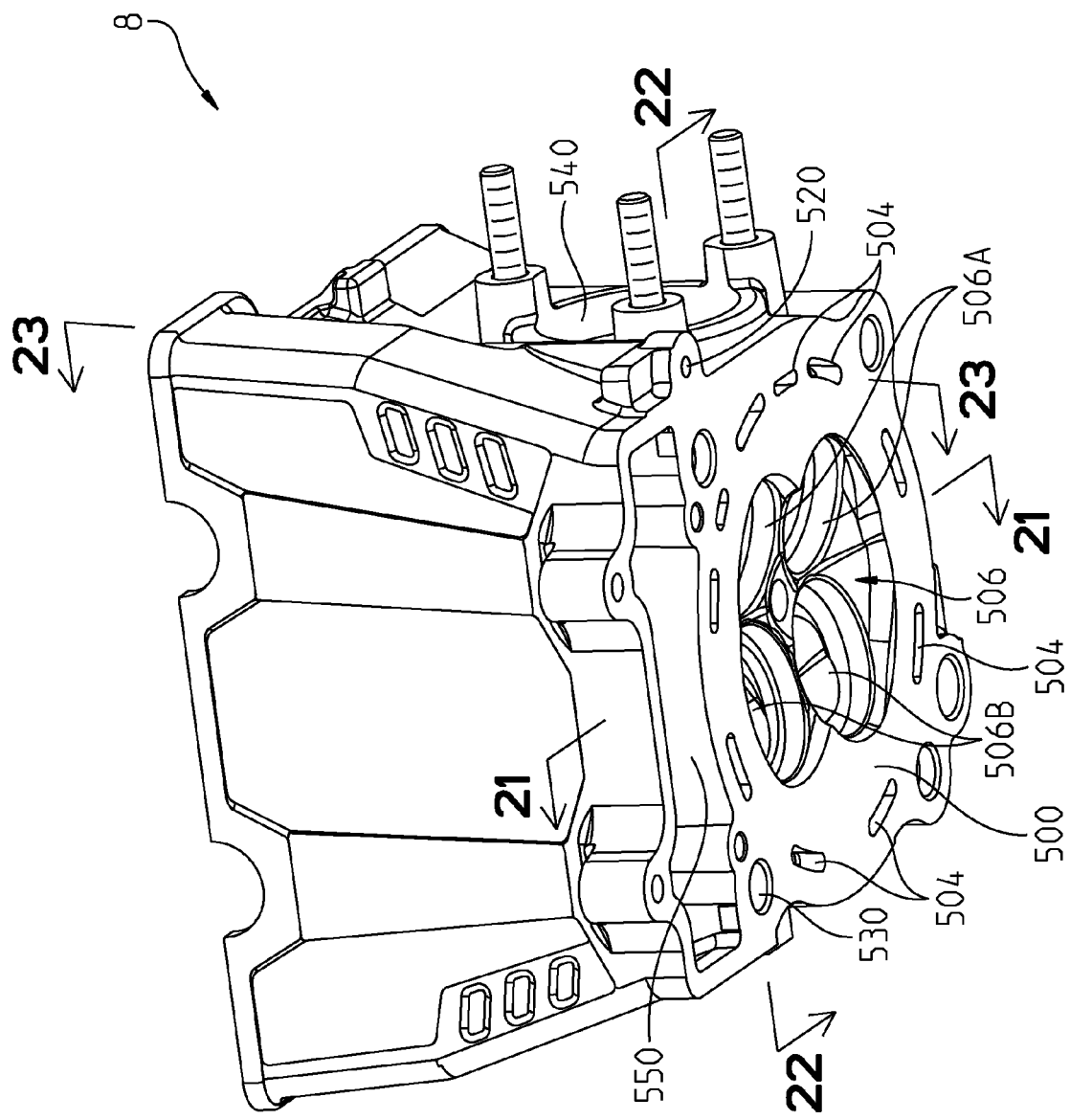
FIG. 20A is an underside perspective view of the head assembly.
Figure 20B:
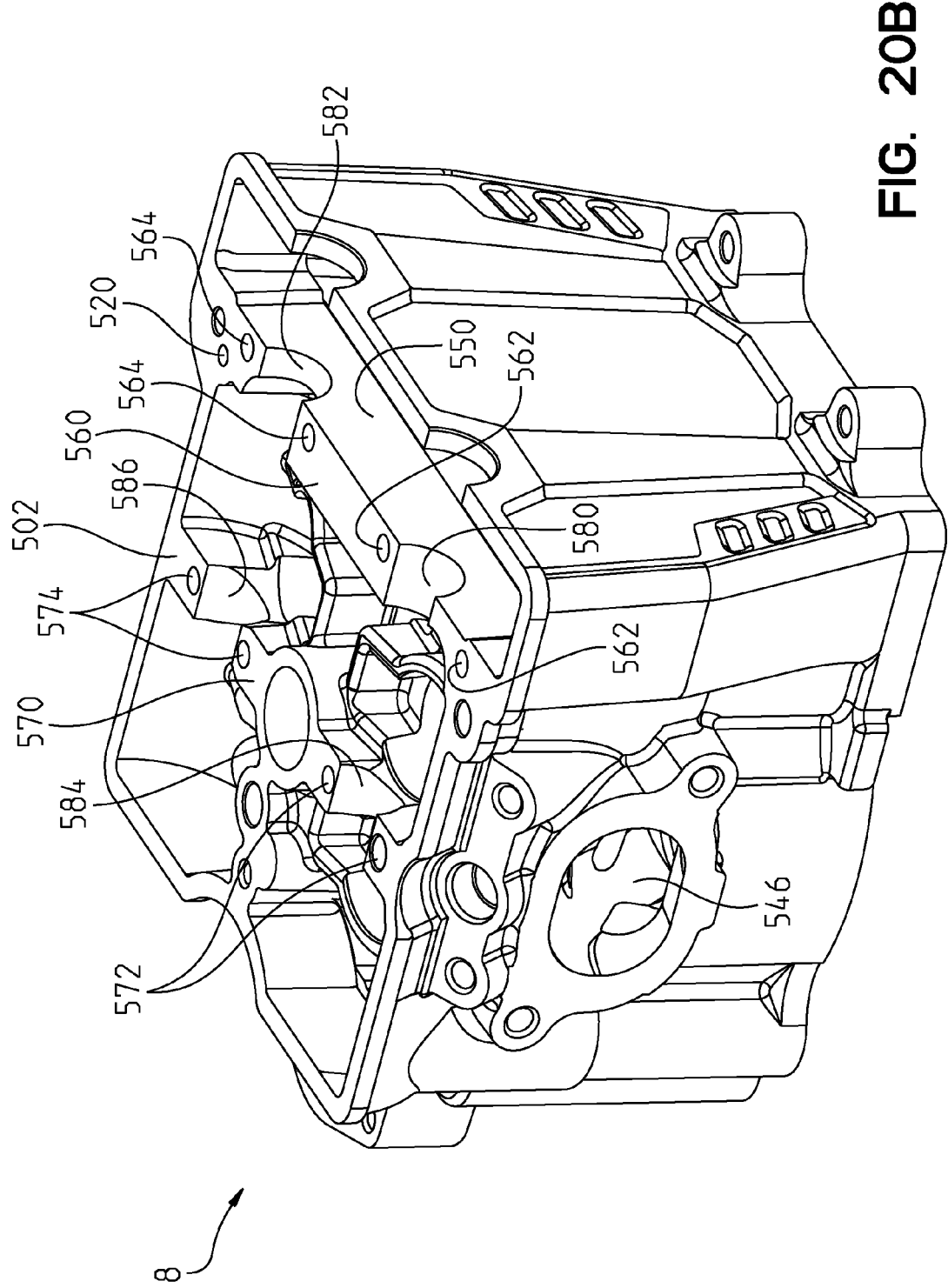
FIG. 20B is an upper perspective view of the head assembly.
Figure 21:
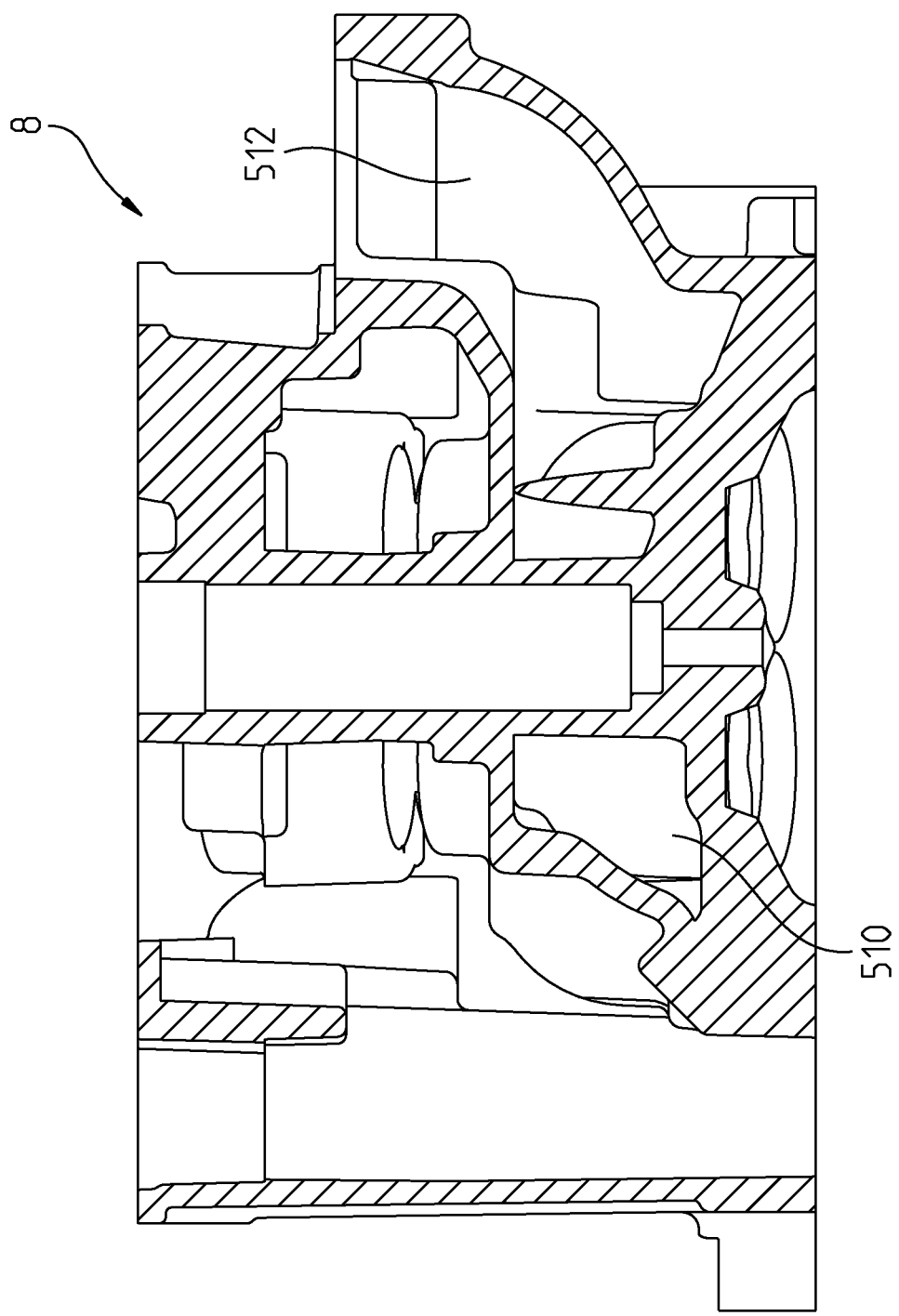
FIG. 21 is a cross-sectional view through lines 21-21 of FIG. 20A.
Figure 22:
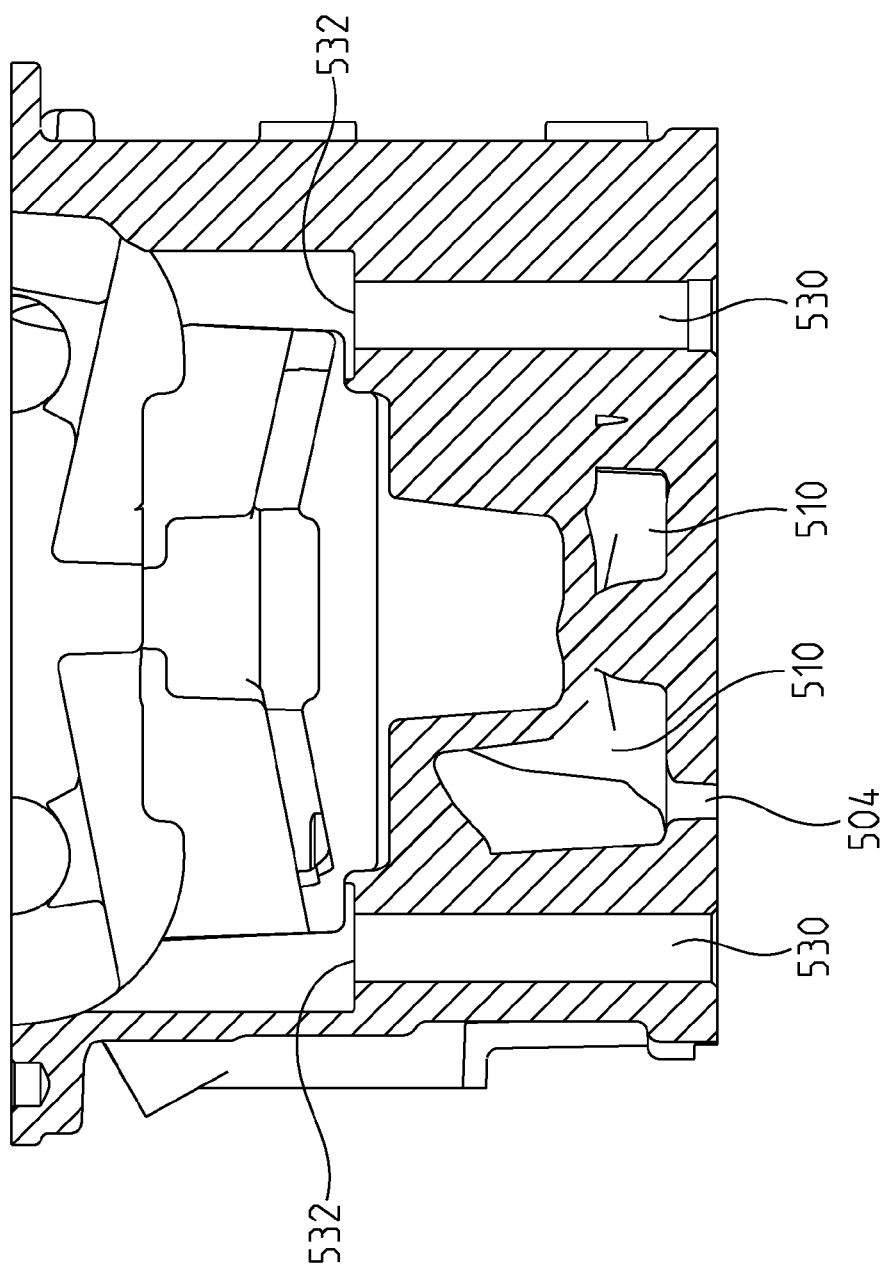
FIG. 22 is a cross-sectional view through lines 22-22 of FIG. 20A.
Figure 23:
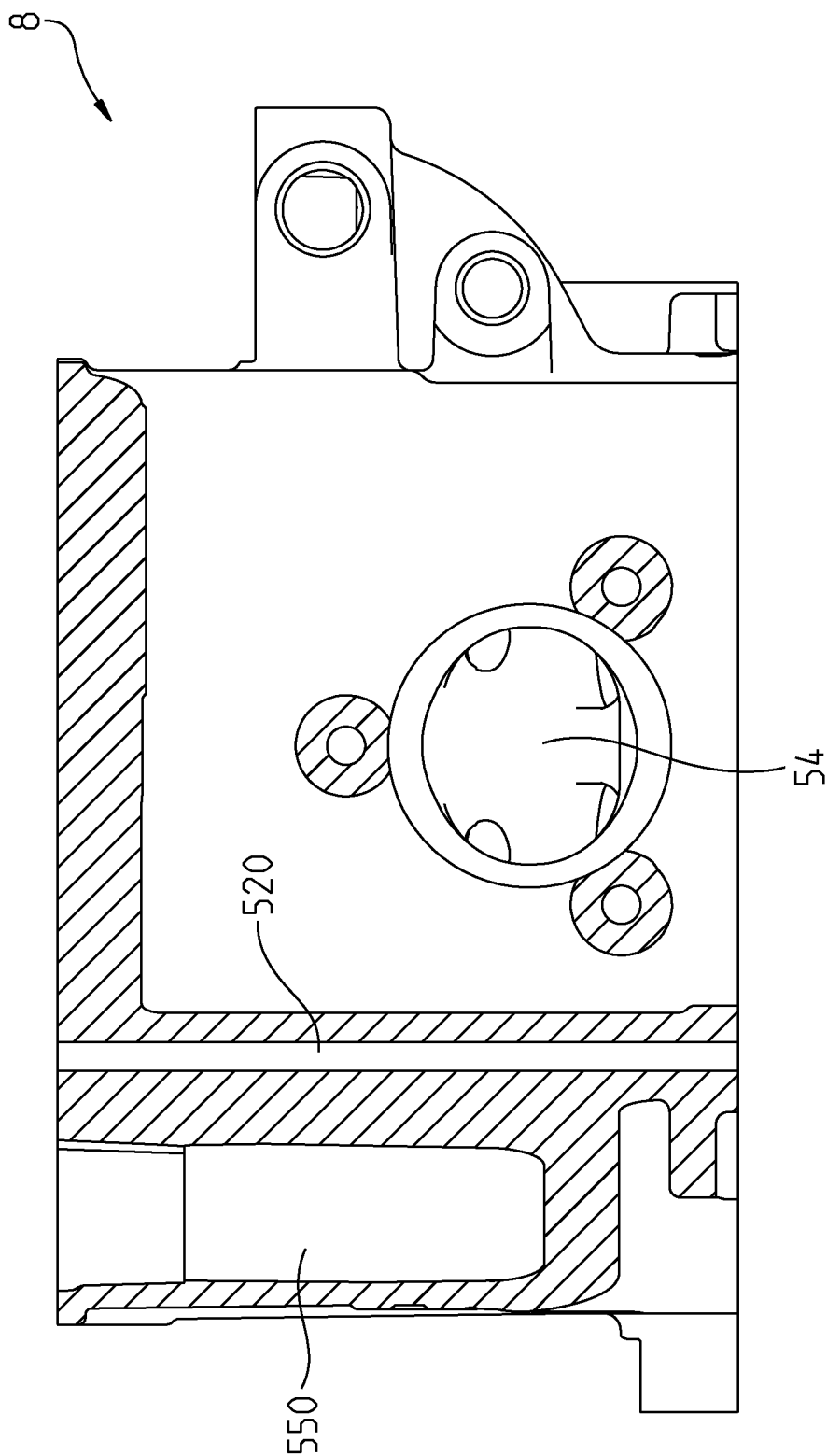
FIG. 23 is a cross-sectional view through lines 23-23 of FIG. 20A.

As shown in FIG. 20A, head assembly 8 includes a lower surface at 500 and an upper surface 502 as shown in FIG. 20B. A plurality of water inlet slots 504 are provided which encircle valves 506 (exhaust valves 506A and air inlet valves 506B) and which open into a cavity 510 (see FIG. 21). Cavity 510 encircles the head assembly 8 and is in communication with a water outlet at 512. As shown best in FIG. 20A, an oil inlet aperture is provided at 520 which extends between lower surface 500 and upper surface 502 as shown in FIG. 20B. Apertures 530 (FIG. 20A) are provided for mounting head assembly 8 to liner 6, but apertures do not extend through the top surface 502 of head assembly 8, but rather terminate internally of head assembly 8, for example as shown best in FIG. 22, where a machined top surface 532 is provided to receive fasteners such as washers and fastening nuts, as further described herein.

As shown in FIG. 20A, an exhaust port 540 is provided opposite exhaust valves 506A, and as shown in FIG. 20B, an air intake port 546 is provided opposite intake valves 506B (FIG. 20A). A chain receiving channel 550 is also provided which, aligns with channel 456 (FIG. 18B). Channel 550 is defined in part by wall 560 (FIG. 20B) having mounting apertures at 562 and 564. An intermediate wall 570 is provided having mounting apertures 572 and 574. Walls 560 and 570 also include semi-cylindrical surfaces 580, 582, 584, and 586. It should be appreciated that the receiving areas 580 and 584 receive the overhead cam for the air intake valves and the receiving areas 582 and 586 receive the overhead cam for the exhaust valves.

Figure 24:
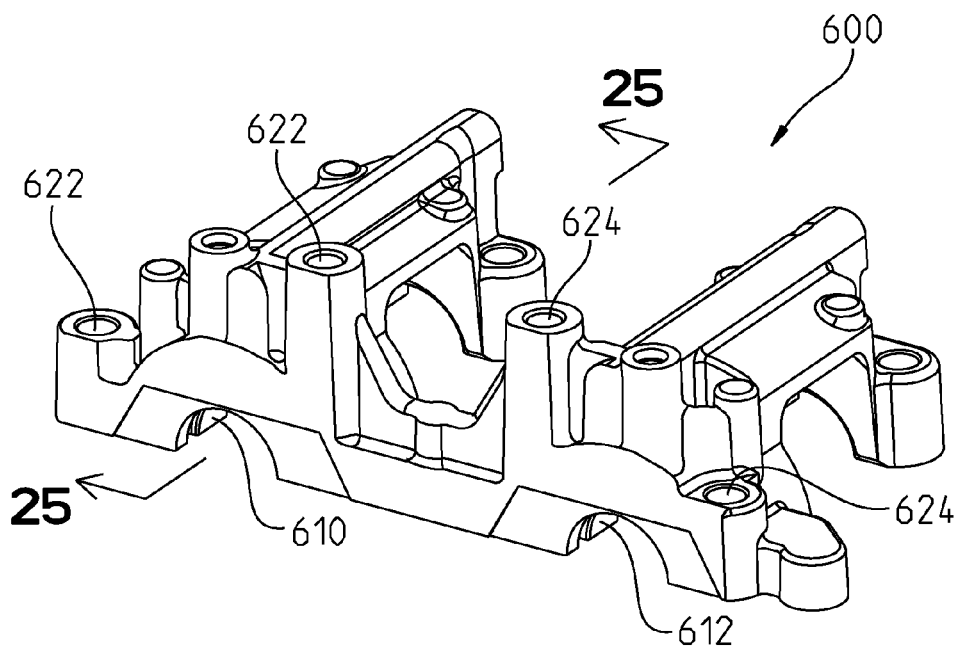
FIG. 24 is a perspective view of the cam shaft retainer.
Figure 25:
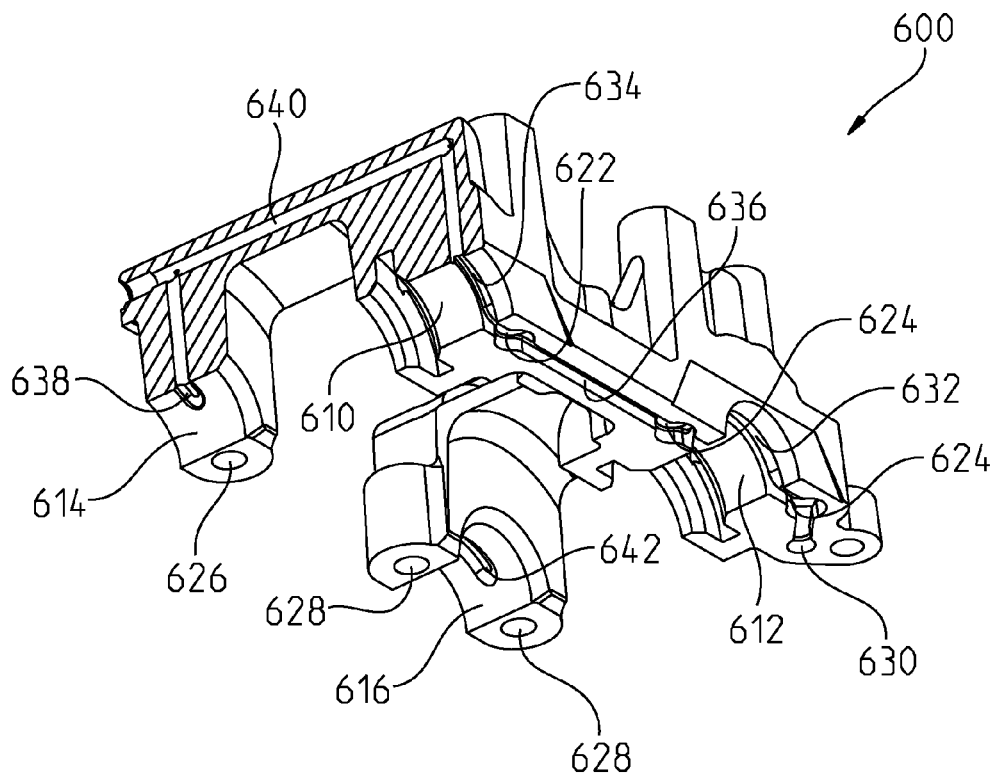
FIG. 25 is a cross-sectional view through lines 25-25 of FIG. 24.

With reference now to FIGS. 24 and 25, a cam retainer 600 is shown. As shown best in FIG. 25, cam retainer 600 includes semi-cylindrical areas 610, 612, 614, and 616, which as should be appreciated overlaps semi-cylindrical receiving areas 580, 582, 584, and 586, (FIG. 20B) respectively, to define a cylindrical receiving area for encapsulating overhead cams, as further described herein.

As shown in FIGS. 24 and 25, cam retainer 600 also includes apertures 622 which align with apertures 562 (FIG. 20B); apertures 624 which align with apertures 564 (FIG. 20B); apertures 626 which align with apertures 572 and apertures 628 which align with apertures 574 (FIG. 20B). As also shown, retainer 600 includes a channel 630 which aligns with aperture 520 (FIG. 20B) and is in fluid communication with groove 632 which extends around receiving area 612. Channel 632 communicates with a channel 634 by way of passageway 636. Channel 638 communicates with channel 634 by way of a passageway 640. Passageway 642 communicates with passageway 632 in a similar manner as passageway 640, although not shown.

Figure 26:
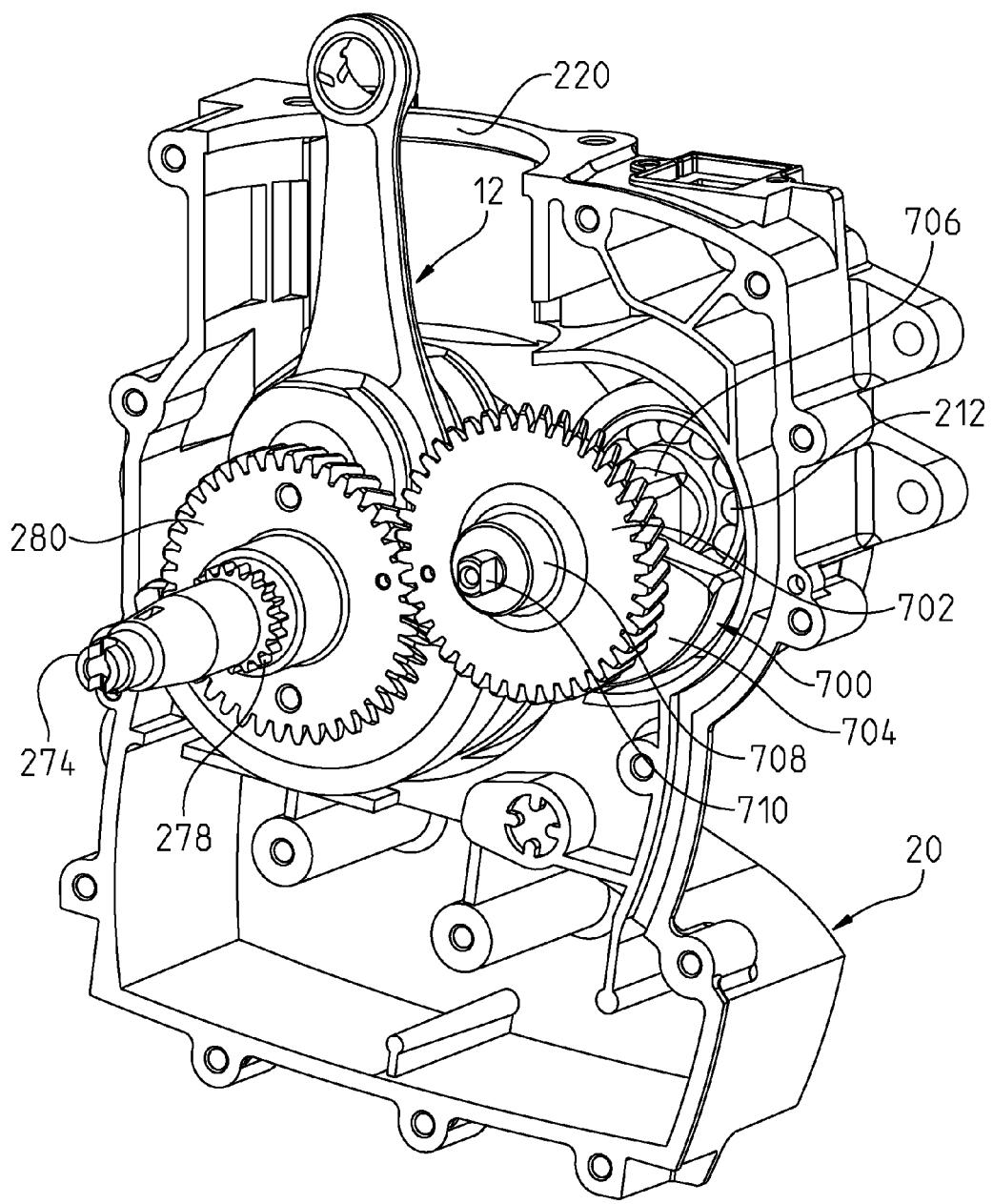
FIG. 26 is a perspective view showing the crankshaft and counter-balance shaft in an assembled condition in one of the crankcase portions.

With reference now to FIG. 26, multiple subassemblies will now be described. With reference first to FIG. 26, crankshaft subassembly 12 is shown mounted within crankcase portion 20 along with a counterbalance shaft 700. Counterbalance shaft 700 includes gear 702 in meshing engagement with gear 280 on crankshaft subassembly, and further includes counterweight 704, shaft 706 positioned in roller bearing 212, a bearing portion 708 and a drive portion 710. As shown, shaft 706 has a square cross section to increase the stiffness and reduce the deflection.

Figure 27:
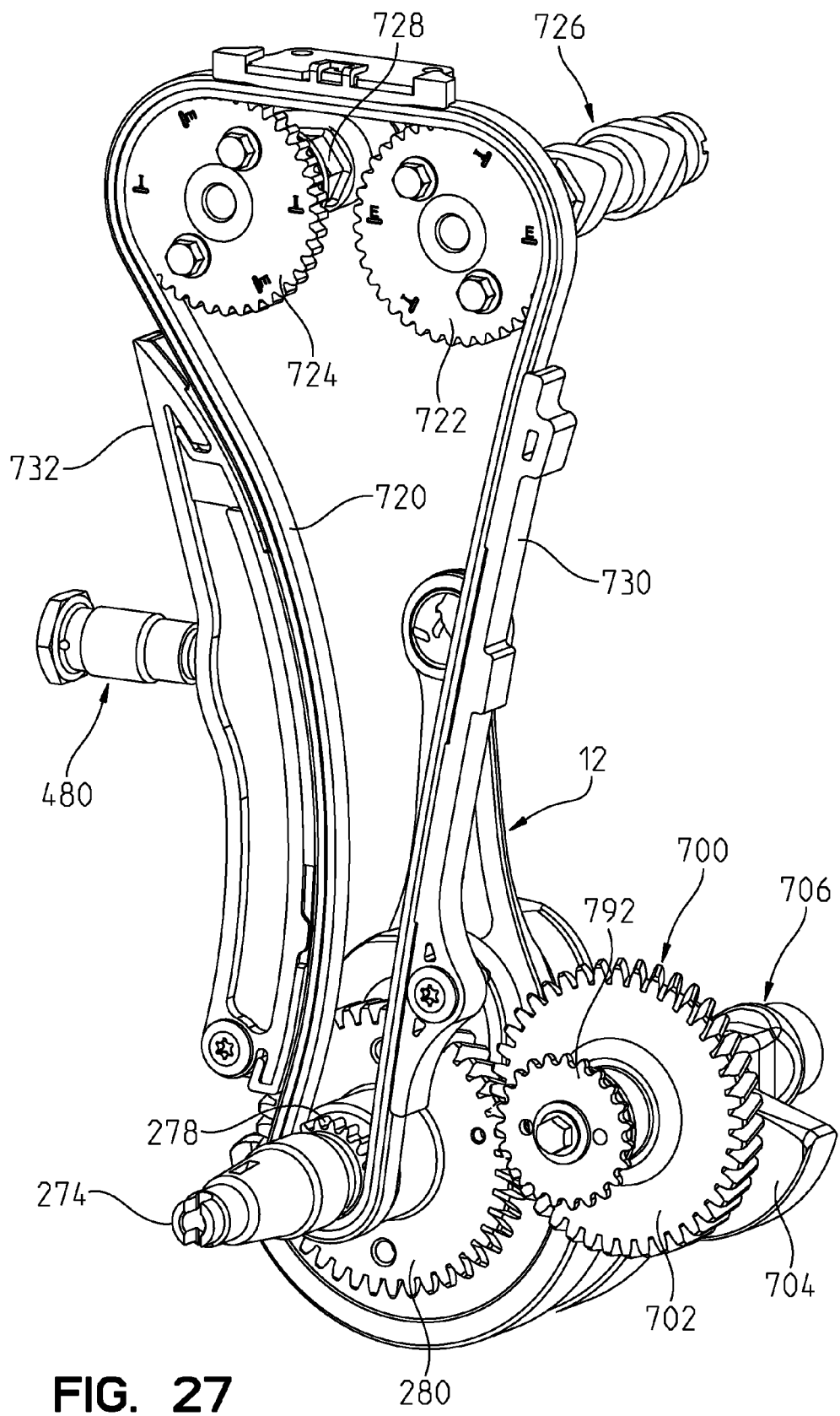
FIG. 27 shows the drive train assembly between the crankshaft and the double overhead cams.

With reference now to FIG. 27, crankshaft subassembly 12 and counterbalance shaft 700 are shown in meshing engagement, together with cam chain 720 in meshing engagement with gear 278. Cam chain 720 is in meshing engagement with upper gears 722 and 724; where gear 722 drives exhaust cam 726 and where gear 724 drives air intake cam 728. Retainers 730 and 732 are shown which keep the chain at the proper tension as well as insure that the chain is wrapped around the associated gears. Injector 480 is also shown (see also FIG. 18A) which provides lubrication to the retainer and to chain 720, as discussed above.

Figure 28:
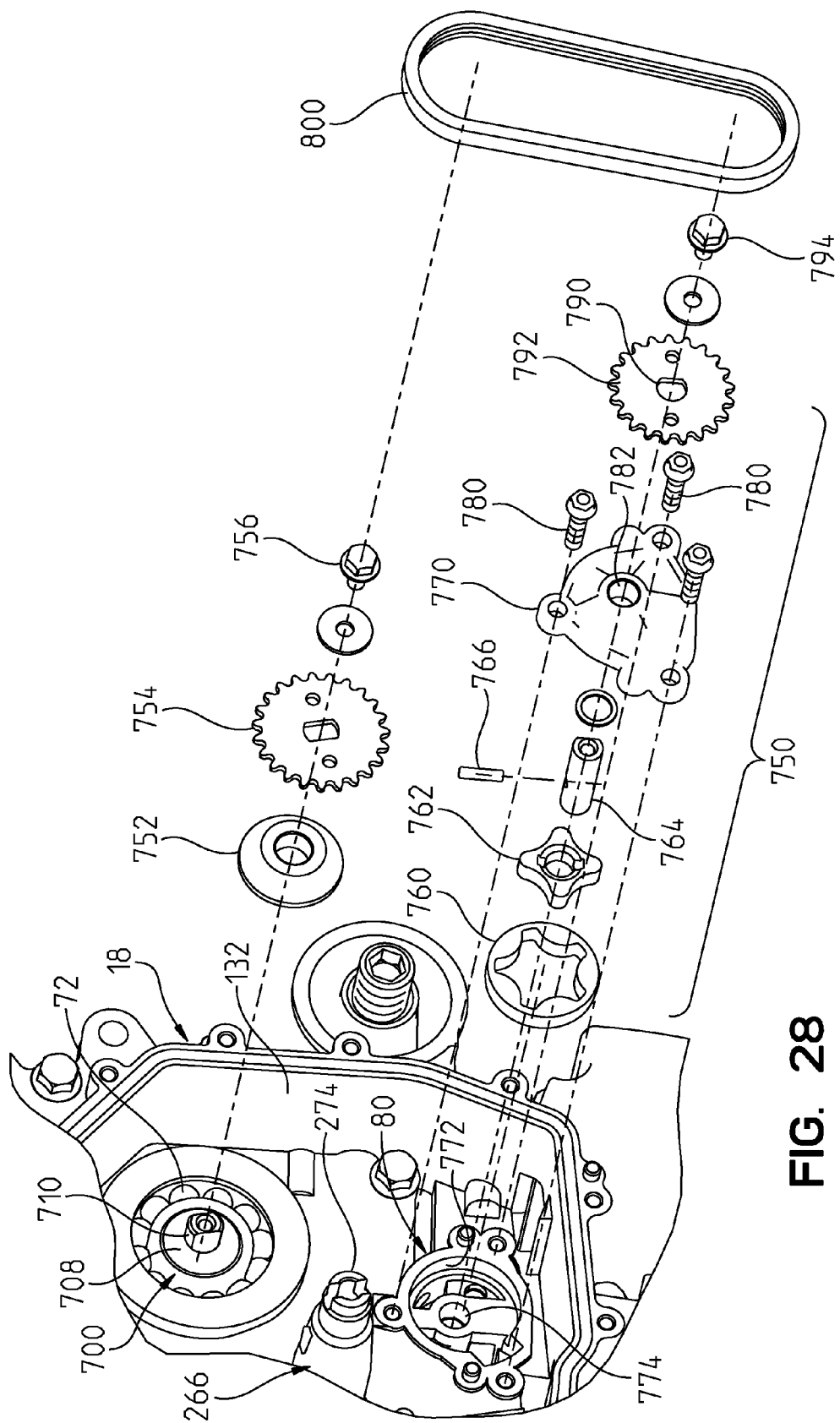
FIG. 28 shows an exploded view of the oil pump assembly.

With reference now to FIG. 28, an oil pump assembly 750 is shown poised for receipt within oil pump mounting portion 80 of crankcase portion 18. As shown in FIG. 28, the drive end 710 (of counterbalance shaft 700) and drive end 274 (of crankshaft assembly 12) protrude through crankcase portion 18 and are positioned within cavity 132. A seal 752 is positioned over bearing 72 and sprocket 754 is positioned over drive end 710 and fixed in place by a fastener such as 756.

Oil pump assembly 750 is comprised of outer rotor 760, inner rotor 762, pump shaft 764 having cross pin 766 and pump housing 770. It should be appreciated that outer rotor 760 may be positioned within inner diameter 772 of mounting portion 80. Inner rotor 762 is also positioned within outer rotor 760 and shaft 764 is positioned in opening 774.

Figure 29:
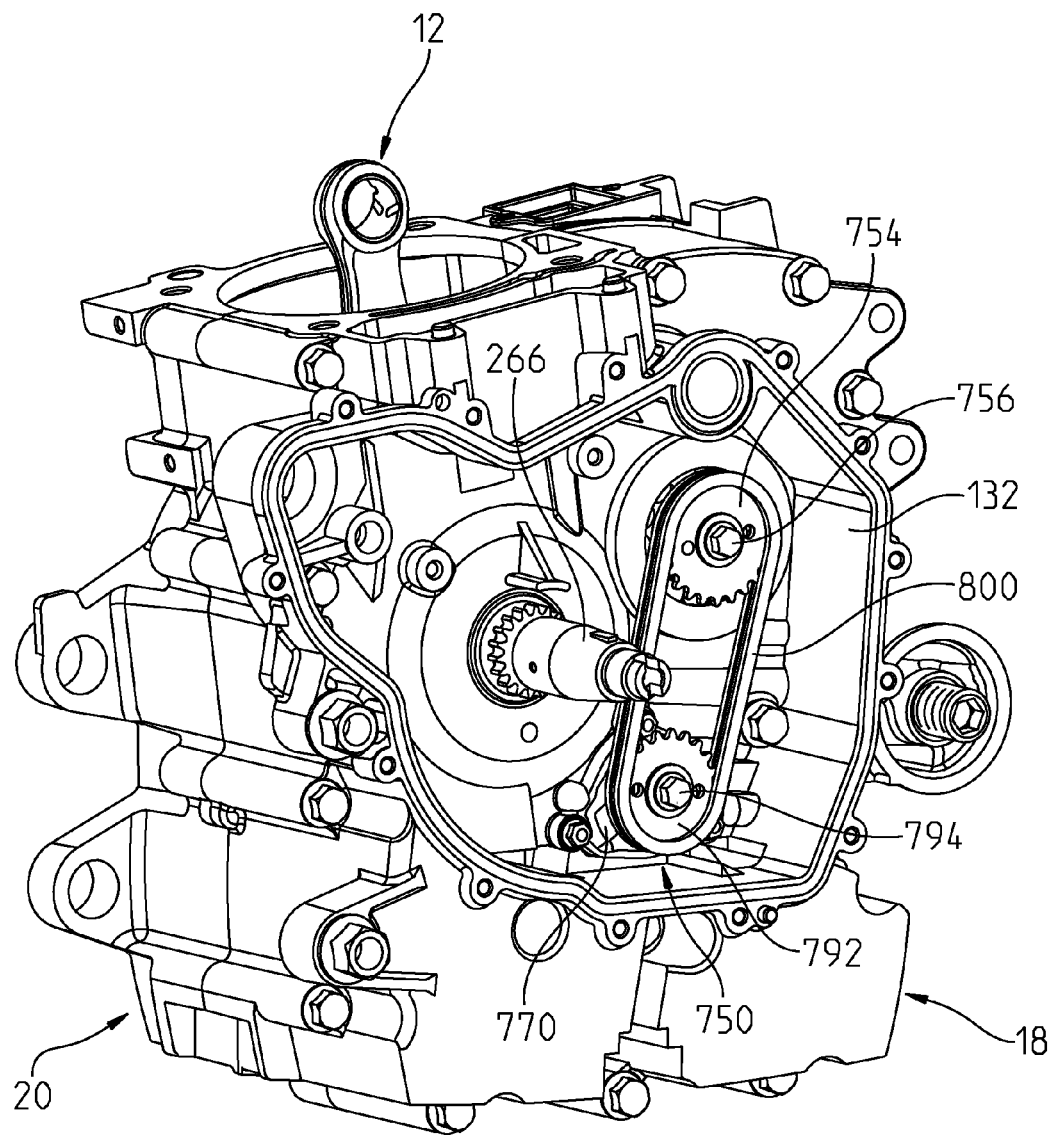
FIG. 29 shows the oil pump assembly of FIG. 28 in an assembled condition.

Housing 770 is interconnected to mounting portion 80 by way of fasteners 780. It should be appreciated that a portion of shaft 764 extends through opening 782 of housing 770 and the extending portion has a D-shaped cross section which matches with a complementary opening 790 on sprocket 792. Sprocket 792 is held in place by way of fastener 794 threadably received in the end of shaft 764. It should be appreciated that a chain such as 800 is entrained around sprockets 754 and 792 to drive inner rotor 762. Thus, it should be appreciated that the inner rotor 762 of the oil pump 750 is driven by the rotation of the crankshaft assembly 12 through counterbalance shaft 700. The assembled oil pump assembly is shown in FIG. 29 assembled to crankcase portion 18.

Figure 30:
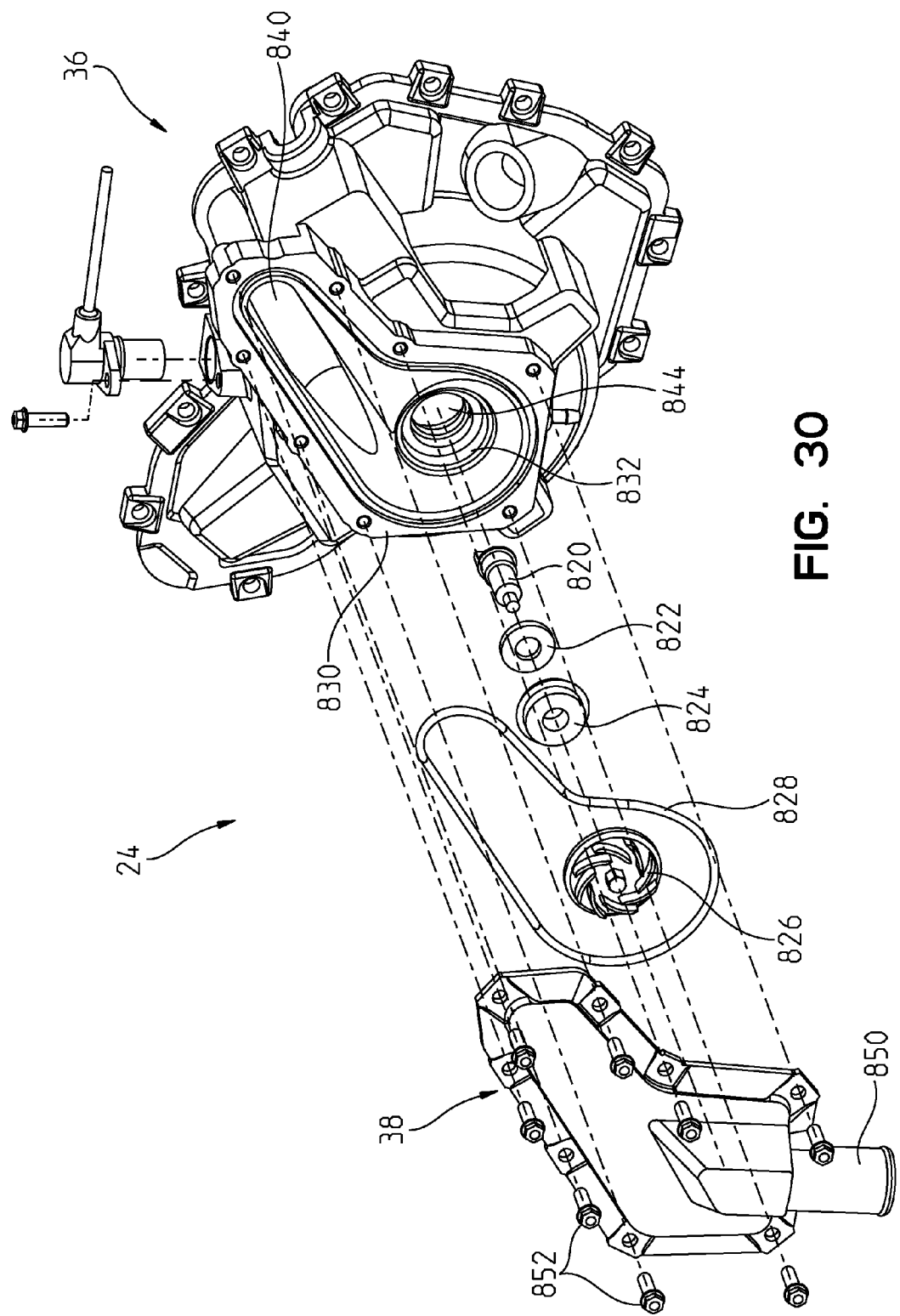
FIG. 30 shows an exploded view of the water pump assembly.
Figure 31A:
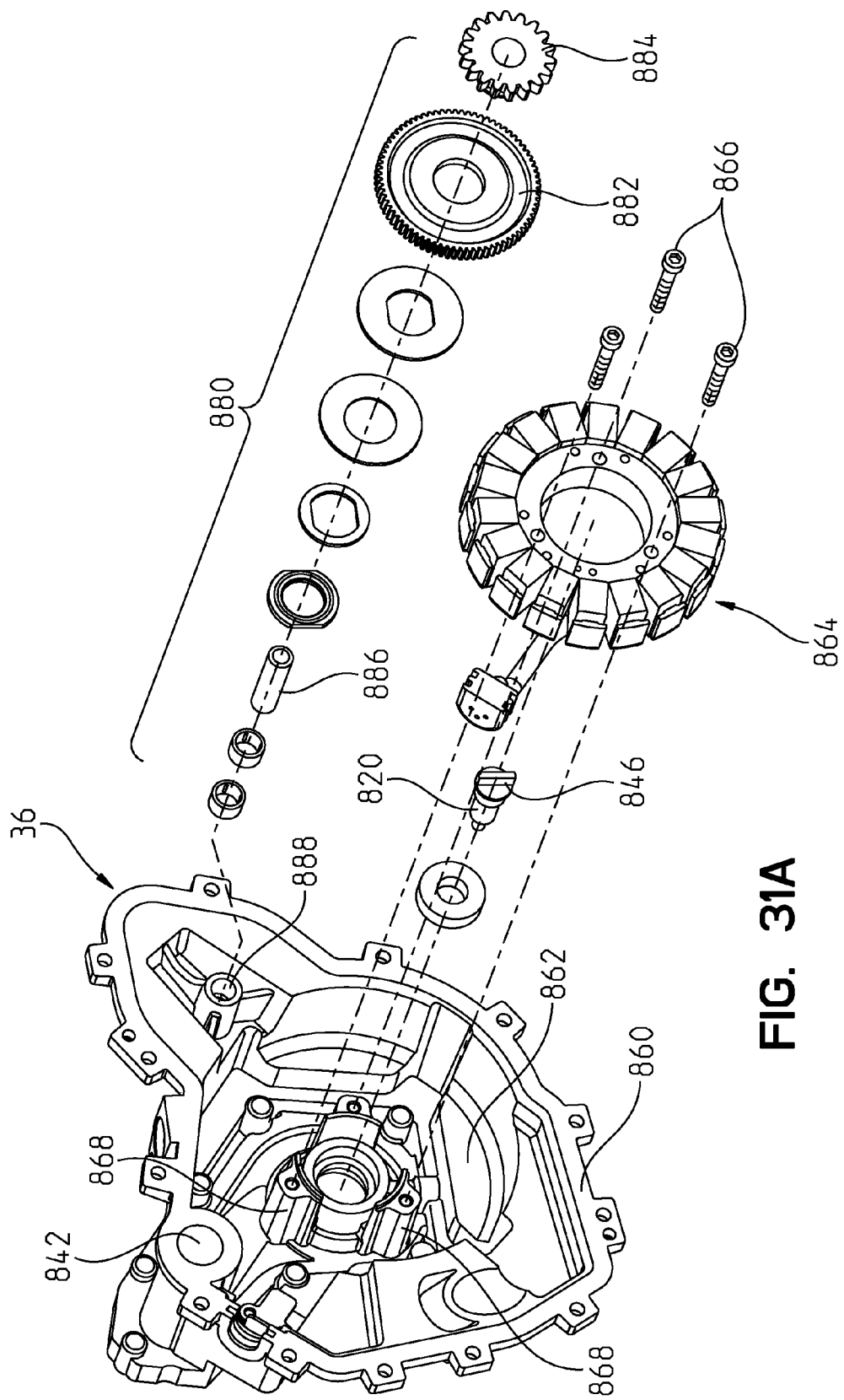
FIG. 31A shows an exploded view of the water pump housing with the stator poised for attachment thereto.

With reference now to FIG. 30, water pump assembly 24 is shown including water pump housing 36 and water pump cover 38. Water pump assembly 24 further includes water pump driveshaft 820, spacer 822, seal 824, impeller 826, and gasket 828. As shown, water pump housing 36 includes an outer side 830 which includes cavity 832 for receiving impeller 826, which is in communication with a discharge duct 840. Duct 840 communicates with aperture 842 (FIG. 31A). Water pump cover 38 includes an intake duct 850 which is profiled for receiving a flexible rubber hose and clamp thereover (not shown). Water pump cover 38 is fastened to front face 830 of water pump housing by way of a plurality of fasteners 852. When assembled, impeller 826 is coupled to shaft 820, and shaft 820 projects through aperture 844 of pump housing 36 to the position shown in FIG. 31B. It should also be appreciated that shaft 820 has a driven end in the form of a tongue 846 (FIG. 31A) which, matches groove 276 (FIG. 15). It should also be noted that cavity 832 is formed in a stepped fashion, so as to allow alternate impeller sizes. This allows alternate cooling water flow rates for other engine ratings.

Figure 31B:
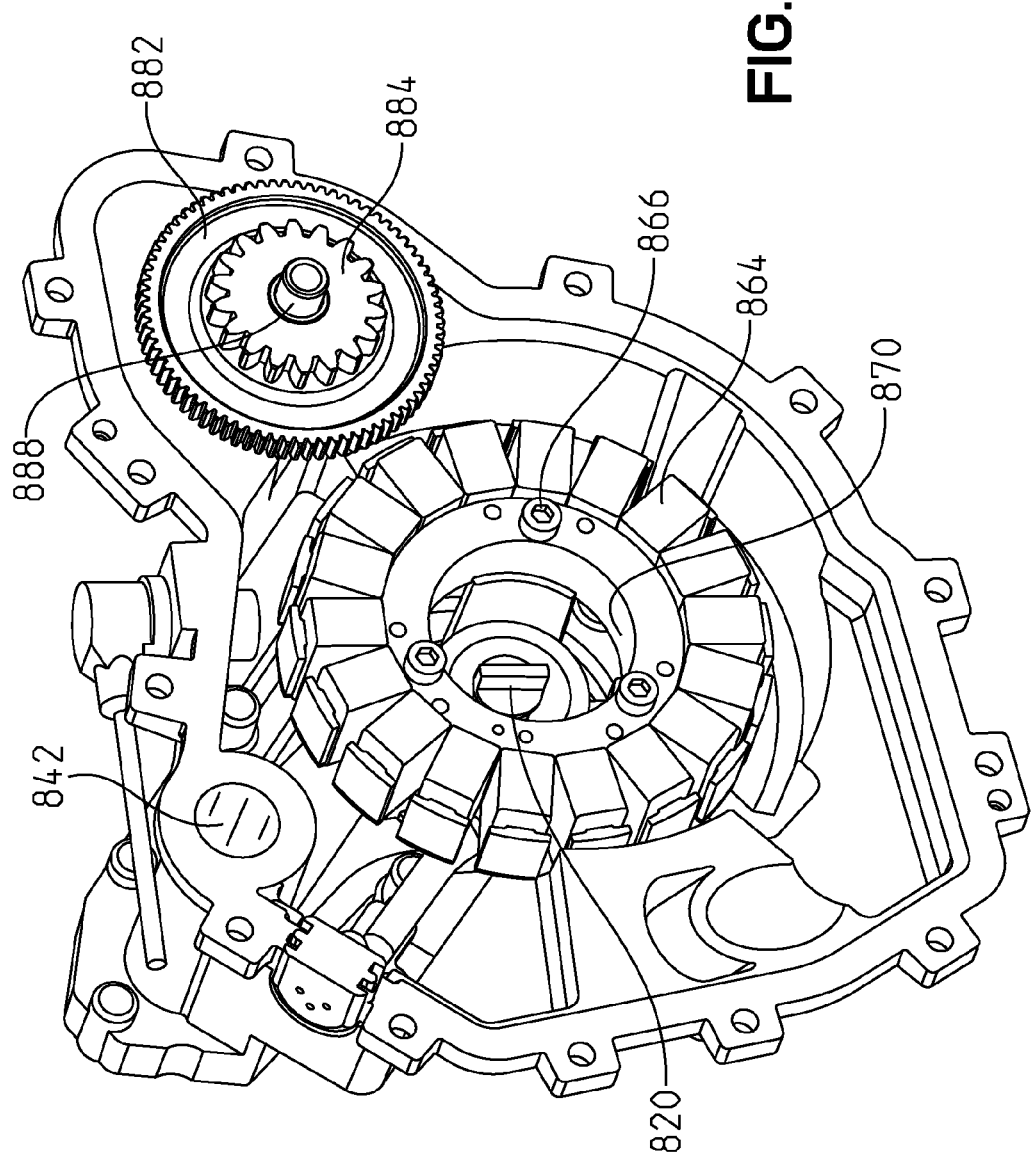
FIG. 31B shows an assembled view of the water pump housing and stator.
Figure 32:
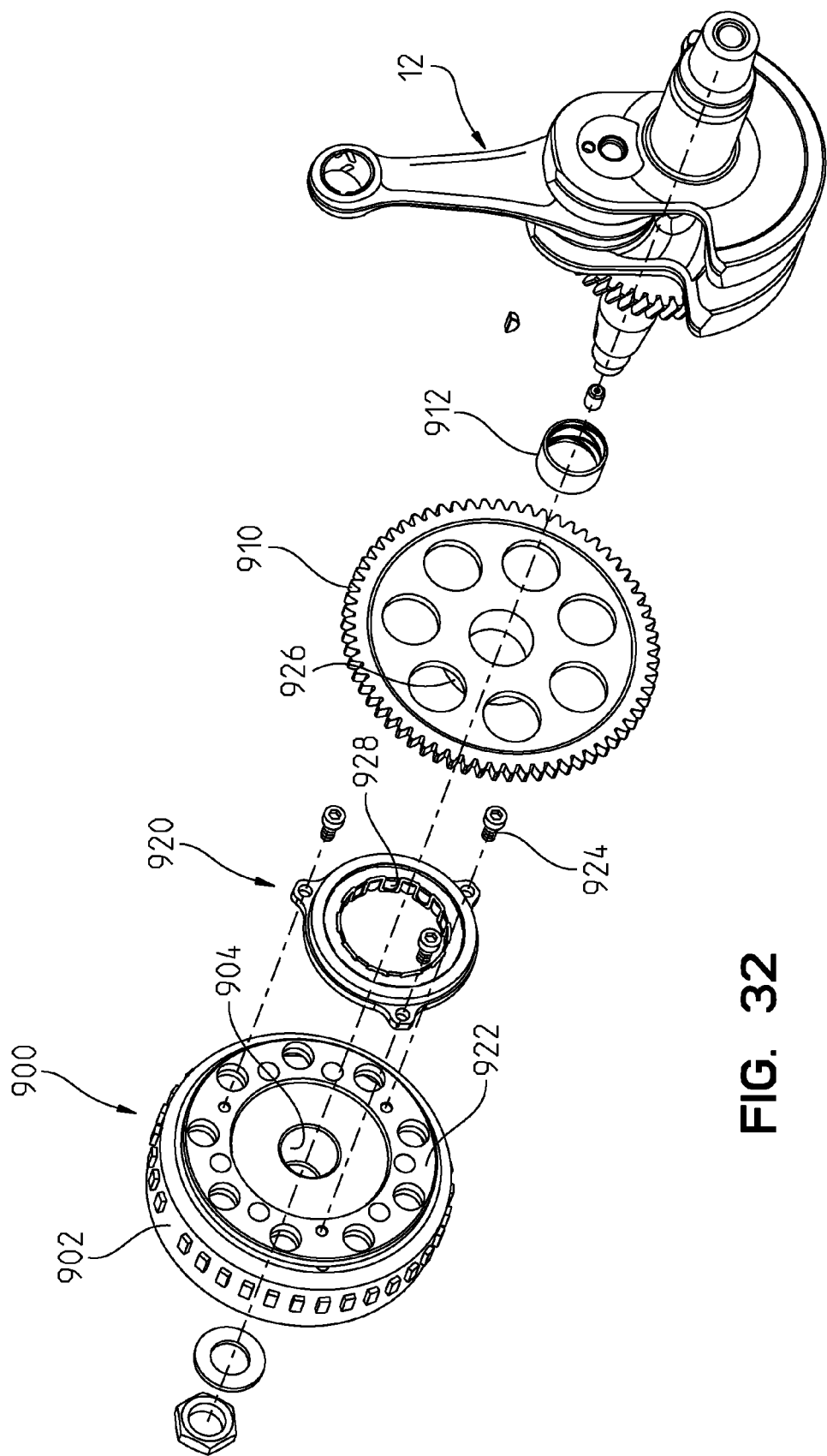
FIG. 32 shows the rotor poised for attachment to the crankshaft.

With reference now to FIG. 31A through FIG. 32, a magneto assembly will be described. As shown in FIG. 31A, water pump housing 36 includes an inner face 860, and includes an internal cavity at 862. A stator 864 is provided and is mounted by way of fasteners 866 to threaded bosses 868 within cavity 862. Stator 864 is shown in its mounted condition in FIG. 31B. Note that center opening 870 through stator 864 allows access to shaft 820 to drive water pump impeller 826 (FIG. 30). A starter motor gear drive 880 is also shown in FIG. 31A having large drive gear 882 and small driven gear 884 coupled about shaft 886. Shaft 886 is received in aperture 888. Gear drive 880 is also shown in its installed condition in FIG. 31B.

With reference now to FIG. 32, the rotor for the magneto assembly is shown at 900 including outer rotor wall 902 profiled to overlap stator 864 and having inner opening at 904 profiled to be attached to crankshaft assembly 12. As shown in FIG. 32, starting gear 910 is shown which is received onto diameter portion 268 (FIG. 14) and rotate thereto relative to bearing 912. A slip clutch 920 is provided which is mounted to the inner face 922 of rotor 900 by way of fasteners such as 924. Starter gear 910 includes an external hub 926 which interacts with inner opening 928 of slip clutch 920.

Figure 33:
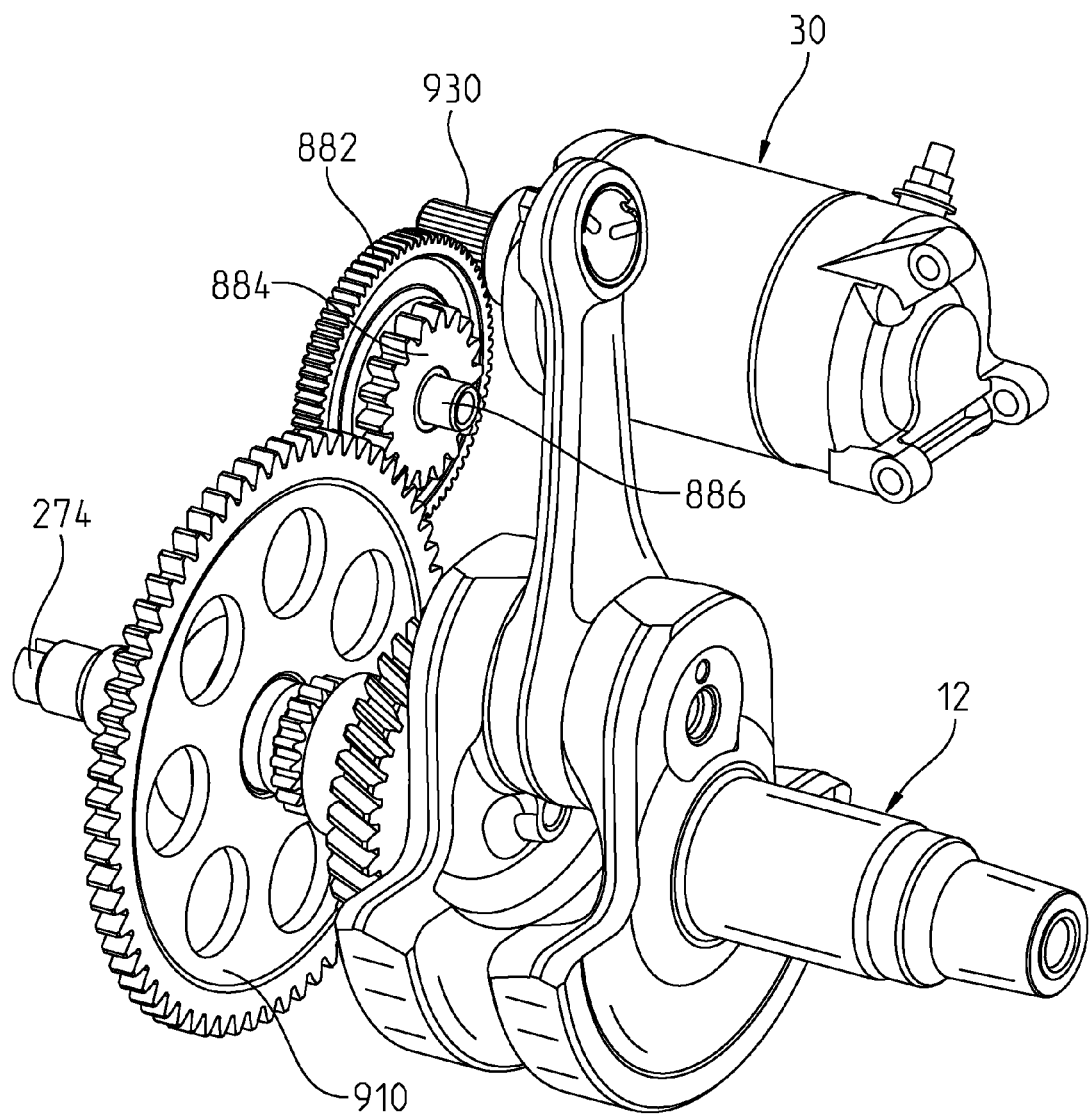
FIG. 33 shows the gear train of the starter assembly.
Figure 34:
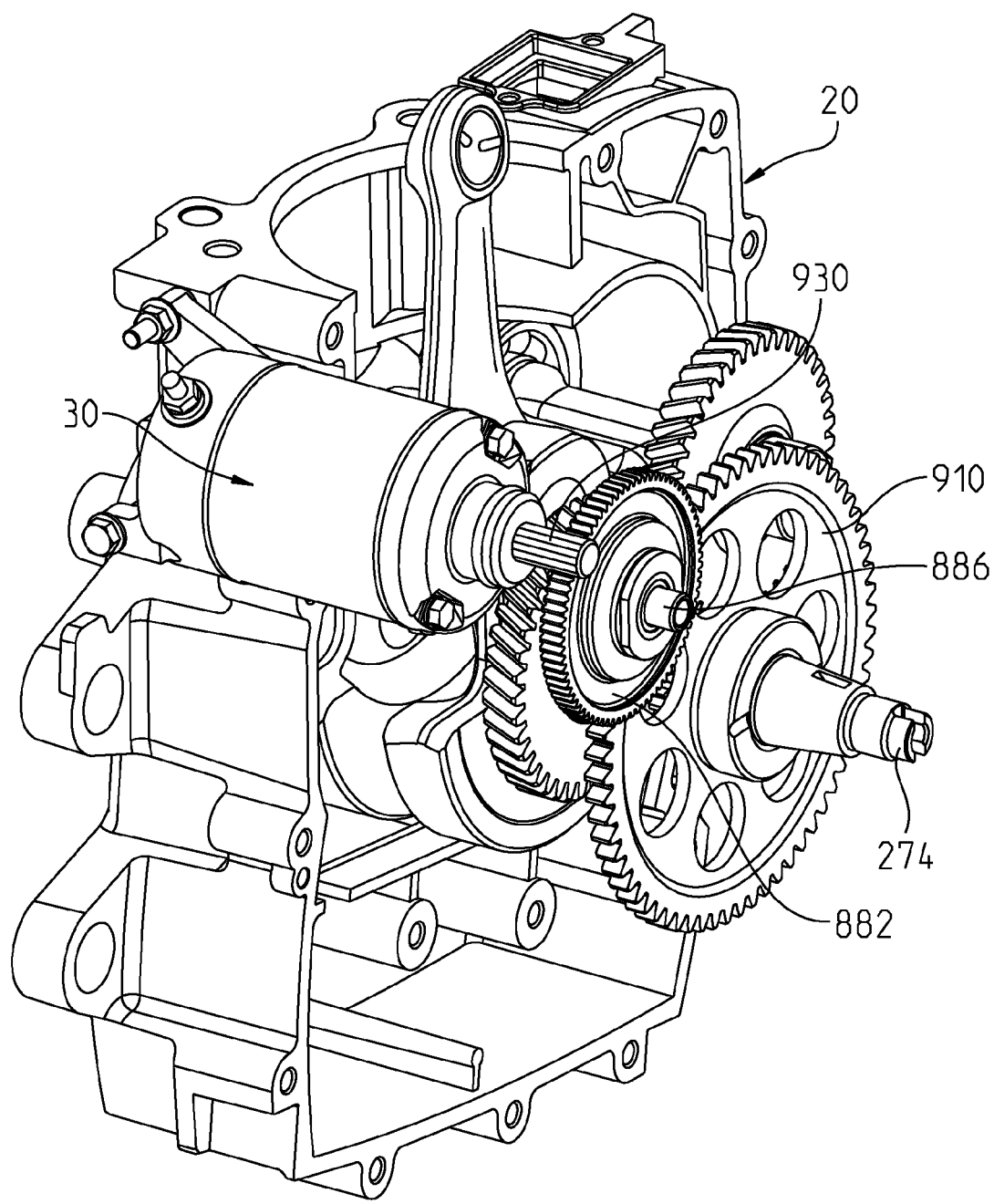
FIG. 34 shows an alternate view of the gear train for the starter motor.

The assembled starter motor gearing is shown in FIGS. 33 and 34 where it is understood that starter motor 30 includes a starter motor shaft 930 in the form of a pinion. It should be appreciated that starter motor 30 mounts to the back side of mounting wall 140 (FIG. 8), with starting shaft 930 projecting through aperture 142 (FIG. 8). Thus, gears 882 and 884 rotate relative to shaft 886 pinned at one side by aperture 888 (FIG. 31A) and by mounting aperture 144 (FIG. 8) on the opposite side. With the components and subassemblies as described above, the oil and water distribution will now be described.

Figure 35:
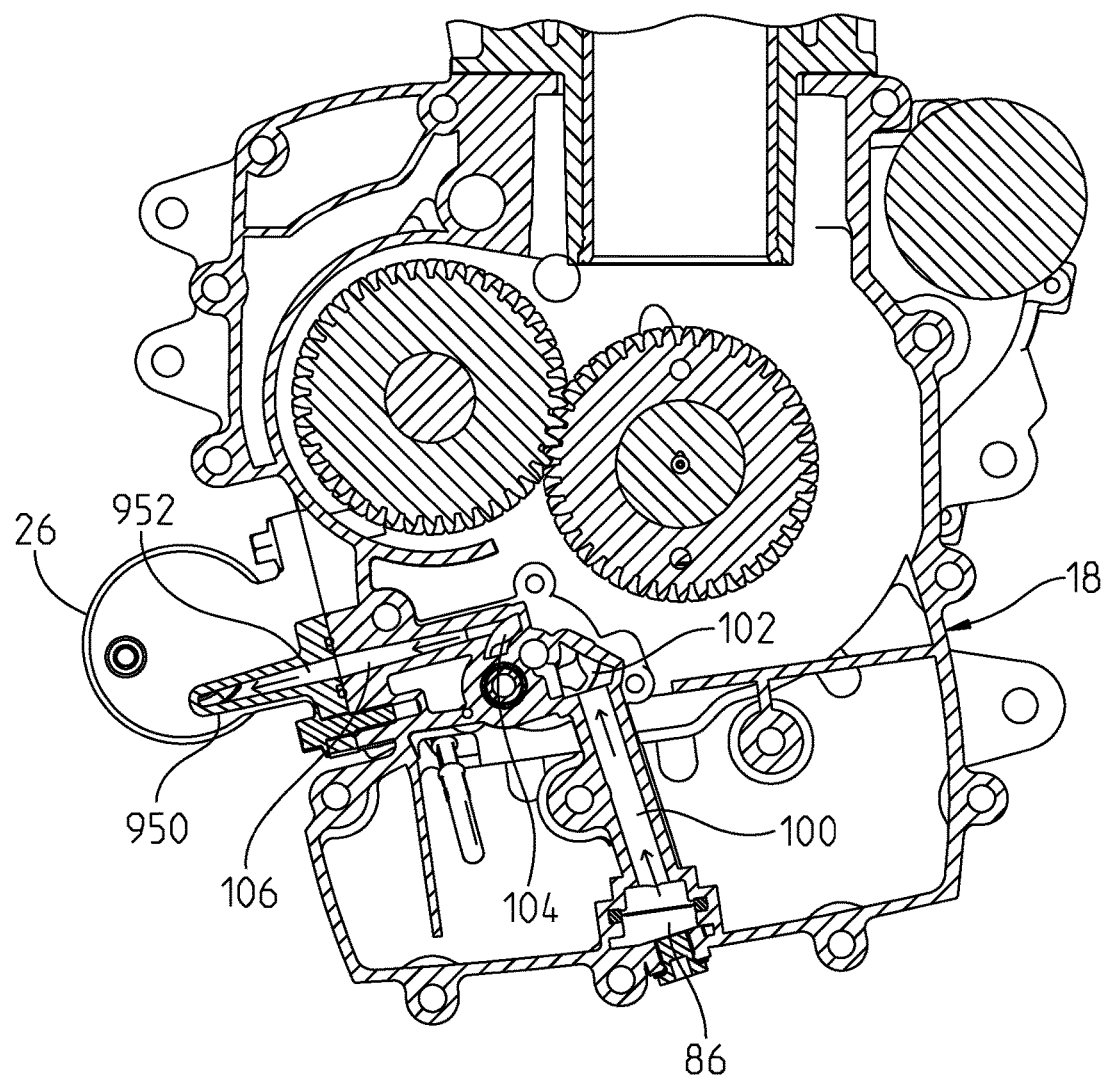
FIG. 35 is a cross-sectional view through lines 35-35 of FIG. 4.
Figure 36:
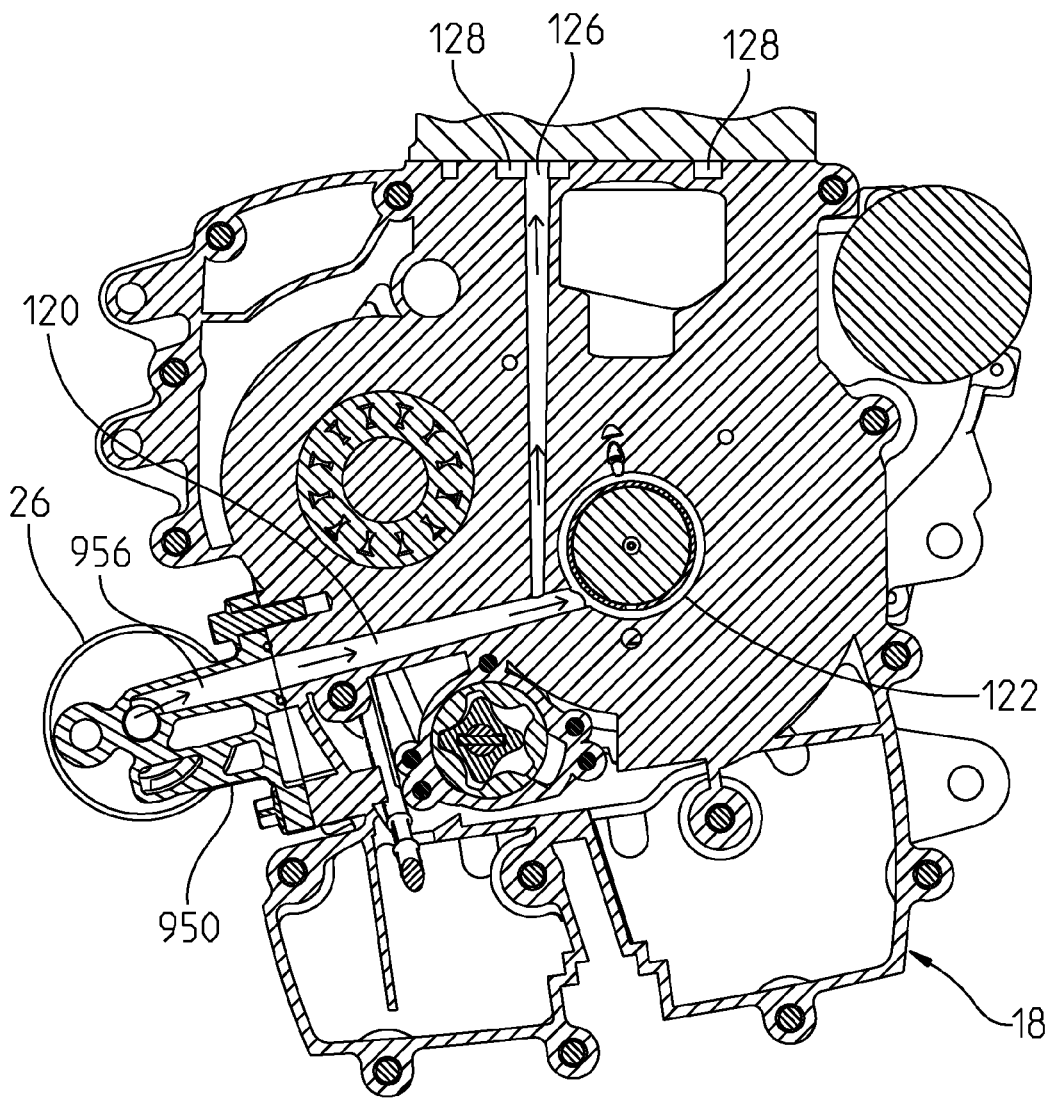
FIG. 36 is a cross-sectional view through lines 36-36 of FIG. 4.
Figure 37:
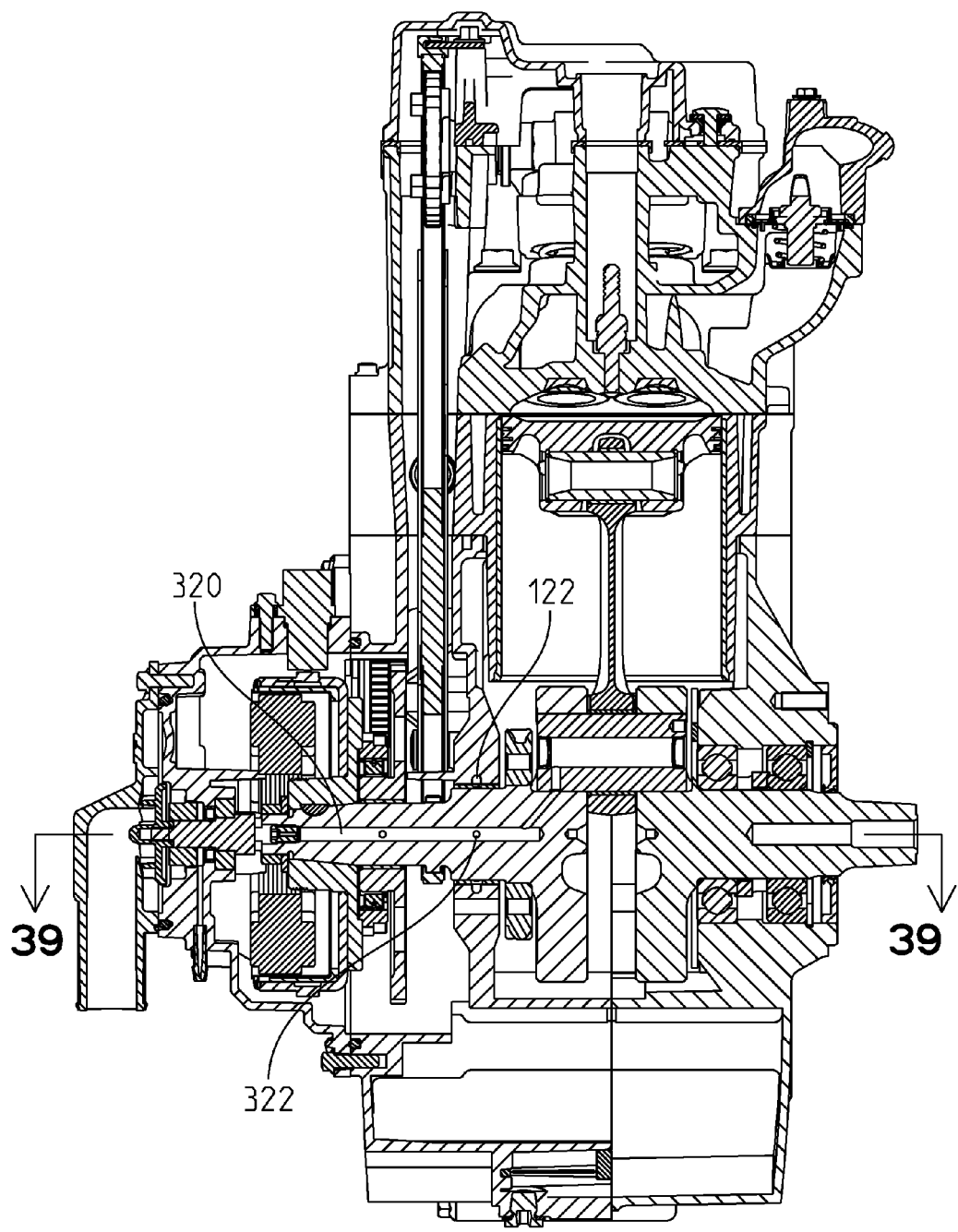
FIG. 37 is a cross-sectional view through lines 37-37 of FIG. 1.

With reference first to FIG. 35, as oil pump 750 (FIG. 28) operates, oil is drawn in the direction of the arrows through passageway 100 to the pump and is discharged into passageway 106. Filter 26 is connected to the crankcase by way of a mounting bracket 950 having a passageway 952, aligned with passageway 106, and extending into the filter 26. With reference now to FIG. 36, oil is pumped out of the filter 26 through a passageway 956 of bracket 950 into passageway 120 of crankcase portion 18. As mentioned before, passageway 120 intersects with groove 122 which corresponds with diameter portion 268 (FIGS. 10 and 14) lubricating the main bearing 70 on the crankshaft portion 268 (FIG. 37). As shown in FIG. 37, aperture 322 also extends through diameter portion 268 (FIG. 37), intersecting with passageway 320, and allowing oil from passageway 120, 122 (FIG. 36) to enter passageway 320.

Figure 38:
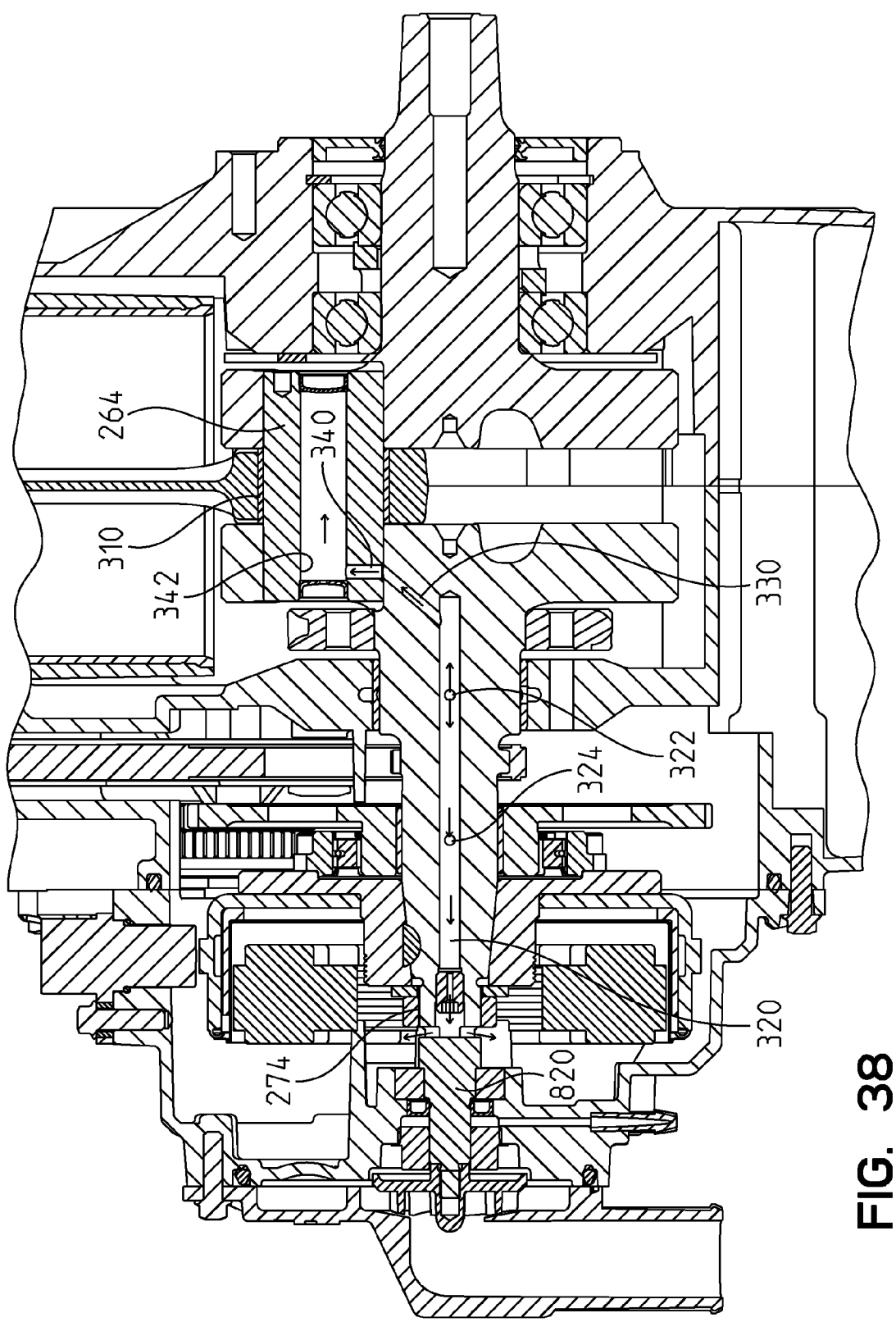
FIG. 38 is an enlarged cross-sectional view similar to that of FIG. 37 showing the oil distribution pattern.
Figure 39:
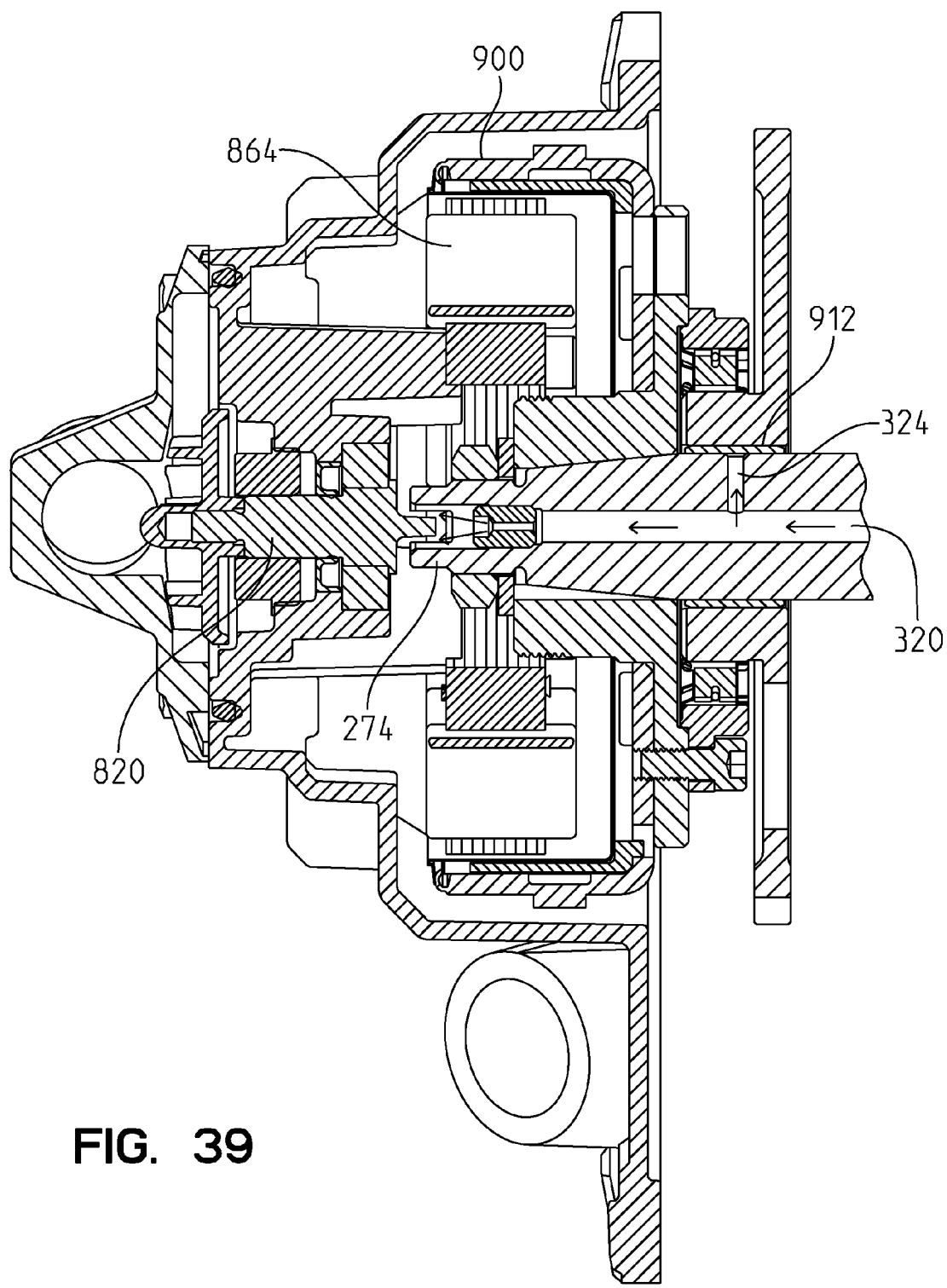
FIG. 39 is a cross-sectional view through lines 39-39 of FIG. 37.

As shown best in FIGS. 37-39, oil in passageway 320 flows in both directions from passageway 322 (FIG. 38). Oil flowing to the left as viewed in FIG. 39 lubricates the connection between shaft 820 and drive end 274. Bearing 912 (FIG. 39) is also lubricated through passageway 324. As shown in FIG. 38, oil flowing to the right continues through passageway 330 and into internal volume 342 of pin 264 through passageway 340. Oil then lubricates bearing 310 through passageway 350 of pin 264 (FIG. 15). Excess oil from bearing 310 simply drips back to the crankcase sump.

Figure 41:
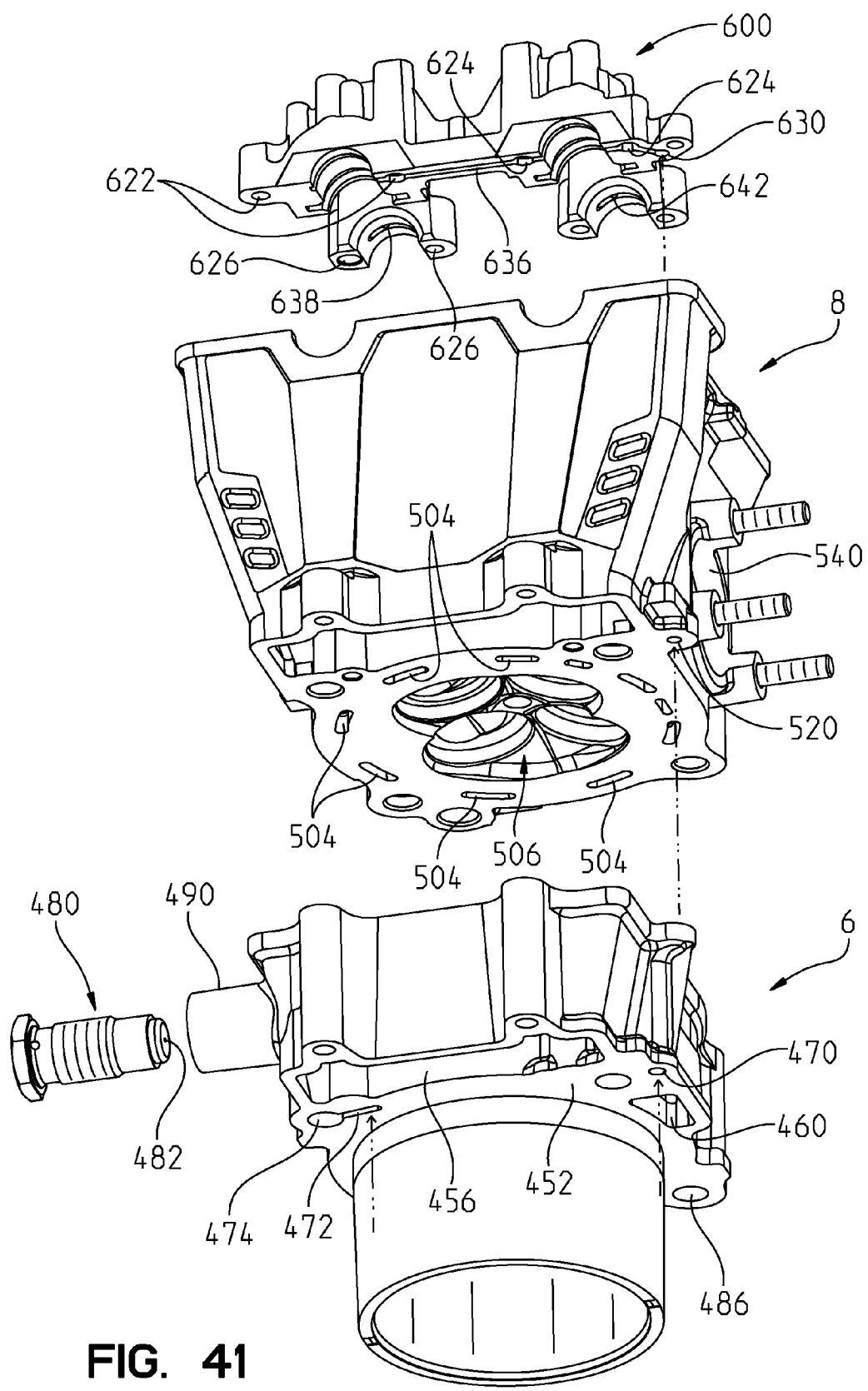
FIG. 41 is an exploded view showing the head assembly and cylinder liner poised for assembly, and showing the fluid flow patterns.

Recall from FIG. 36, that oil through passageway 120 not only fed groove 122 around main bearing, but also travels vertically through passageway 126, feeding serpentine groove 128 (FIG. 8). A portion of serpentine groove is seen in FIG. 36. With reference now to FIG. 41, oil through serpentine groove 128 feeds passageway 470 of liner 6 as well as channel 472. The oil through passageway 470 is fed to passageway 520 of head assembly 8, whereas oil through passageway 472 is fed to injector 480 through nozzle 482 onto the chain as previously described. Recall also from FIG. 20B that passageway 520 extends upwardly opening onto upper surface 502 within wall 560. Oil is then fed to channel 630 of cam retainer 600, and oil is then fed onto the cams through the various channels around cam shafts as previously described.

Figure 40:
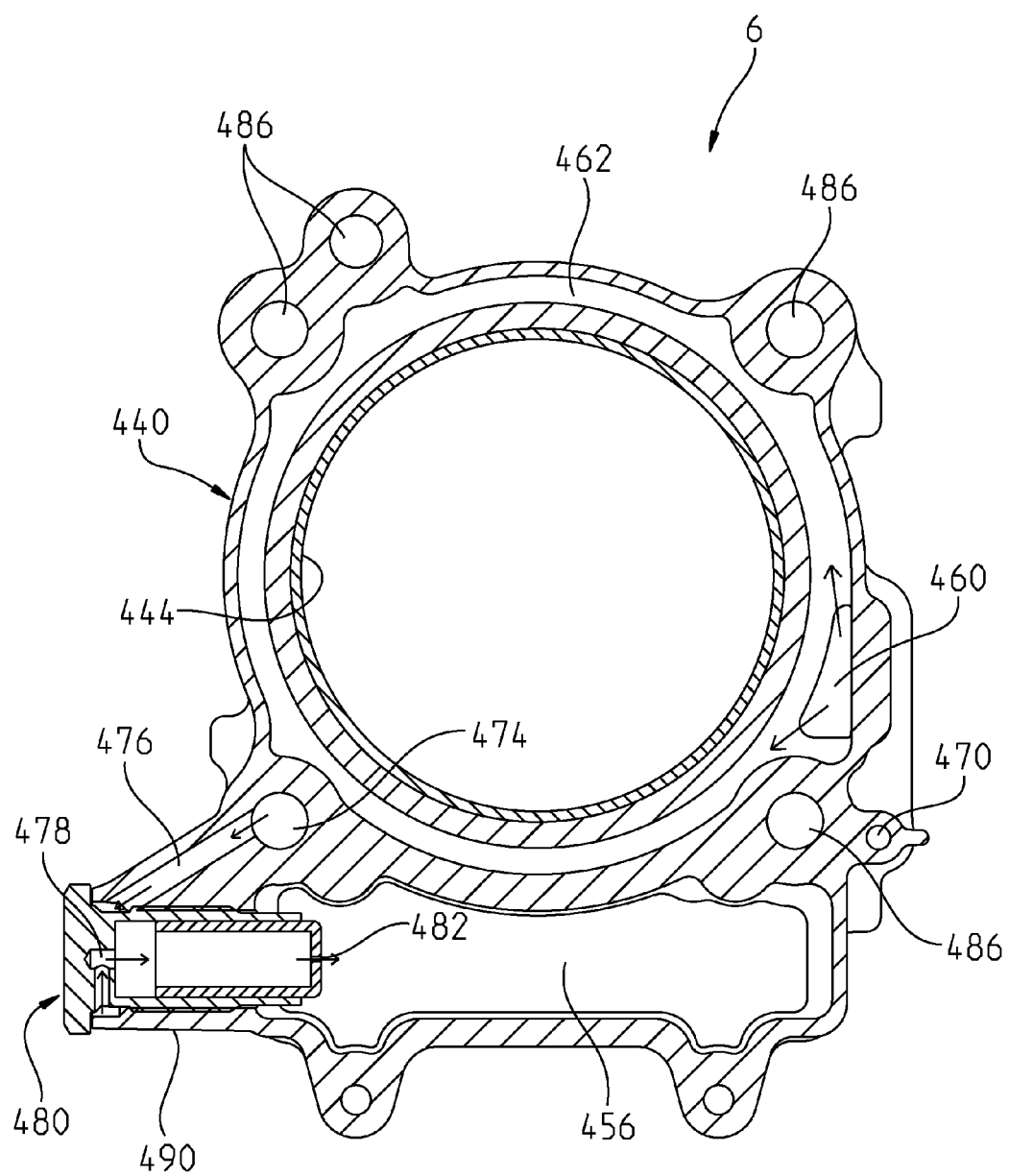
FIG. 40 shows a cross sectional view through the liner, showing the fluid flow patterns.
Figure 42:
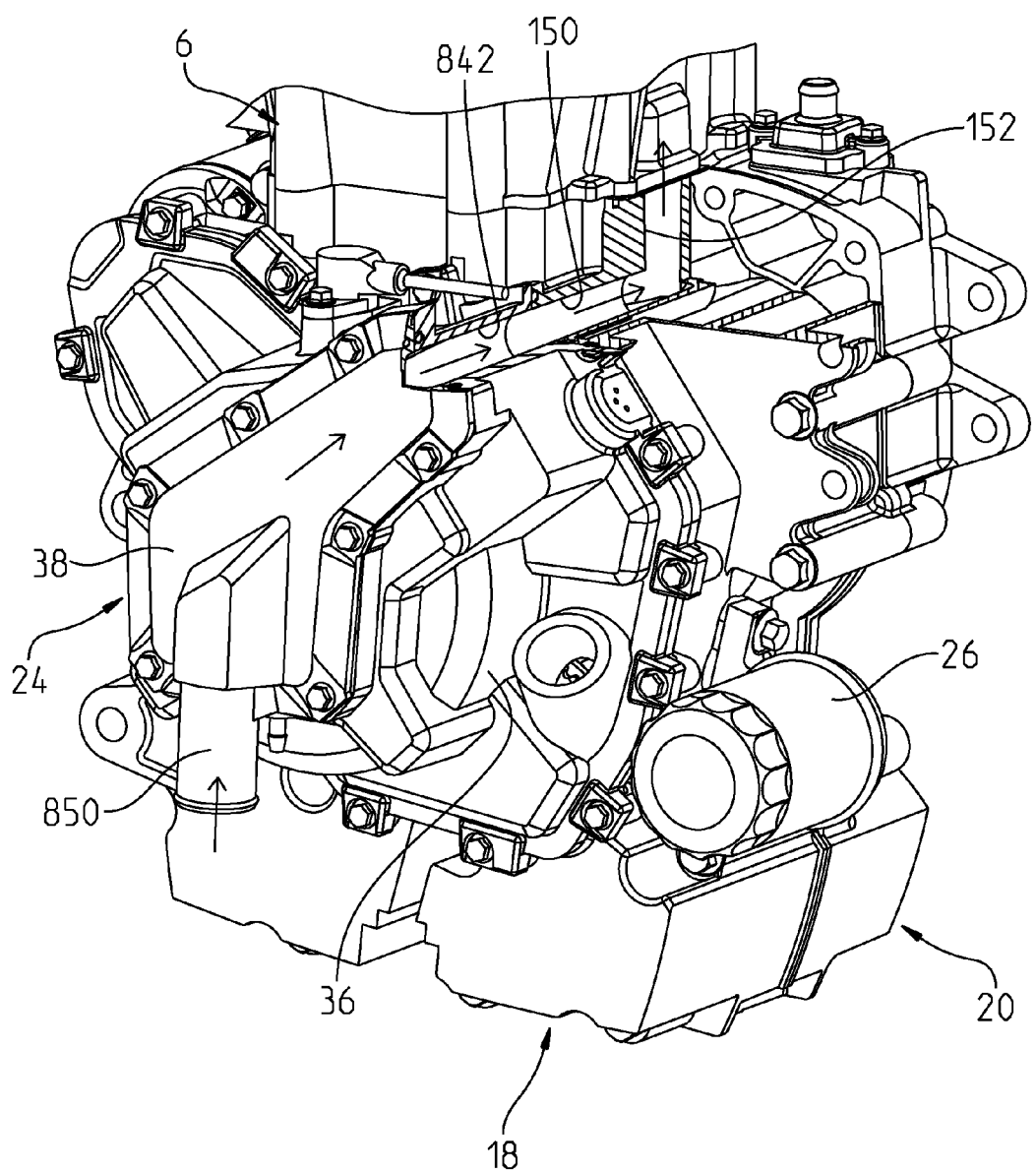
FIG. 42 shows a perspective view of the engine showing a water distribution pattern.
Figure 43:
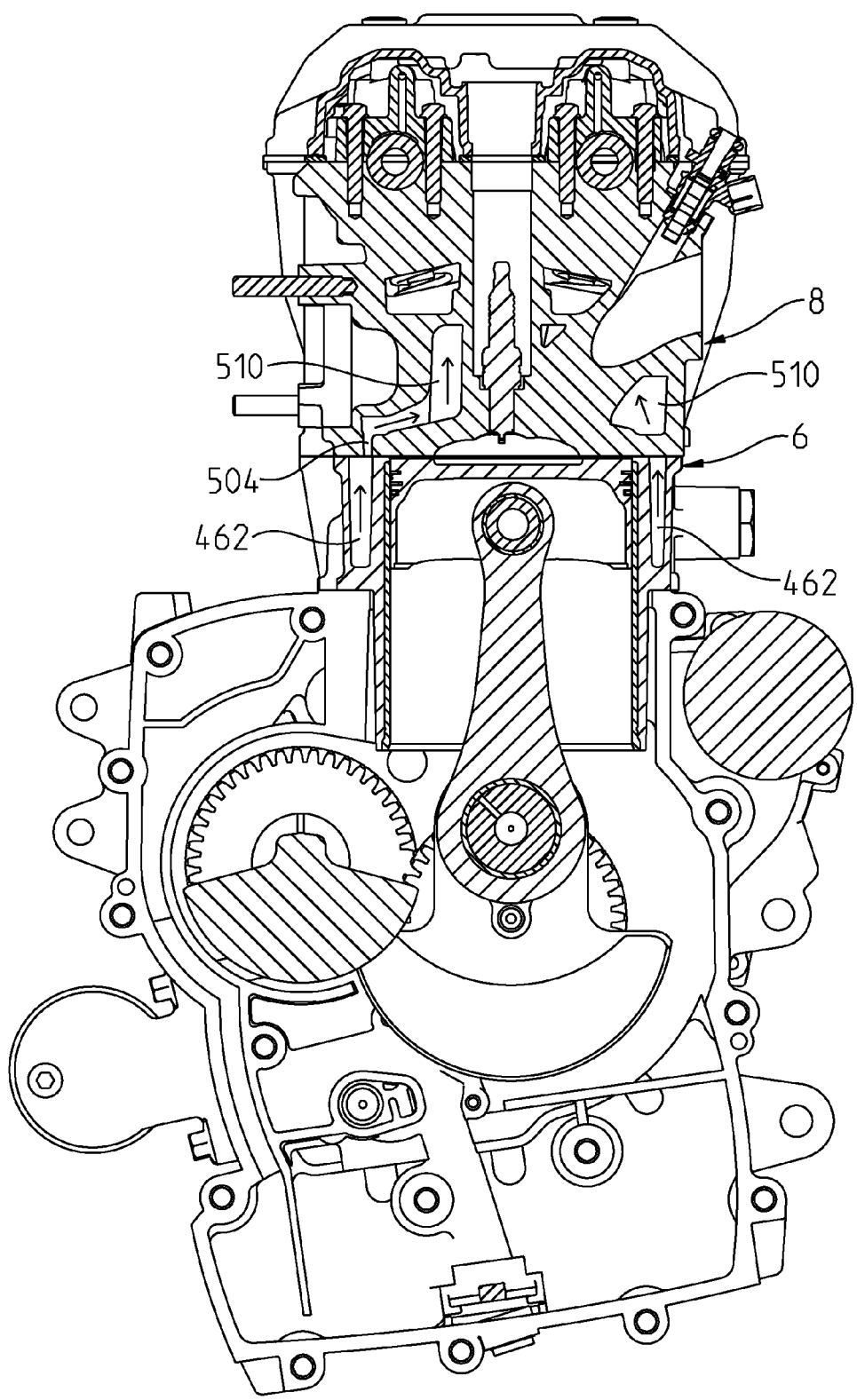
FIG. 43 is a cross-sectional view through lines 43-43 of FIG. 1.
Figure 44:
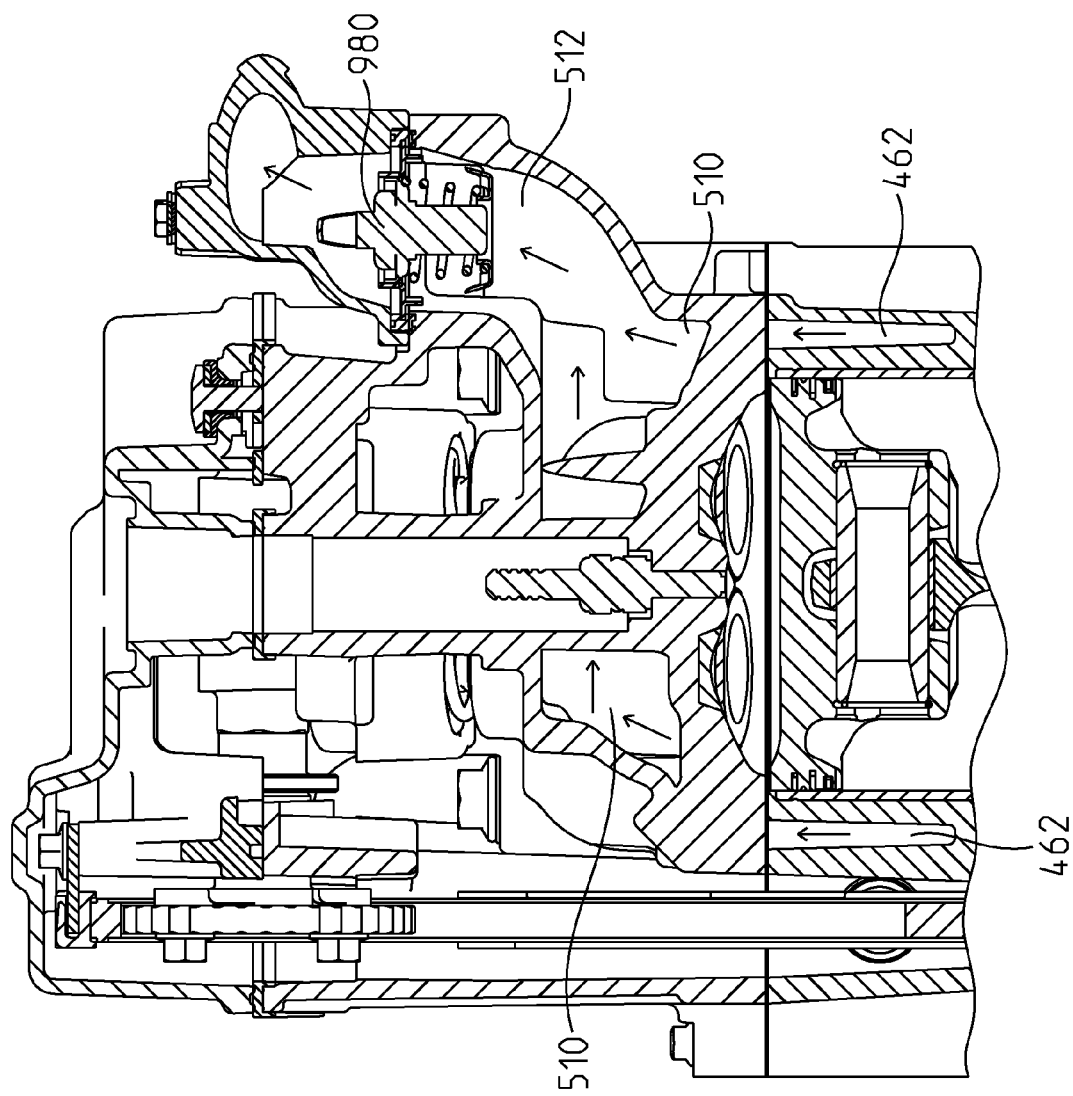
FIG. 44 is a cross-sectional view through lines 44-44 of FIG. 1.
Figure 46:
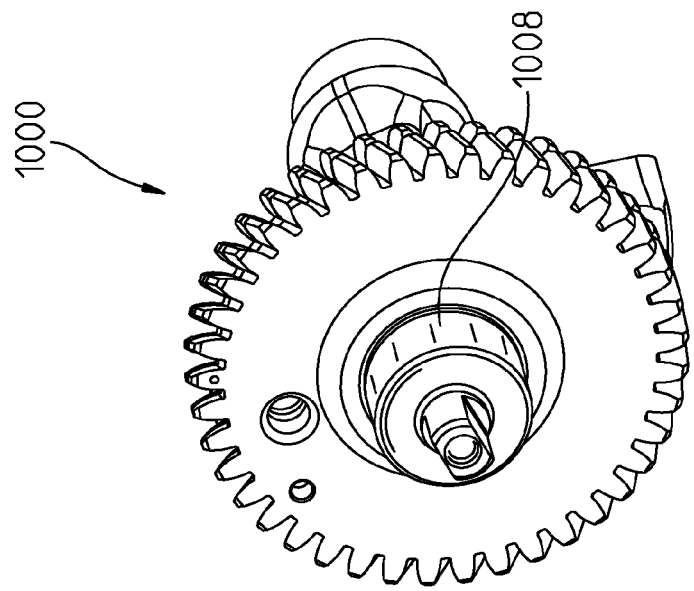
FIG. 46 is a front view of the counterbalance shaft of FIG. 45.
Figure 45:
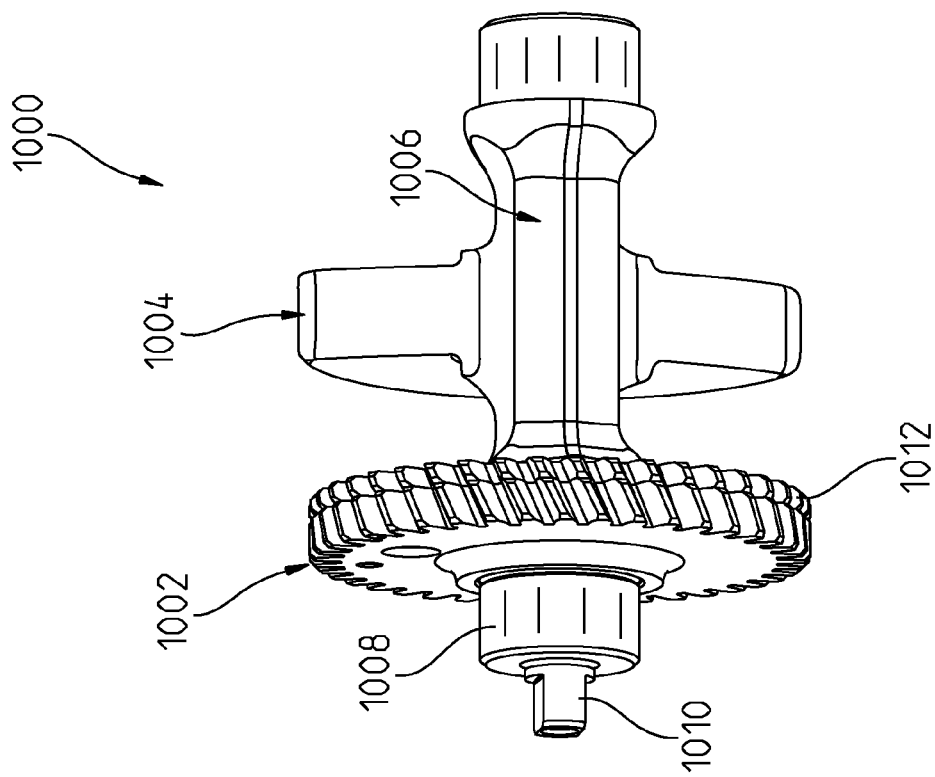
FIG. 45 is a perspective view of the counterbalance shaft.
Figure 48:
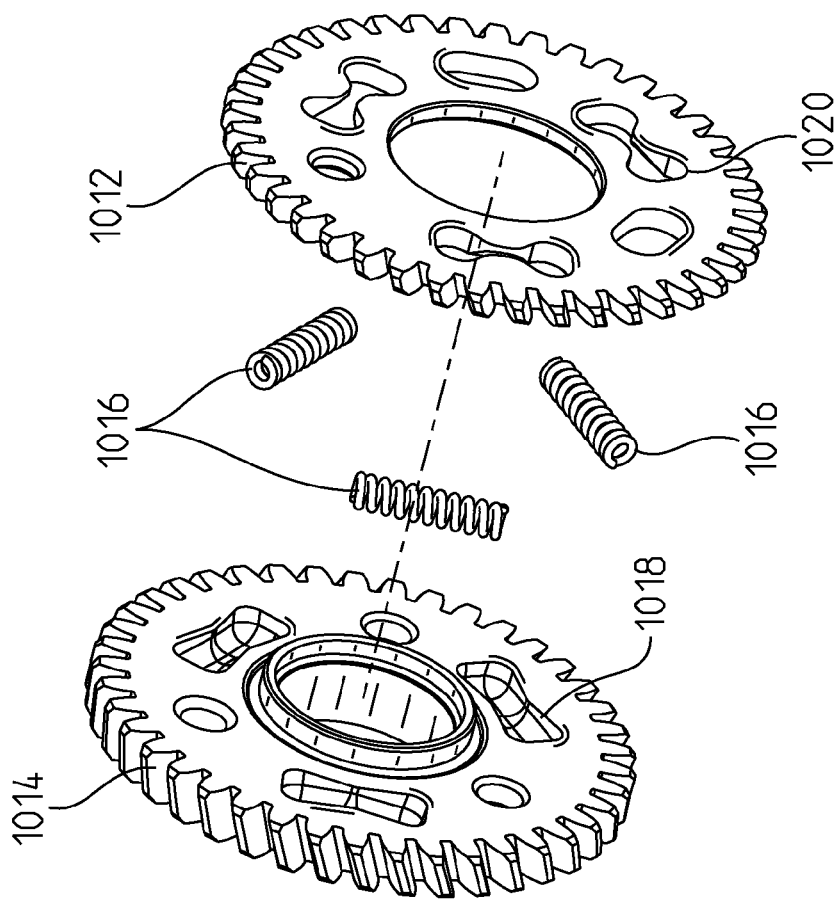
FIG. 48 shows an exploded view of the shaft of FIG. 47.
Figure 47:
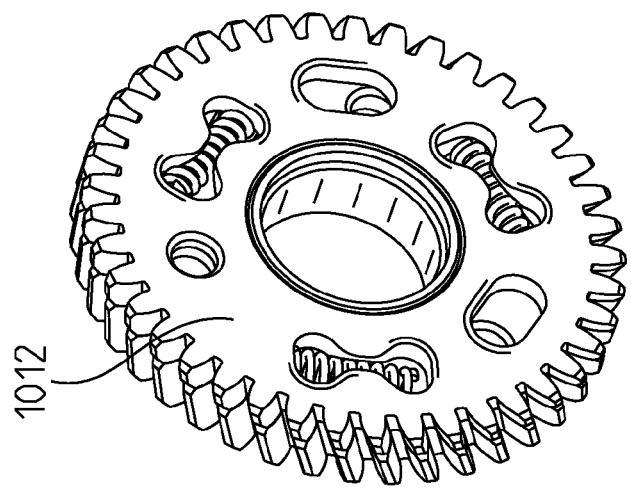
FIG. 47 shows a perspective view of the drive gear of the counterbalance shaft.
Figure 50:
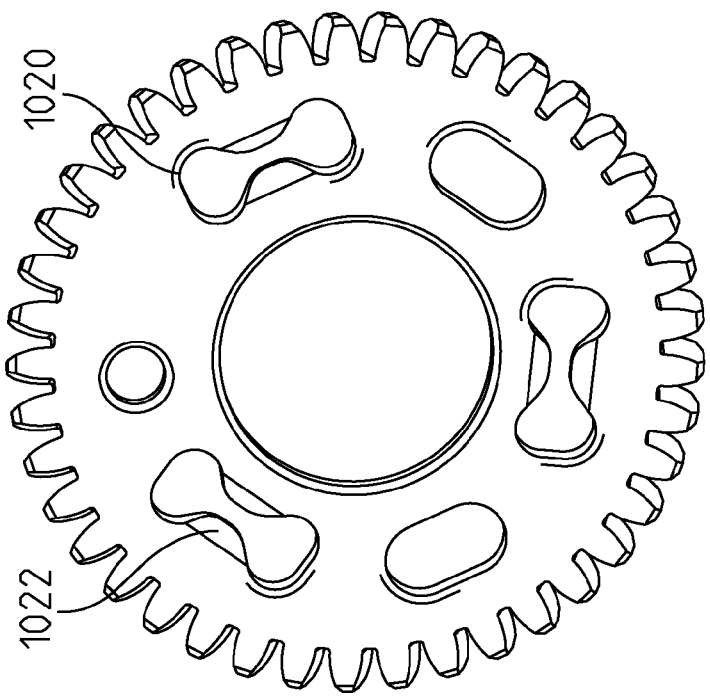
FIG. 50 shows an inside view of the backlash gear.
Figure 49:
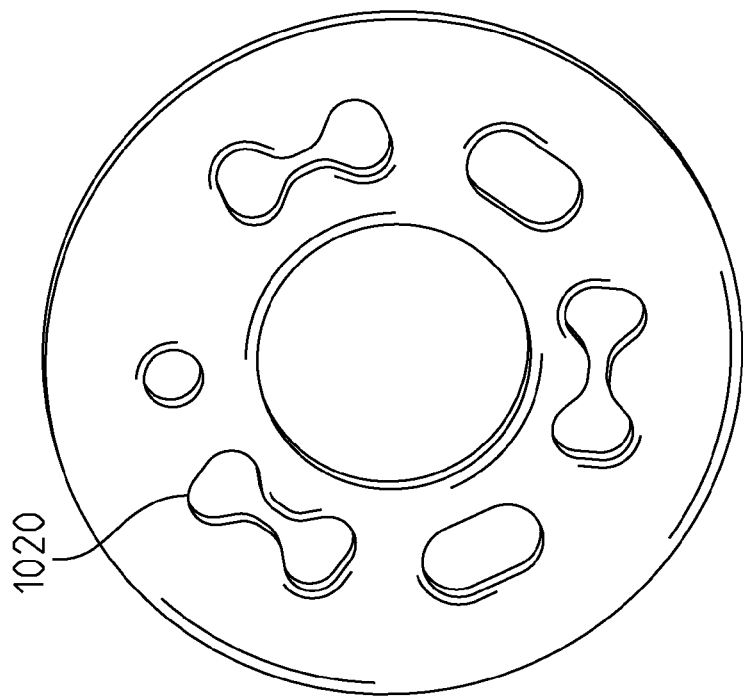
FIG. 49 shows an outside view of the backlash gear.

With respect now to FIG. 42, water from water pump 24 is drawn in through hose (not shown) attached to duct 850 and is discharged through aperture 842 of water pump housing 36. Water exits into crankcase portion 18 through aperture 150 and then vertically through channel 152. With reference again to FIG. 40, water then progresses through aperture 460 of liner 6 and circulates around cavity 462, cooling cylinder wall 444. Water then feeds into passageways 504, as shown in FIGS. 41 and 43, into head 8. Cooling water continues to circulate around passageway 510 as shown best in FIG. 44 and progresses to a water outlet through thermostat 980.

With reference now to FIGS. 45-50, counterbalance shaft is shown at 1000 including a drive gear 1002, a counterweight 1004, and a shaft 1006. End 1008 includes a drive end 1010 in the form of a tongue. Gear 1002 is comprised of outer gear 1014 and a backlash gear 1012. A plurality of springs is positioned intermediate the gears 1012, 1014, to provide a torsional spring load between the gear 1002 and its mating gear. With respect now to FIGS. 48 and 50, gear 1014 includes spring receiving recesses 1018 and gear 1012 includes a corresponding recess 1020 having a chamfer (FIG. 50) at 1022. Thus the spring will fit between the recesses 1018 the chamfers 1022 such that the gears 1014, 1012 may sit flush to each other, and rotate subject to the spring load.

Figure 1:
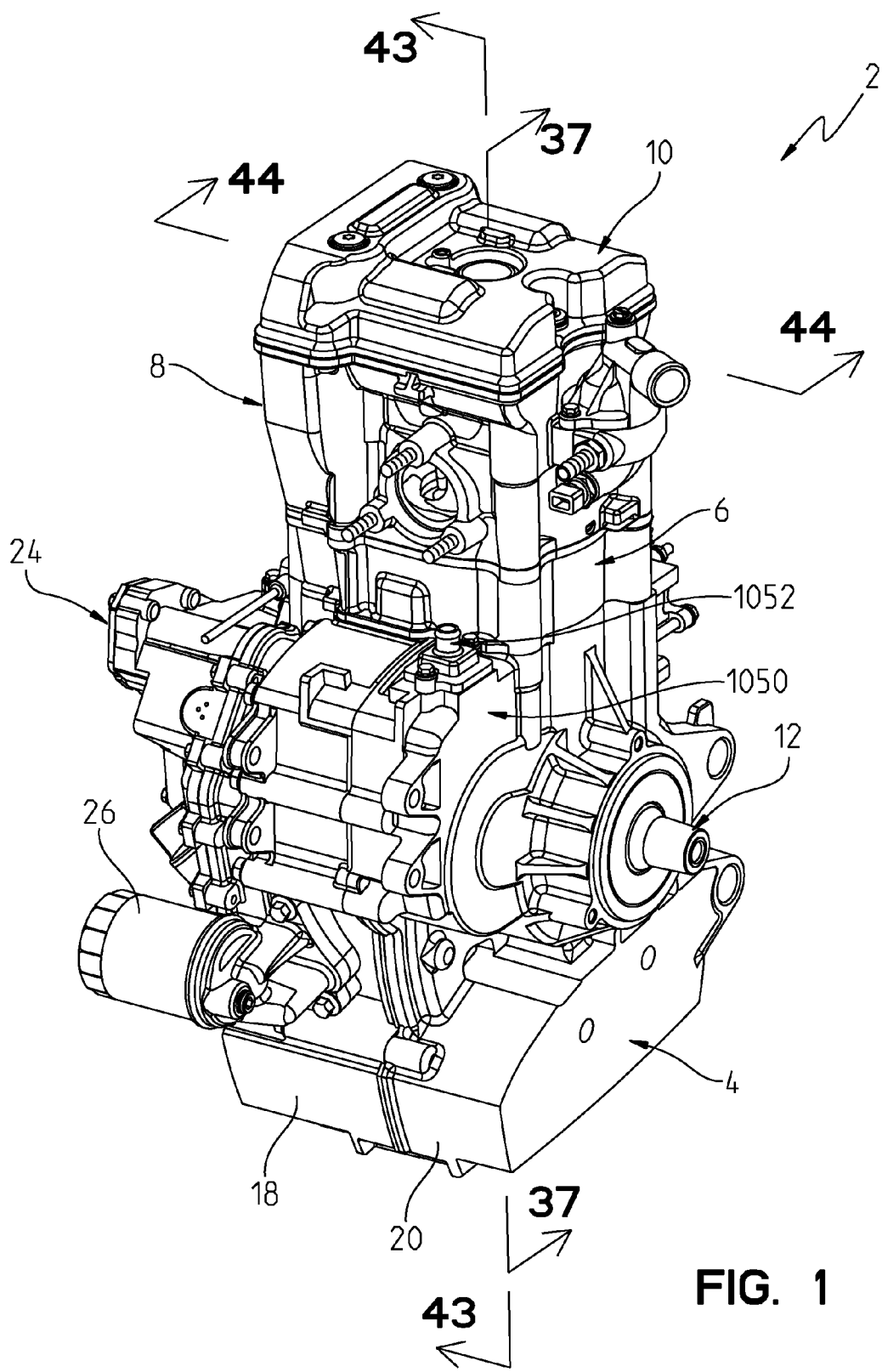
FIG. 1 is an upper perspective view of the subject engine.
Figure 2:
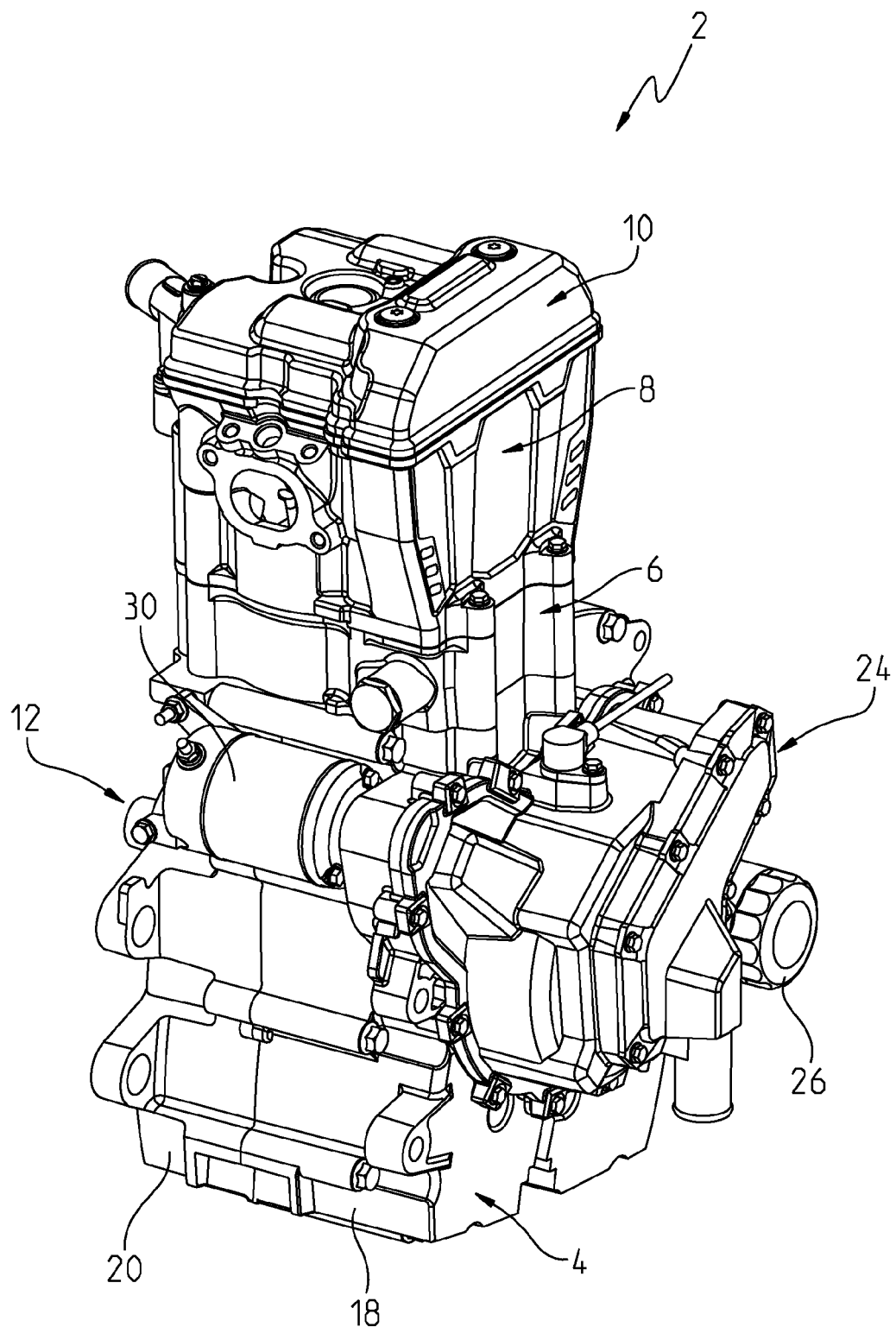
FIG. 2 is an upper perspective view of the opposite side of the engine as that shown in FIG. 1.
Figure 3:
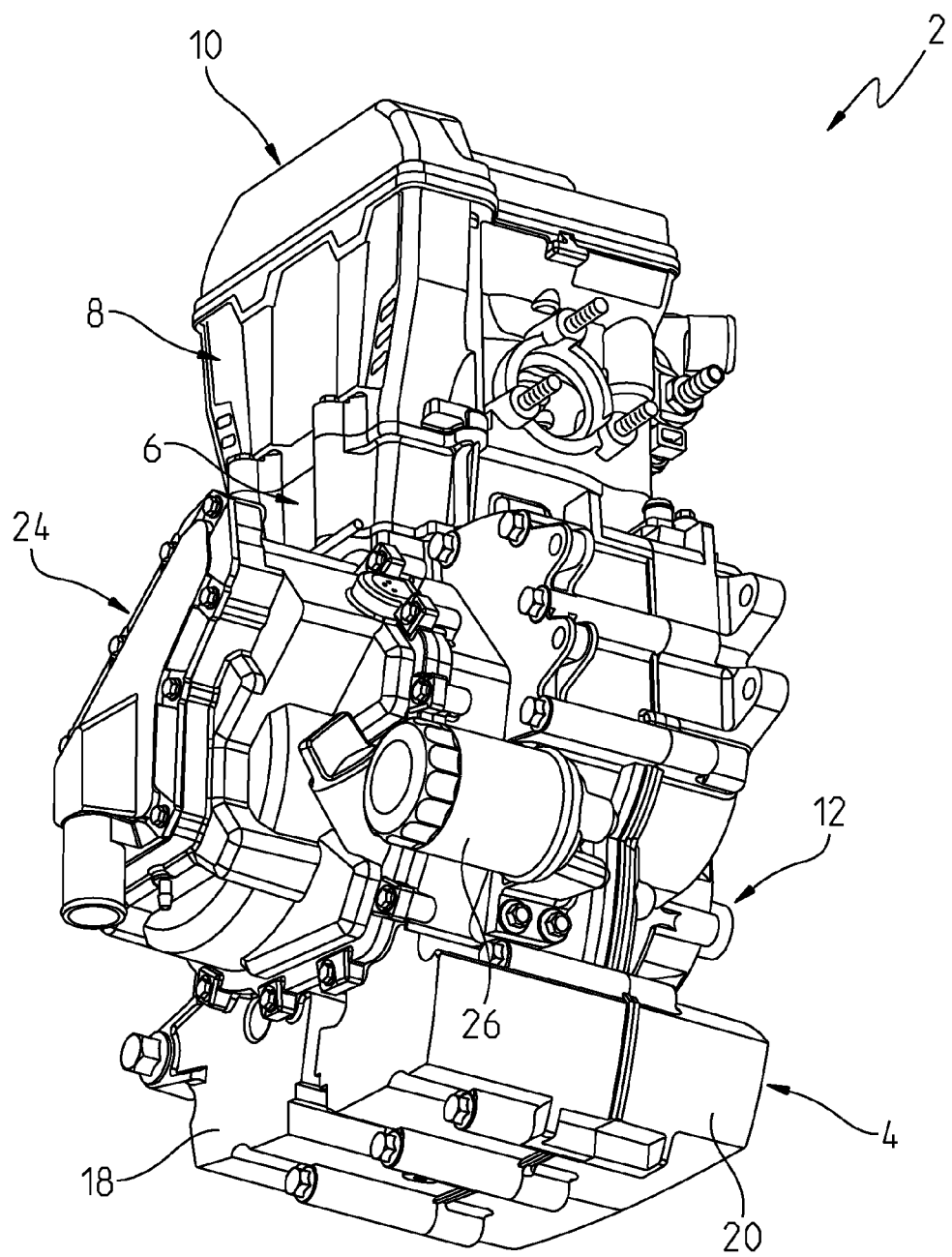
FIG. 3 is a lower perspective view similar to that of FIG. 1.
Figure 4:
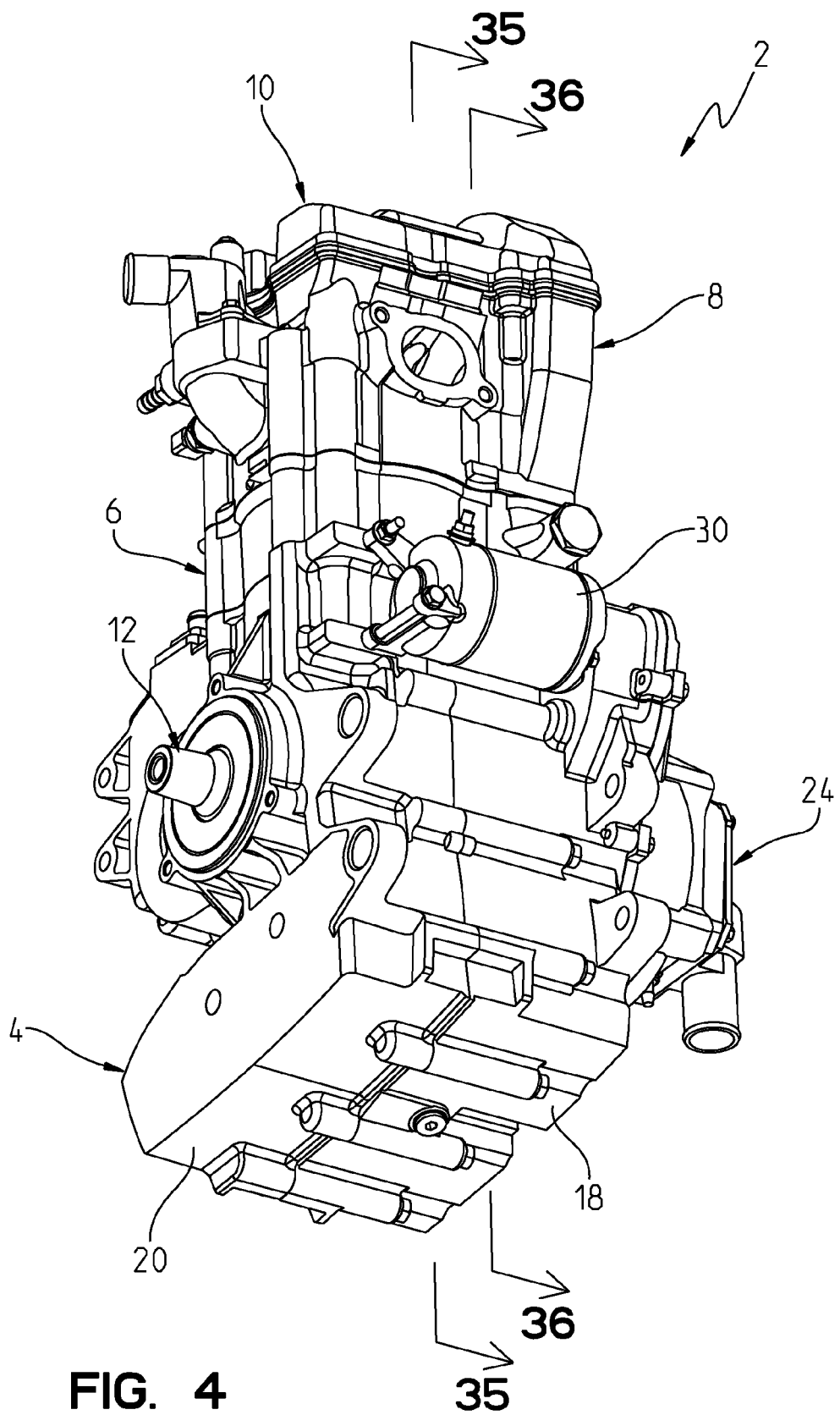
FIG. 4 is a lower perspective view similar to that of FIG. 2.
Figure 51:
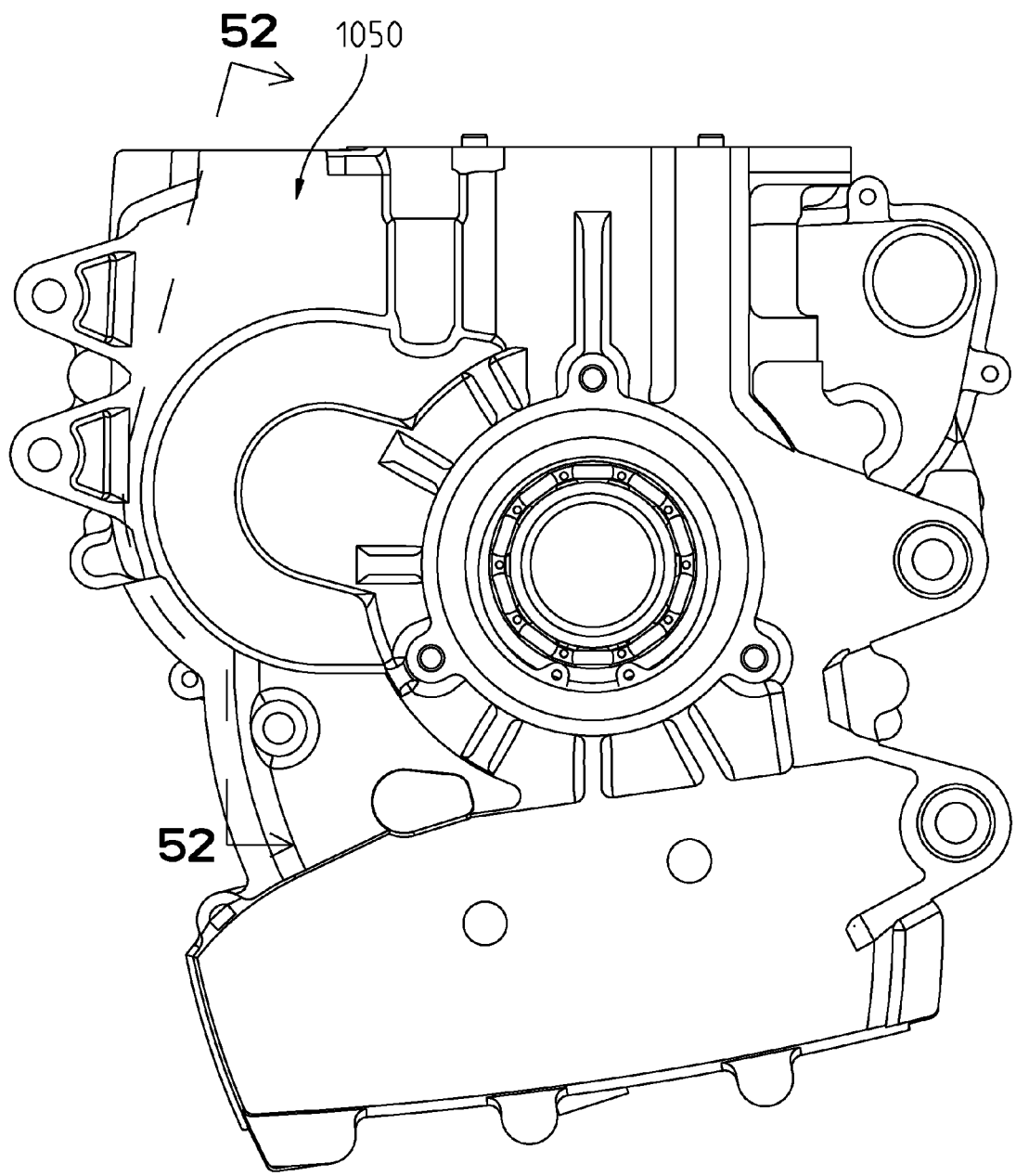
FIG. 51 is a side view of the crankcase assembly.
Figure 52:
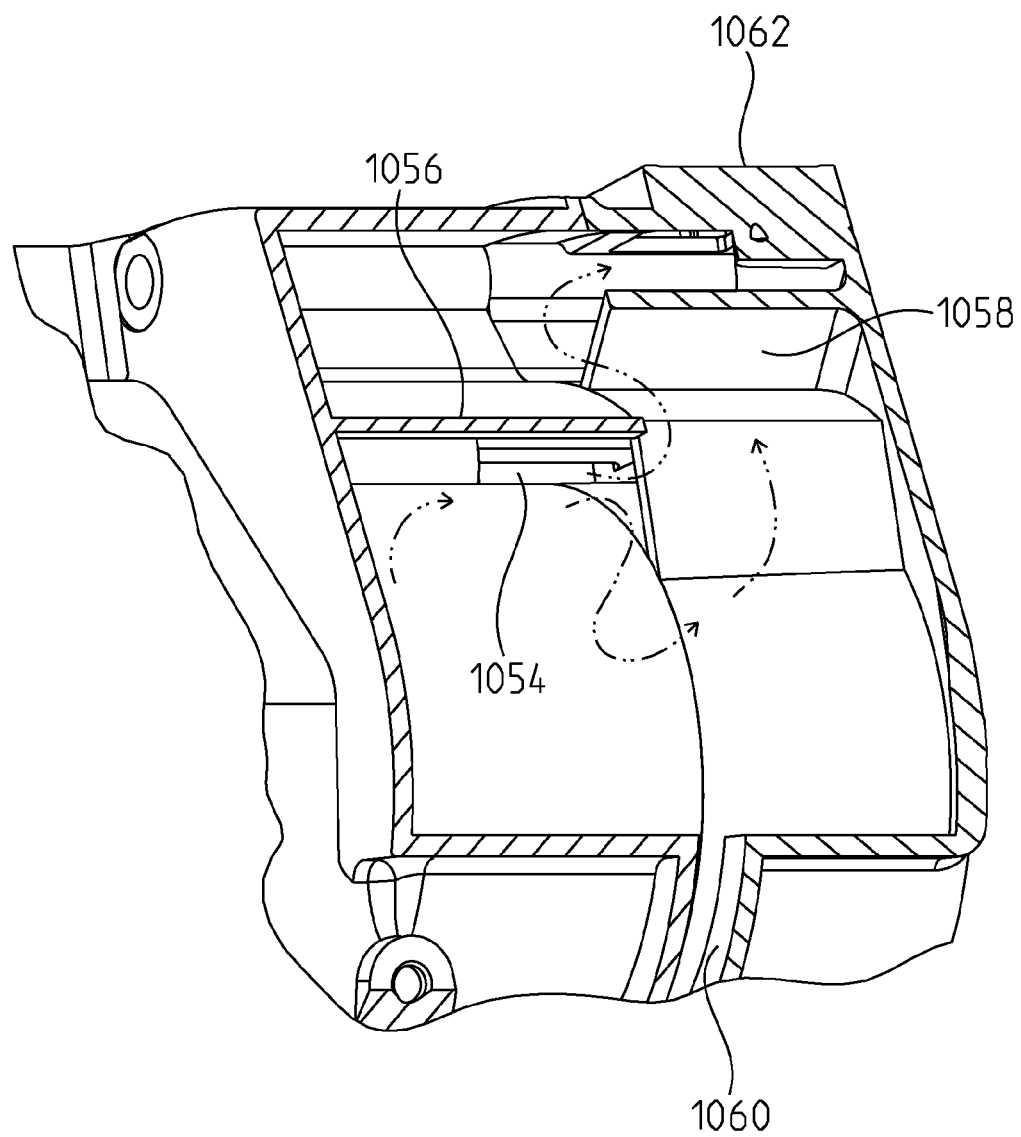
FIG. 52 is a cross-sectional view through lines 52-52 of FIG. 51.

With reference now to FIG. 1, an exhaust vapor recovery chamber 1050 will be described which recirculates the crankcase blow by gases through valve 1050 back to the air intake. As shown in FIGS. 51 and 52, breather 1050 includes an opening 1054 into the crankcase, as well as baffles 1056 and 1058. A drain channel 1060 connects the recovery chamber 1050 to the crankcase. Blow by gases from the crankcase make multiple directional changes as shown by the arrows in FIG. 52 which separates the oil from the blow by gases, allowing the oil to drain back through drain channel 1060 and allowing the blow by gases to extend upwardly through valve 1052 (FIG. 1) which is mounted on upper surface 1062. The blow by gases are then re-introduced through the valve 1052, through a throttle and back through air intake (546, see FIG. 20B).

Figure 53:
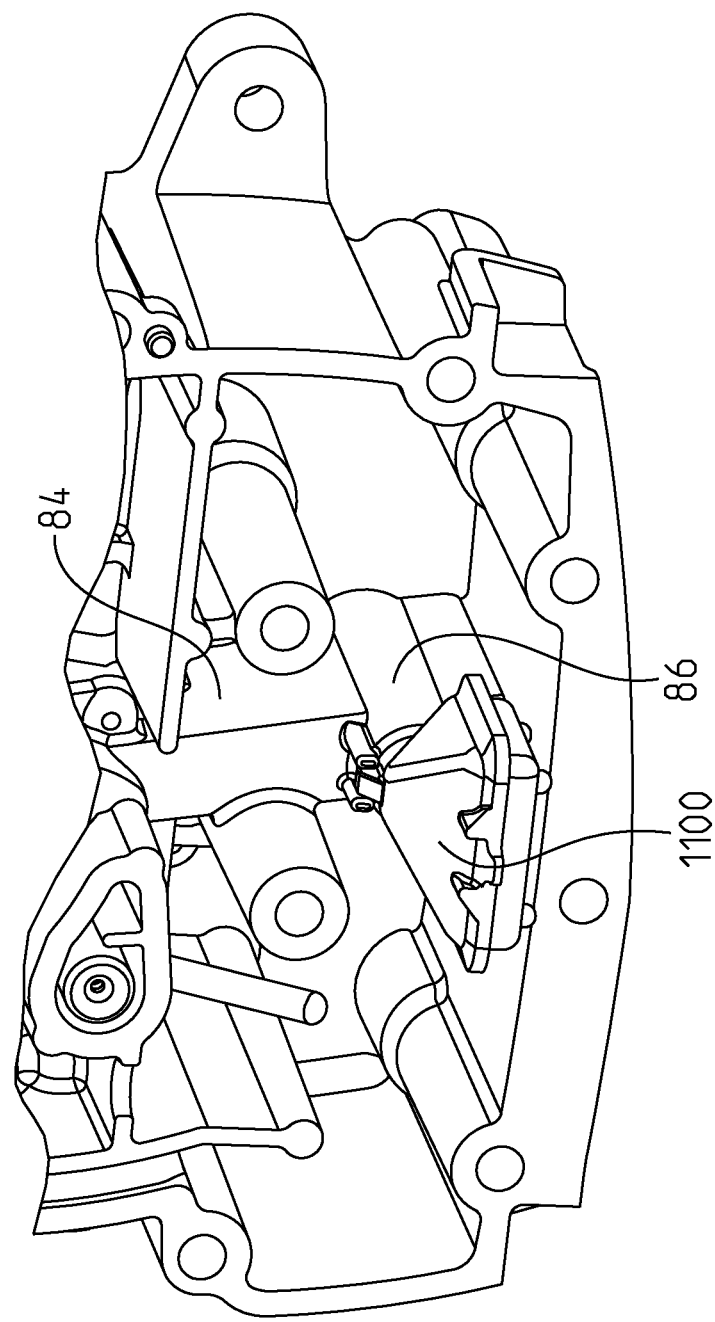
FIG. 53 shows a detail view of the oil pickup.

Finally with respect to FIG. 53, a pickup filter 1100 is provided positioned in the crankcase oil sump and connected to snorkel 86, for filtering oil to the oil pump.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An engine, comprising:
 a crankcase defined between first and second spaced apart and opposing inner walls;
 a crankshaft journalled in the crankcase, and extending along a rotational axis;
 a piston coupled to the crankshaft;
 a cylinder in which the piston reciprocates, and
 a head positioned over the piston and cylinder;
 the crankcase being physically split along a plane forming first and second crankcase portions, the plane being transverse to the rotational axis, intermediate the first and second opposing inner walls, and intersecting the piston, the split defining first and second mating faces on the first and second crankcase portions, spaced from the first and second opposing inner walls, the first and second crankcase portions being coupled together at the first and second mating faces, with fluid passages being in only the first crankcase portion, the fluid passages communicating with the head to deliver fluid to the head, the fluid passages including at least one oil passage.

2. The engine of claim 1, wherein the fluid passages are oil passages.

3. The engine of claim 1, wherein the fluid passages include water passages.

4. The engine of claim 1, wherein the fluid passages are discrete oil and water passages.

5. The engine of claim 1, wherein a first end of the crankshaft is journalled in the first crankcase portion.

6. The engine of claim 5, wherein a water pump and an oil pump are coupled to the first end of the crankshaft.

7. The engine of claim 6, wherein a portion of the first end of the crankshaft protrudes through the first crankcase portion.

8. The engine of claim 7, wherein the water pump is driven by the protruding crankshaft portion.

9. The engine of claim 6, wherein the oil pump is positioned on an exterior of the crankcase and is driven by an oil pump gear train.

10. The engine of claim 9, wherein the oil pump gear train is partially positioned in the crankcase and extends through the crankcase to drive the oil pump.

11. The engine of claim 9, further comprising an oil filter positioned exterior of, and attached to, the first crankcase portion.

12. The engine of claim 11, further comprising an oil sump.

13. The engine of claim 12, wherein the first crankcase portion comprises a first oil passage between the oil sump and the oil pump, and a second passage between the oil pump and the oil filter.

14. The engine of claim 13, wherein the first crankcase portion comprises a third oil passage between the oil filter and the crankshaft, and a fourth passage extending upwardly through a top surface of the first crankcase portion.

15. The engine of claim 14, wherein a portion of the first end of the crankshaft protrudes through the first crankcase portion and drives the water pump.

16. The engine of claim 15, wherein the crankshaft comprises an oil passage in fluid communication with the third oil passage, to lubricate the drive between the crankshaft and the water pump.

17. The engine of claim 16, wherein the first crankcase portion comprises a cavity surrounding the protruding crankshaft portion.

18. The engine of claim 17, wherein the oil pump is positioned in the cavity.

19. The engine of claim 18, wherein the water pump is positioned over and encloses the cavity.

20. The engine of claim 19, wherein the cavity is defined by a peripheral wall surrounding the protruding crankshaft portion and defines a mounting flange, and the water pump mounts to the mounting flange.

21. The engine of claim 20, wherein a water passage is positioned within the peripheral wall and sealingly connects to an output of the water pump, the water passage extending through a top surface of the first crankcase portion, and communicates cooling water to the head.

22. An engine, comprising:
 a crankcase comprising a plurality of walls, including first and second spaced apart and opposing walls, and a third wall coupling the first and second walls and having an opening therethrough extending along a reciprocation axis;
 a crankshaft journalled in the crankcase, and extending along a rotational axis, the rotational axis being transverse to the reciprocation axis;
 a piston coupled to the crankshaft through the opening, and being movable along the reciprocation axis;
 a cylinder in which the piston reciprocates, and
 a head positioned over the opening and receiving the piston;
 the crankcase being physically split along a plane forming first and second crankcase portions, the plane being transverse to the rotational axis and extending through the opening defining complementary opening portions, the crankcase further comprising fluid passages communicating with the head to deliver fluid to the head, with the fluid passages being in only the first crankcase portion.

23. The engine of claim 22, wherein the fluid passages are oil passages.

24. The engine of claim 23, wherein the fluid passages include water passages.

25. The engine of claim 22, wherein a water pump and an oil pump are coupled to a first end of the crankshaft.

26. The engine of claim 22, wherein the complementary opening portions are semi-cylindrical.

27. The engine of claim 22, wherein the reciprocation axis lies in the plane.

* * * * *